United States Patent
Khoshnevisan et al.

(10) Patent No.: US 11,924,127 B2
(45) Date of Patent: Mar. 5, 2024

(54) SOUNDING REFERENCE SIGNAL RESOURCE SETS ACROSS MULTIPLE SLOTS

(71) Applicant: QUALCOMM Incorporated, San Diego, CA (US)

(72) Inventors: Mostafa Khoshnevisan, San Diego, CA (US); Yitao Chen, San Diego, CA (US); Xiaoxia Zhang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 168 days.

(21) Appl. No.: 17/246,324

(22) Filed: Apr. 30, 2021

(65) Prior Publication Data
US 2022/0353031 A1    Nov. 3, 2022

(51) Int. Cl.
*H04W 72/0446*    (2023.01)
*H04L 5/00*    (2006.01)
*H04W 84/12*    (2009.01)
*H04W 84/18*    (2009.01)

(52) U.S. Cl.
CPC ....... *H04L 5/0048* (2013.01); *H04W 72/0446* (2013.01)

(58) Field of Classification Search
CPC ... H04L 5/0048; H04L 5/0051; H04L 5/0094; H04L 5/0053; H04W 72/0446
USPC ........................................................ 370/336
See application file for complete search history.

(56) References Cited

U.S. PATENT DOCUMENTS

| | | | |
|---|---|---|---|
| 2018/0324771 A1 | 11/2018 | Hosseini et al. | |
| 2019/0254061 A1 | 8/2019 | Manolakos et al. | |
| 2019/0281588 A1* | 9/2019 | Zhang | H04B 7/0617 |
| 2019/0297603 A1* | 9/2019 | Guo | H04L 5/0051 |
| 2020/0107352 A1* | 4/2020 | Tsai | H04B 7/0617 |
| 2020/0137592 A1* | 4/2020 | Guo | H04B 7/0695 |

(Continued)

OTHER PUBLICATIONS

Huawei: "Feature Lead Summary of HARQ Enhancements for NR-U", 3GPP TSG RAN WG1 Meeting #98, R1-1909496 Feature Lead Summary for 7.2.2.2.3 NRU HARQ RAN1#98V4, 3GPP, Mobile Competence Centre, 650, Route Des Lucioles, F-06921 Sophia-Antipolis Cedex, vol. RAN WG1, No. Prague, Czech Republic, Aug. 26, 2019-Aug. 30, 2019, 29 Pages, Sep. 3, 2019, XP051766098, URL: http://www.3gpp.org/ftp/tsg_ran/WG1_RL1/TSGR1_98/Docs/R1-1909496.

(Continued)

*Primary Examiner* — Maharishi V Khirodhar
(74) *Attorney, Agent, or Firm* — Holland & Hart LLP

(57) ABSTRACT

Methods, systems, and devices for wireless communications are described. In some examples, a user equipment (UE) may receive a control signal that triggers the UE to transmit one or more SRSs of an SRS resource set, where the SRS resource set spans multiple slots, and to receive configuration information that includes timing information for transmission of the one or more SRSs relative to a timing of receipt of the control signal. Additionally, the described techniques provide for a UE to receive a control signal that indicates an SRS beam management configuration that identifies at least a first SRS resource set and a second SRS resource set that are linked together such that the UE may determine a transmit beam for an SRS resource of the second SRS resource set based on an additional transmit beam for a corresponding SRS resource of the first SRS resource set.

30 Claims, 25 Drawing Sheets

(56) References Cited

U.S. PATENT DOCUMENTS

2022/0116979 A1\* 4/2022 Park .................. H04L 5/0044
2022/0361223 A1\* 11/2022 Li ..................... H04L 1/1822
2023/0045308 A1\* 2/2023 Guan ................. H04L 5/0051

OTHER PUBLICATIONS

LG Electronics: "Harq Procedure for NR-U", 3GPP TSG RAN WG1 #99, R1-1912391, 3GPP, Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 9, 2019, 22 Pages, XP051823397, URL: https://ftp.3gpp.org/tsg_ran/WG1_RL1/TSGR1_99/Docs/R1-1912391.zip R1-1912391 NR-U HARQ_Final.doc [retrieved on Nov. 9, 2019].
Partial International Search Report—PCT/US2022/071156—ISA/EPO—dated Jun. 14, 2022 (2103631WO).
International Search Report and Written Opinion—PCT/US2022/071156—ISA/EPO—dated Sep. 6, 2022 (2103631WO).

\* cited by examiner

- ▨ Control Signaling 205
- ▨ SRS 215
- ▨ Configuration Information 230

☐ SRS Resource Transmitted with First Transmit Beam 710-a

▨ SRS Resource Transmitted with Second Transmit Beam 710-b

▩ SRS Resource Transmitted with Third Transmit Beam 710-c

▮ SRS Resource Transmitted with Fourth Transmit Beam 710-d

SOUNDING REFERENCE SIGNAL RESOURCE SETS ACROSS MULTIPLE SLOTS

FIELD OF TECHNOLOGY

The following relates to wireless communications, including sounding reference signal (SRS) resource sets across multiple slots.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). In some cases, a UE may transmit reference signals to a base station, for example, as part of one or more communications procedures. The UE may transmit the reference signals to the base station using an uplink beam, which may be based on a downlink beam used to receive signals from the base station

SUMMARY

The described techniques relate to improved methods, systems, devices, and apparatuses that support sounding reference signal (SRS) resource sets across multiple slots. Generally, the described techniques provide for a user equipment (UE) to receive a control signal that triggers the UE to transmit one or more SRSs of an SRS resource set, where the SRS resource set spans multiple transmission time intervals (TTIs) (e.g., slots), and to receive configuration information that includes timing information for transmission of the one or more SRSs relative to a timing of receipt of the control signal. Subsequently, the UE may then transmit the one or more SRSs in corresponding TTIs of the multiple TTIs based on the configuration information. For example, the configuration information may include respective offset values for each SRS resource of the SRS resource set to indicate in which TTIs the UE is to transmit each SRS resource. Additionally or alternatively, the configuration information may include a vector of offset values for each SRS resource of the SRS resource set to indicate in which TTIs the UE is to transmit each SRS resource. In some examples, the UE may determine the TTIs for transmitting each SRS resource of the SRS resource set based on a reference TTI.

Additionally, the described techniques provide for a UE to receive a control signal that indicates an SRS beam management configuration that identifies at least a first SRS resource set and a second SRS resource set that are linked together such that the UE may determine a transmit beam for an SRS resource of the second SRS resource set based on an additional transmit beam for a corresponding SRS resource of the first SRS resource set. Accordingly, the UE may then transmit the SRS resources of each SRS resource set using the determined transmit beams. In some examples, the UE may transmit each SRS resource of a given SRS resource set using a same transmit beam but may use different transmit beams per SRS resource set. Additionally or alternatively, the UE may transmit each SRS resource of each SRS resource set via respective different transmit beams, where corresponding SRS resources of each SRS resource set are transmitted with a same transmit beam.

A method for wireless communications at a UE is described. The method may include receiving, from a base station, a control signal triggering the UE to transmit one or more SRSs of an SRS resource set, the SRS resource set spanning a set of multiple TTIs, receiving, from the base station, configuration information including timing information for transmission of the one or more SRSs relative to a timing of receipt of the control signal, the configuration information indicating respective TTIs of the set of multiple TTIs for transmitting each SRS of the one or more SRSs, and transmitting the one or more SRSs of the SRS resource set based on the received configuration information.

An apparatus for wireless communications at a UE is described. The apparatus may include a processor, memory coupled with the processor, and instructions stored in the memory. The instructions may be executable by the processor to cause the apparatus to receive, from a base station, a control signal triggering the UE to transmit one or more SRSs of an SRS resource set, the SRS resource set spanning a set of multiple TTIs, receive, from the base station, configuration information including timing information for transmission of the one or more SRSs relative to a timing of receipt of the control signal, the configuration information indicating respective TTIs of the set of multiple TTIs for transmitting each SRS of the one or more SRSs, and transmit the one or more SRSs of the SRS resource set based on the received configuration information.

Another apparatus for wireless communications at a UE is described. The apparatus may include means for receiving, from a base station, a control signal triggering the UE to transmit one or more SRSs of an SRS resource set, the SRS resource set spanning a set of multiple TTIs, means for receiving, from the base station, configuration information including timing information for transmission of the one or more SRSs relative to a timing of receipt of the control signal, the configuration information indicating respective TTIs of the set of multiple TTIs for transmitting each SRS of the one or more SRSs, and means for transmitting the one or more SRSs of the SRS resource set based on the received configuration information.

A non-transitory computer-readable medium storing code for wireless communications at a UE is described. The code may include instructions executable by a processor to receive, from a base station, a control signal triggering the UE to transmit one or more SRSs of an SRS resource set, the SRS resource set spanning a set of multiple TTIs, receive, from the base station, configuration information including timing information for transmission of the one or more SRSs relative to a timing of receipt of the control signal, the configuration information indicating respective TTIs of the set of multiple TTIs for transmitting each SRS of the one or more SRSs, and transmit the one or more SRSs of the SRS resource set based on the received configuration information.

In some examples of the method, apparatuses, and non-transitory computer-readable medium described herein, receiving the configuration information including the timing information may include operations, features, means, or instructions for receiving an indication of one or more offset values configured for transmitting at least a subset of the one or more SRSs of the SRS resource set over the set of multiple TTIs, where the one or more offset values include a number of TTIs between receiving the control signal and transmitting at least the subset of the one or more SRSs.

Some examples of the method, apparatuses, and non-transitory computer-readable medium described herein may further include operations, features, means, or instructions for transmitting each of the one or more SRSs of the SRS resource set over the set of multiple TTIs using the one or more offset values instead of an offset value configured for the SRS resource set based on receiving the indication of the one or more offsets.

Some examples of the method, apparatuses, and non-transitory computer-readable medium described herein may further include operations, features, means, or instructions for transmitting a first subset of the one or more SRSs of the SRS resource set using an offset value configured for the SRS resource set and transmitting a second subset of the one or more SRSs of the SRS resource set using the one or more offset values.

In some examples of the method, apparatuses, and non-transitory computer-readable medium described herein, receiving the configuration information including the timing information may include operations, features, means, or instructions for receiving an indication of a vector including respective offset values for each of the one or more SRSs of the SRS resource set, where the respective offset values include a number of TTIs between receiving the control signal and transmitting the one or more SRSs.

Some examples of the method, apparatuses, and non-transitory computer-readable medium described herein may further include operations, features, means, or instructions for transmitting the one or more SRSs of the SRS resource set using the respective offset values instead of an offset value configured for the SRS resource set based on receiving the indication of the vector.

Some examples of the method, apparatuses, and non-transitory computer-readable medium described herein may further include operations, features, means, or instructions for transmitting the one or more SRSs of the SRS resource set based on the respective offset values and an offset value configured for the SRS resource set.

Some examples of the method, apparatuses, and non-transitory computer-readable medium described herein may further include operations, features, means, or instructions for determining a reference TTI for the timing information received in the configuration information and transmitting the one or more SRSs of the SRS resource set based on the reference TTI.

In some examples of the method, apparatuses, and non-transitory computer-readable medium described herein, transmitting the one or more SRSs of the SRS resource set may include operations, features, means, or instructions for transmitting each of the one or more SRSs based on respective TTIs after the reference TTI that include available resources for carrying corresponding SRSs of the one or more SRSs.

Some examples of the method, apparatuses, and non-transitory computer-readable medium described herein may further include operations, features, means, or instructions for transmitting each of the one or more SRSs over the respective TTIs based on not expecting collisions between different SRSs of the one or more SRSs.

Some examples of the method, apparatuses, and non-transitory computer-readable medium described herein may further include operations, features, means, or instructions for transmitting each of the one or more SRSs over the respective TTIs based on a priority for the one or more SRSs.

In some examples of the method, apparatuses, and non-transitory computer-readable medium described herein, the priority may be based on an SRS resource identifier for each of the one or more SRSs, an ordering of the one or more SRSs in a configuration message for the SRS resource set, or a combination thereof.

In some examples of the method, apparatuses, and non-transitory computer-readable medium described herein, determining the reference TTI may include operations, features, means, or instructions for determining the reference TTI based on a TTI in which the control signal may be received, a TTI indicated by an offset value configured for the SRS resource set, radio resource control signaling, downlink control information, or a combination thereof.

Some examples of the method, apparatuses, and non-transitory computer-readable medium described herein may further include operations, features, means, or instructions for receiving, via radio resource control signaling, a first indication of one or more offset values configured for transmitting at least a subset of the one or more SRSs, a second indication of a vector including respective offset values for each of the one or more SRSs, or both, where the reference TTI may be determined based on the first indication, the second indication, or both.

In some examples of the method, apparatuses, and non-transitory computer-readable medium described herein, receiving the configuration information including the timing information may include operations, features, means, or instructions for receiving a first indication of one or more respective reference TTIs for transmission of each of the one or more SRSs, where the one or more SRSs may be transmitted based on the indication.

Some examples of the method, apparatuses, and non-transitory computer-readable medium described herein may further include operations, features, means, or instructions for receiving, via downlink control information, a second indication of a specific reference TTI of the one or more respective reference TTIs for transmission of each of the one or more SRSs.

In some examples of the method, apparatuses, and non-transitory computer-readable medium described herein, the specific reference TTI corresponds to a same entry in an order of the one or more respective reference TTIs for each of the one or more SRSs or corresponds to separate entries in the order of the one or more respective reference TTIs for each of the one or more SRSs.

In some examples of the method, apparatuses, and non-transitory computer-readable medium described herein, receiving the first indication may include operations, features, means, or instructions for receiving one or more vectors indicating the one or more respective reference TTIs for transmission of each of the one or more SRSs.

Some examples of the method, apparatuses, and non-transitory computer-readable medium described herein may further include operations, features, means, or instructions for receiving, via downlink control information, a second indication of a specific vector of the one or more vectors to indicate the one or more respective reference TTIs for transmission of each of the one or more SRSs.

A method for wireless communications at a base station is described. The method may include transmitting, to a UE, a control signal triggering the UE to transmit one or more SRSs of an SRS resource set, the SRS resource set spanning a set of multiple TTIs, transmitting, to the UE, configuration information including timing information for transmission of the one or more SRSs relative to a timing of transmission of the control signal, the configuration information indicating respective TTIs of the set of multiple TTIs for the UE to transmit each SRS of the one or more SRSs, and receiving the one or more SRSs of the SRS resource set based on the transmitted configuration information.

An apparatus for wireless communications at a base station is described. The apparatus may include a processor, memory coupled with the processor, and instructions stored in the memory. The instructions may be executable by the processor to cause the apparatus to transmit, to a UE, a control signal triggering the UE to transmit one or more SRSs of an SRS resource set, the SRS resource set spanning a set of multiple TTIs, transmit, to the UE, configuration information including timing information for transmission of the one or more SRSs relative to a timing of transmission of the control signal, the configuration information indicating respective TTIs of the set of multiple TTIs for the UE to transmit each SRS of the one or more SRSs, and receive the one or more SRSs of the SRS resource set based on the transmitted configuration information.

Another apparatus for wireless communications at a base station is described. The apparatus may include means for transmitting, to a UE, a control signal triggering the UE to transmit one or more SRSs of an SRS resource set, the SRS resource set spanning a set of multiple TTIs, means for transmitting, to the UE, configuration information including timing information for transmission of the one or more SRSs relative to a timing of transmission of the control signal, the configuration information indicating respective TTIs of the set of multiple TTIs for the UE to transmit each SRS of the one or more SRSs, and means for receiving the one or more SRSs of the SRS resource set based on the transmitted configuration information.

A non-transitory computer-readable medium storing code for wireless communications at a base station is described. The code may include instructions executable by a processor to transmit, to a UE, a control signal triggering the UE to transmit one or more SRSs of an SRS resource set, the SRS resource set spanning a set of multiple TTIs, transmit, to the UE, configuration information including timing information for transmission of the one or more SRSs relative to a timing of transmission of the control signal, the configuration information indicating respective TTIs of the set of multiple TTIs for the UE to transmit each SRS of the one or more SRSs, and receive the one or more SRSs of the SRS resource set based on the transmitted configuration information.

In some examples of the method, apparatuses, and non-transitory computer-readable medium described herein, transmitting the configuration information including the timing information may include operations, features, means, or instructions for transmitting an indication of one or more offset values configured for the UE to transmit at least a subset of the one or more SRSs of the SRS resource set over the set of multiple TTIs, where the one or more offset values include a number of TTIs between transmitting the control signal and receiving at least the subset of the one or more SRSs.

Some examples of the method, apparatuses, and non-transitory computer-readable medium described herein may further include operations, features, means, or instructions for receiving each of the one or more SRSs of the SRS resource set over the set of multiple TTIs according to the one or more offset values instead of an offset value configured for the SRS resource set based on transmitting the indication of the one or more offsets.

Some examples of the method, apparatuses, and non-transitory computer-readable medium described herein may further include operations, features, means, or instructions for receiving a first subset of the one or more SRSs of the SRS resource set according to an offset value configured for the SRS resource set and receiving a second subset of the one or more SRSs of the SRS resource set according to the one or more offset values.

In some examples of the method, apparatuses, and non-transitory computer-readable medium described herein, transmitting the configuration information including the timing information may include operations, features, means, or instructions for transmitting an indication of a vector including respective offset values for each of the one or more SRSs of the SRS resource set, where the respective offset values include a number of TTIs between transmitting the control signal and receiving the one or more SRSs.

Some examples of the method, apparatuses, and non-transitory computer-readable medium described herein may further include operations, features, means, or instructions for receiving the one or more SRSs of the SRS resource set according to the respective offset values instead of an offset value configured for the SRS resource set based on transmitting the indication of the vector.

Some examples of the method, apparatuses, and non-transitory computer-readable medium described herein may further include operations, features, means, or instructions for receiving the one or more SRSs of the SRS resource set based on the respective offset values and an offset value configured for the SRS resource set.

Some examples of the method, apparatuses, and non-transitory computer-readable medium described herein may further include operations, features, means, or instructions for determining a reference TTI for the timing information received in the configuration information and receiving the one or more SRSs of the SRS resource set based on the reference TTI.

In some examples of the method, apparatuses, and non-transitory computer-readable medium described herein, receiving the one or more SRSs of the SRS resource set may include operations, features, means, or instructions for receiving each of the one or more SRSs based on respective TTIs after the reference TTI that include available resources for carrying corresponding SRSs of the one or more SRSs.

Some examples of the method, apparatuses, and non-transitory computer-readable medium described herein may further include operations, features, means, or instructions for receiving each of the one or more SRSs over the respective TTIs based on a priority for the one or more SRSs.

In some examples of the method, apparatuses, and non-transitory computer-readable medium described herein, the priority may be based on an SRS resource identifier for each of the one or more SRSs, an ordering of the one or more SRSs in a configuration message for the SRS resource set, or a combination thereof.

In some examples of the method, apparatuses, and non-transitory computer-readable medium described herein, determining the reference TTI may include operations, features, means, or instructions for determining the reference TTI based on a TTI in which the control signal may be transmitted, a TTI indicated by an offset value configured for the SRS resource set, or a combination thereof.

Some examples of the method, apparatuses, and non-transitory computer-readable medium described herein may further include operations, features, means, or instructions for transmitting, via radio resource control signaling, a first indication of one or more offset values configured for transmitting at least a subset of the one or more SRSs, a second indication of a vector including respective offset values for each of the one or more SRSs, or both, where the reference TTI may be determined based on the first indication, the second indication, or both.

In some examples of the method, apparatuses, and non-transitory computer-readable medium described herein, transmitting the configuration information including the timing information may include operations, features, means, or instructions for transmitting a first indication of one or more respective reference TTIs for transmission of each of the one or more SRSs, where the one or more SRSs may be received based on the indication.

Some examples of the method, apparatuses, and non-transitory computer-readable medium described herein may further include operations, features, means, or instructions for transmitting, via downlink control information, a second indication of a specific reference TTI of the one or more respective reference TTIs for the UE to transmit each of the one or more SRSs.

In some examples of the method, apparatuses, and non-transitory computer-readable medium described herein, the specific reference TTI corresponds to a same entry in an order of the one or more respective reference TTIs for each of the one or more SRSs or corresponds to separate entries in the order of the one or more respective reference TTIs for each of the one or more SRSs.

In some examples of the method, apparatuses, and non-transitory computer-readable medium described herein, transmitting the first indication may include operations, features, means, or instructions for transmitting one or more vectors indicating the one or more respective reference TTIs for transmission of each of the one or more SRSs.

Some examples of the method, apparatuses, and non-transitory computer-readable medium described herein may further include operations, features, means, or instructions for transmitting, via downlink control information, a second indication of a specific vector of the one or more vectors to indicate the one or more respective reference TTIs for the UE to transmit each of the one or more SRSs.

A method for wireless communications at a UE is described. The method may include receiving, from a base station, a control signal that indicates an SRS beam management configuration that identifies at least a first SRS resource set and a second SRS resource set, the second SRS resource set linked to the first SRS resource set, determining a first transmit beam for at least one SRS resource of the second SRS resource set based on a second transmit beam for a corresponding SRS resource of the first SRS resource set, and transmitting the at least one SRS resource of the second SRS resource set using the first transmit beam.

An apparatus for wireless communications at a UE is described. The apparatus may include a processor, memory coupled with the processor, and instructions stored in the memory. The instructions may be executable by the processor to cause the apparatus to receive, from a base station, a control signal that indicates an SRS beam management configuration that identifies at least a first SRS resource set and a second SRS resource set, the second SRS resource set linked to the first SRS resource set, determine a first transmit beam for at least one SRS resource of the second SRS resource set based on a second transmit beam for a corresponding SRS resource of the first SRS resource set, and transmit the at least one SRS resource of the second SRS resource set using the first transmit beam.

Another apparatus for wireless communications at a UE is described. The apparatus may include means for receiving, from a base station, a control signal that indicates an SRS beam management configuration that identifies at least a first SRS resource set and a second SRS resource set, the second SRS resource set linked to the first SRS resource set, means for determining a first transmit beam for at least one SRS resource of the second SRS resource set based on a second transmit beam for a corresponding SRS resource of the first SRS resource set, and means for transmitting the at least one SRS resource of the second SRS resource set using the first transmit beam.

A non-transitory computer-readable medium storing code for wireless communications at a UE is described. The code may include instructions executable by a processor to receive, from a base station, a control signal that indicates an SRS beam management configuration that identifies at least a first SRS resource set and a second SRS resource set, the second SRS resource set linked to the first SRS resource set, determine a first transmit beam for at least one SRS resource of the second SRS resource set based on a second transmit beam for a corresponding SRS resource of the first SRS resource set, and transmit the at least one SRS resource of the second SRS resource set using the first transmit beam.

In some examples of the method, apparatuses, and non-transitory computer-readable medium described herein, transmitting the at least one SRS resource of the second SRS resource set may include operations, features, means, or instructions for transmitting each SRS resource of the second SRS resource set using the first transmit beam.

Some examples of the method, apparatuses, and non-transitory computer-readable medium described herein may further include operations, features, means, or instructions for transmitting each SRS resource of the first SRS resource set using the second transmit beam.

In some examples of the method, apparatuses, and non-transitory computer-readable medium described herein, transmitting the at least one SRS resource of the second SRS resource set may include operations, features, means, or instructions for transmitting each SRS resource of the second SRS resource set using respective different transmit beams, where the first transmit beam for the at least one SRS resource of the second SRS resource set and the second transmit beam for the corresponding SRS resource of the first SRS resource set may be a same transmit beam.

Some examples of the method, apparatuses, and non-transitory computer-readable medium described herein may further include operations, features, means, or instructions for receiving, from the base station, an indication of a pattern of transmit beams for the first SRS resource set and the second SRS resource set, where the at least one SRS resource of the second SRS resource set may be transmitted on the first transmit beam and the corresponding SRS resource of the first SRS resource set may be transmitted on the second transmit beam based on the indication.

Some examples of the method, apparatuses, and non-transitory computer-readable medium described herein may further include operations, features, means, or instructions for determining the first SRS resource set and the second SRS resource set may be linked based on a lack of spatial relation information or uplink transmission configuration indicator states being configured for each SRS resource set, each SRS resource set being configured with a same time domain behavior, each SRS resource set not overlapping in the time domain, each SRS resource set being configured with same uplink power control parameters, each SRS resource set having a same number of SRS resources, or a combination thereof.

Some examples of the method, apparatuses, and non-transitory computer-readable medium described herein may further include operations, features, means, or instructions for receiving, from the base station, an indication that the first SRS resource set and the second SRS resource set may be linked via radio resource control signaling, medium access control (MAC) control element signaling, downlink control information, or a combination thereof.

Some examples of the method, apparatuses, and non-transitory computer-readable medium described herein may further include operations, features, means, or instructions for triggering the second SRS resource set when the first SRS resource set may be triggered based on the indication.

Some examples of the method, apparatuses, and non-transitory computer-readable medium described herein may further include operations, features, means, or instructions for triggering both the first SRS resource set and the second SRS resource set based on the media access control (MAC) control element signaling including a first identifier for the first SRS resource set and an additional indication that the second SRS resource set may be to be triggered with the first SRS resource set.

Some examples of the method, apparatuses, and non-transitory computer-readable medium described herein may further include operations, features, means, or instructions for triggering both the first SRS resource set and the second SRS resource set based on the MAC control element signaling including a first identifier for the first SRS resource set and a second identifier for the second SRS resource set.

Some examples of the method, apparatuses, and non-transitory computer-readable medium described herein may further include operations, features, means, or instructions for triggering both the first SRS resource set and the second SRS resource set based on the downlink control information indicating that the first SRS resource set and the second SRS resource set may be linked out of a set of multiple SRS resource sets.

Some examples of the method, apparatuses, and non-transitory computer-readable medium described herein may further include operations, features, means, or instructions for receiving, from the base station, downlink control information including a transmission power control command that adjusts one or more power control parameters for the first SRS resource set and the second SRS resource set.

Some examples of the method, apparatuses, and non-transitory computer-readable medium described herein may further include operations, features, means, or instructions for adjusting the one or more power control parameters after the first SRS resource set and the second SRS resource set may have both been fully transmitted based on receiving the downlink control information before both the first SRS resource set and the second SRS resource set may have been fully transmitted.

Some examples of the method, apparatuses, and non-transitory computer-readable medium described herein may further include operations, features, means, or instructions for determining that receiving the downlink control information may be an error case based on receiving the downlink control information before both the first SRS resource set and the second SRS resource set may have been fully transmitted.

A method for wireless communications at a base station is described. The method may include transmitting, to a UE, a control signal that indicates an SRS beam management configuration that identifies at least a first SRS resource set and a second SRS resource set, the second SRS resource set linked to the first SRS resource set, determining a first transmit beam for at least one SRS resource of the second SRS resource set based on a second transmit beam for a corresponding SRS resource of the first SRS resource set, and receiving the at least one SRS resource of the second SRS resource set via the first transmit beam.

An apparatus for wireless communications at a base station is described. The apparatus may include a processor, memory coupled with the processor, and instructions stored in the memory. The instructions may be executable by the processor to cause the apparatus to transmit, to a UE, a control signal that indicates an SRS beam management configuration that identifies at least a first SRS resource set and a second SRS resource set, the second SRS resource set linked to the first SRS resource set, determine a first transmit beam for at least one SRS resource of the second SRS resource set based on a second transmit beam for a corresponding SRS resource of the first SRS resource set, and receive the at least one SRS resource of the second SRS resource set via the first transmit beam.

Another apparatus for wireless communications at a base station is described. The apparatus may include means for transmitting, to a UE, a control signal that indicates an SRS beam management configuration that identifies at least a first SRS resource set and a second SRS resource set, the second SRS resource set linked to the first SRS resource set, means for determining a first transmit beam for at least one SRS resource of the second SRS resource set based on a second transmit beam for a corresponding SRS resource of the first SRS resource set, and means for receiving the at least one SRS resource of the second SRS resource set via the first transmit beam.

A non-transitory computer-readable medium storing code for wireless communications at a base station is described. The code may include instructions executable by a processor to transmit, to a UE, a control signal that indicates an SRS beam management configuration that identifies at least a first SRS resource set and a second SRS resource set, the second SRS resource set linked to the first SRS resource set, determine a first transmit beam for at least one SRS resource of the second SRS resource set based on a second transmit beam for a corresponding SRS resource of the first SRS resource set, and receive the at least one SRS resource of the second SRS resource set via the first transmit beam.

In some examples of the method, apparatuses, and non-transitory computer-readable medium described herein, receiving the at least one SRS resource of the second SRS resource set may include operations, features, means, or instructions for receiving each SRS resource of the second SRS resource set via the first transmit beam.

Some examples of the method, apparatuses, and non-transitory computer-readable medium described herein may further include operations, features, means, or instructions for receiving each SRS resource of the first SRS resource set via the second transmit beam.

In some examples of the method, apparatuses, and non-transitory computer-readable medium described herein, receiving the at least one SRS resource of the second SRS resource set may include operations, features, means, or instructions for receiving each SRS resource of the second SRS resource set via respective different transmit beams, where the first transmit beam for the at least one SRS resource of the second SRS resource set and the second transmit beam for the corresponding SRS resource of the first SRS resource set may be a same transmit beam.

Some examples of the method, apparatuses, and non-transitory computer-readable medium described herein may further include operations, features, means, or instructions for transmitting, to the UE, an indication of a pattern of transmit beams for the first SRS resource set and the second SRS resource set, where the at least one SRS resource of the second SRS resource set may be received via the first transmit beam and the corresponding SRS resource of the first SRS resource set may be received via the second transmit beam based on the indication.

Some examples of the method, apparatuses, and non-transitory computer-readable medium described herein may further include operations, features, means, or instructions for transmitting an indication that the first SRS resource set and the second SRS resource set may be linked based on a lack of spatial relation information or uplink transmission configuration indicator states being configured for each SRS resource set, each SRS resource set being configured with a same time domain behavior, each SRS resource set not overlapping in the time domain, each SRS resource set being configured with same uplink power control parameters, each SRS resource set having a same number of SRS resources, or a combination thereof.

Some examples of the method, apparatuses, and non-transitory computer-readable medium described herein may further include operations, features, means, or instructions for transmitting, to the UE, an indication that the first SRS resource set and the second SRS resource set may be linked via radio resource control signaling, medium access control (MAC) control element signaling, downlink control information, or a combination thereof.

Some examples of the method, apparatuses, and non-transitory computer-readable medium described herein may further include operations, features, means, or instructions for triggering the second SRS resource set when the first SRS resource set may be triggered based on the indication.

Some examples of the method, apparatuses, and non-transitory computer-readable medium described herein may further include operations, features, means, or instructions for triggering both the first SRS resource set and the second SRS resource set based on the MAC control element signaling including a first identifier for the first SRS resource set and an additional indication that the second SRS resource set may be to be triggered with the first SRS resource set.

Some examples of the method, apparatuses, and non-transitory computer-readable medium described herein may further include operations, features, means, or instructions for triggering both the first SRS resource set and the second SRS resource set based on the MAC control element signaling including a first identifier for the first SRS resource set and a second identifier for the second SRS resource set.

Some examples of the method, apparatuses, and non-transitory computer-readable medium described herein may further include operations, features, means, or instructions for triggering both the first SRS resource set and the second SRS resource set based on the downlink control information indicating that the first SRS resource set and the second SRS resource set may be linked out of a set of multiple SRS resource sets.

Some examples of the method, apparatuses, and non-transitory computer-readable medium described herein may further include operations, features, means, or instructions for transmitting, to the UE, downlink control information including a transmission power control command that adjusts one or more power control parameters for the first SRS resource set and the second SRS resource set.

Some examples of the method, apparatuses, and non-transitory computer-readable medium described herein may further include operations, features, means, or instructions for receiving additional instances of the first SRS resource set and the second SRS resource set according to the adjusted one or more power control parameters after first instances of the first SRS resource set and the second SRS resource set may have both been fully received based on transmitting the downlink control information before both first instances of the first SRS resource set and the second SRS resource set may have been fully received.

DETAILED DESCRIPTION

Figure 1:
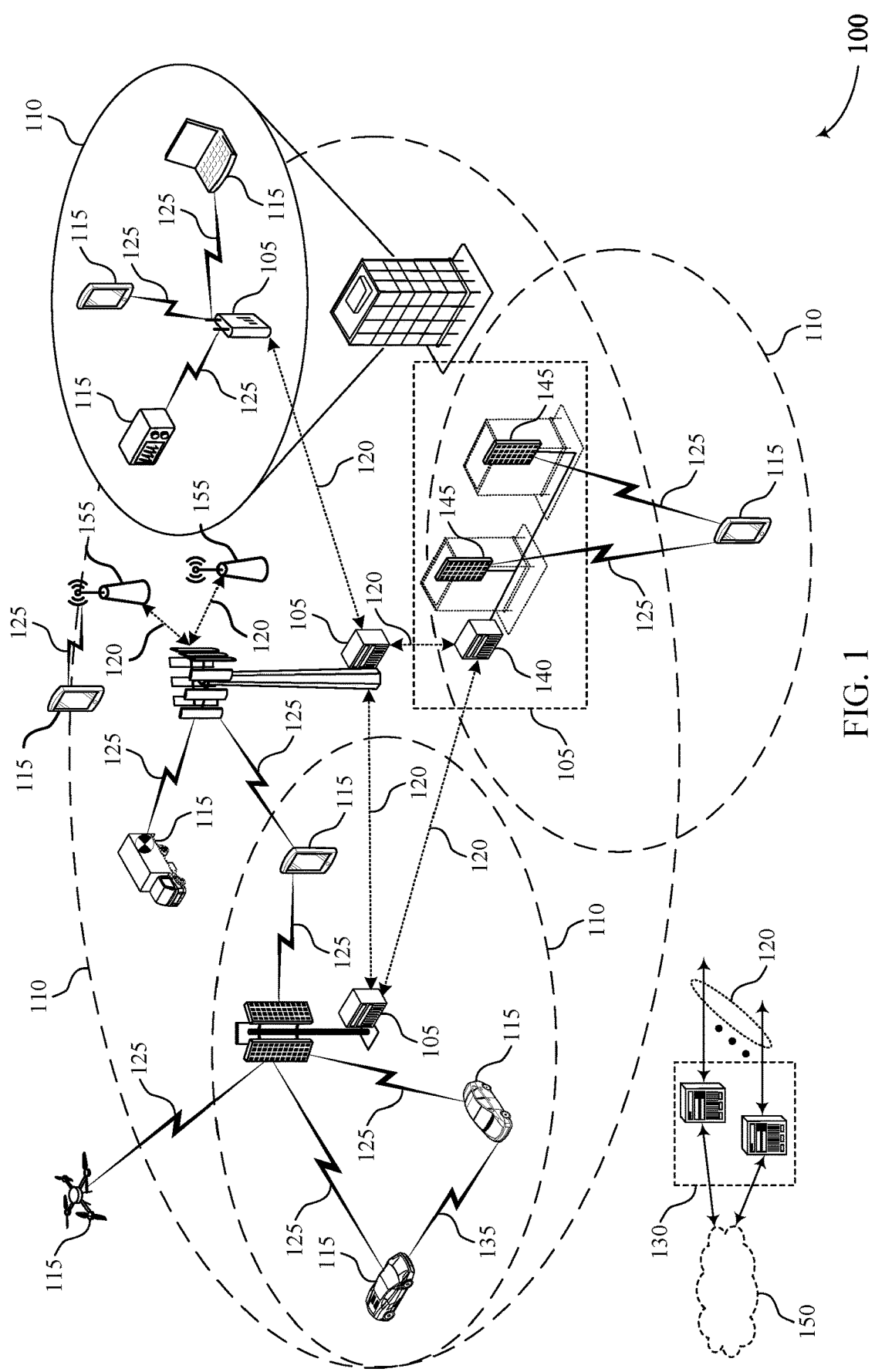
FIG. 1 illustrates an example of a wireless communications system that supports sounding reference signal resource (SRS) sets across multiple slots in accordance with aspects of the present disclosure.

A user equipment (UE) and a base station may communicate using one or more beams (e.g., communication beams, shaped using beamforming techniques). For example, for uplink communications, the UE may use a transmit beam (e.g., an uplink transmit beam) for transmitting information or data to the base station, and the base station may use a receive beam (e.g., uplink receive beam) to receive the transmitted information or data. In the uplink, the UE may transmit one or more sounding reference signals (SRS) to the base station, where an applicability or usage of the SRS (e.g., of a corresponding SRS resource set) may be configured by the base station to be for beam management. An uplink beam for SRS transmissions may be configured (e.g., by the base station) by pointing to or indicating a downlink reference signal corresponding to the uplink beam or another SRS corresponding to the uplink beam.

In some examples, the UE and the base station may communicate in the uplink via one or more uplink nodes. In such cases, the uplink nodes may be connected to the base station and may receive uplink signals and/or channels from the UE and forward associated uplink data or uplink information to the base station. Downlink signals and/or channels may be transmitted to the UE from the base station, which may represent a different communication node (e.g., at a different location) than any uplink nodes used for uplink communications. Additionally or alternatively, the UE and the base station may communicate in the uplink via a supplementary uplink (SUL) carrier, where the UE may be configured with two uplink carriers (e.g., one of which may be configured as SUL) for one downlink carrier of a same serving cell.

As indicated previously, the UE may transmit SRSs to allow the base station to, for example, estimate a channel or for beam management purposes. The SRS transmissions may be aperiodic, semi-periodic, or periodic. In some examples, the SRSs may include a large number of SRS symbols that exceed a single slot. However, for aperiodic SRS transmissions (e.g., triggered by downlink control information (DCI)), all SRS resources within a given SRS resource set may be configured to be transmitted in a same slot. Additionally, multiple SRS resource sets may be configured for beam management; however, the multiple SRS resource sets may not be used for a one-shot of beam management because there is no linking or relationship between them in terms of using same or different transmit beams.

As described herein, an aperiodic SRS resource set may be triggered by a DCI such that SRS resources within the SRS resource set span more than one slot. To support the SRS resource set spanning more than one slot, slot offsets between receiving the DCI triggering the aperiodic SRS resource set and transmitting each SRS resource of the aperiodic SRS resource set may be configured per SRS resource instead of per SRS resource set. The slot offsets may be configured as a vector for the SRS resource set, where each element of the vector corresponds to one SRS resource within the SRS resource set. In some examples, the slot offsets for each SRS resource may be based on a single reference slot, where each SRS resource is transmitted in respective "available slots" after the reference slot (e.g., the "available slot" is a slot in which there are enough uplink or flexible symbol(s) for time-domain location(s) for each SRS resource in the SRS resource set).

Additionally, two or more SRS resource sets may be linked or associated with each other when the two or more SRS resource sets are both configured for beam management. Based on the linkage/association, a UE may determine a transmit beam for each SRS resource across the two or more linked SRS resource sets. In some examples, SRS resources within each of the two or more linked SRS resource sets may be transmitted with a same transmit beam, while across different SRS resource sets, different transmit beams may be used. Additionally or alternatively, SRS resources within each of the two or more linked SRS resource sets may be transmitted with different transmit beams, while an i-th SRS resource of each of the two or more linked SRS resource set may be transmitted with a same transmit beam.

Aspects of the disclosure are initially described in the context of wireless communications systems. Additionally, aspects of the disclosure are illustrated by additional wireless communications systems, a slot offset configuration, reference slot configurations, transmit beam linkages, and process flows. Aspects of the disclosure are further illustrated by and described with reference to apparatus diagrams, system diagrams, and flowcharts that relate to SRS resource sets across multiple slots.

FIG. 1 illustrates an example of a wireless communications system 100 that supports reference signal patterns for beam management in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In some cases, wireless communications system may include one or more uplink nodes 155. Uplink nodes 155 may represent uplink receive points that are configured for reception of uplink transmissions from UEs 115 (e.g., via a communication link 125) but may not be configured for transmission of downlink transmissions to UEs 115. The uplink nodes 155 may communicate or forward received uplink transmissions to an associated base station 105, such as via a backhaul link 120. In some cases, a UE 115 and a base station 105 may communicate in the uplink via an SUL carrier.

As part of where a UE 115 communicates with a base station 105 in the uplink via an uplink node 155 or via an SUL carrier, the UE 115 may transmit one or more SRSs to enable the base station 105 to, for example, estimate a channel or for beam management purposes. The SRS transmissions may be aperiodic, semi-periodic, or periodic. In some examples, the SRSs may include a large number of SRS symbols that exceed a single slot. However, for aperiodic SRS transmissions (e.g., triggered by DCI), all SRS resources within a given SRS resource set may be configured to be transmitted in a same slot. Additionally, multiple SRS resource sets may be configured for beam management; however, the multiple SRS resource sets may not be used for a one-shot of beam management because there is no linking or relationship between them in terms of using same or different transmit beams.

Wireless communications system 100 may support techniques for enabling SRS resource sets to span multiple TTIs (e.g., slots). For example, an aperiodic SRS resource set may be triggered by a DCI such that SRS resources within the SRS resource set span more than one slot. To support the SRS resource set spanning more than one slot, slot offsets between receiving the DCI triggering the aperiodic SRS resource set and transmitting each SRS resource of the aperiodic SRS resource set may be configured per SRS resource instead of per SRS resource set. Additionally or alternatively, the slot offsets may be configured as a vector for the SRS resource set, where each element of the vector corresponds to one SRS resource within the SRS resource set. Additionally, the techniques described herein may support two or more SRS resource sets that are linked or associated with each other when the two or more SRS resource sets are both configured for beam management. Based on the linkage/association, a UE 115 may determine a transmit beam for each SRS resource across the two or more linked SRS resource sets.

Figure 2:
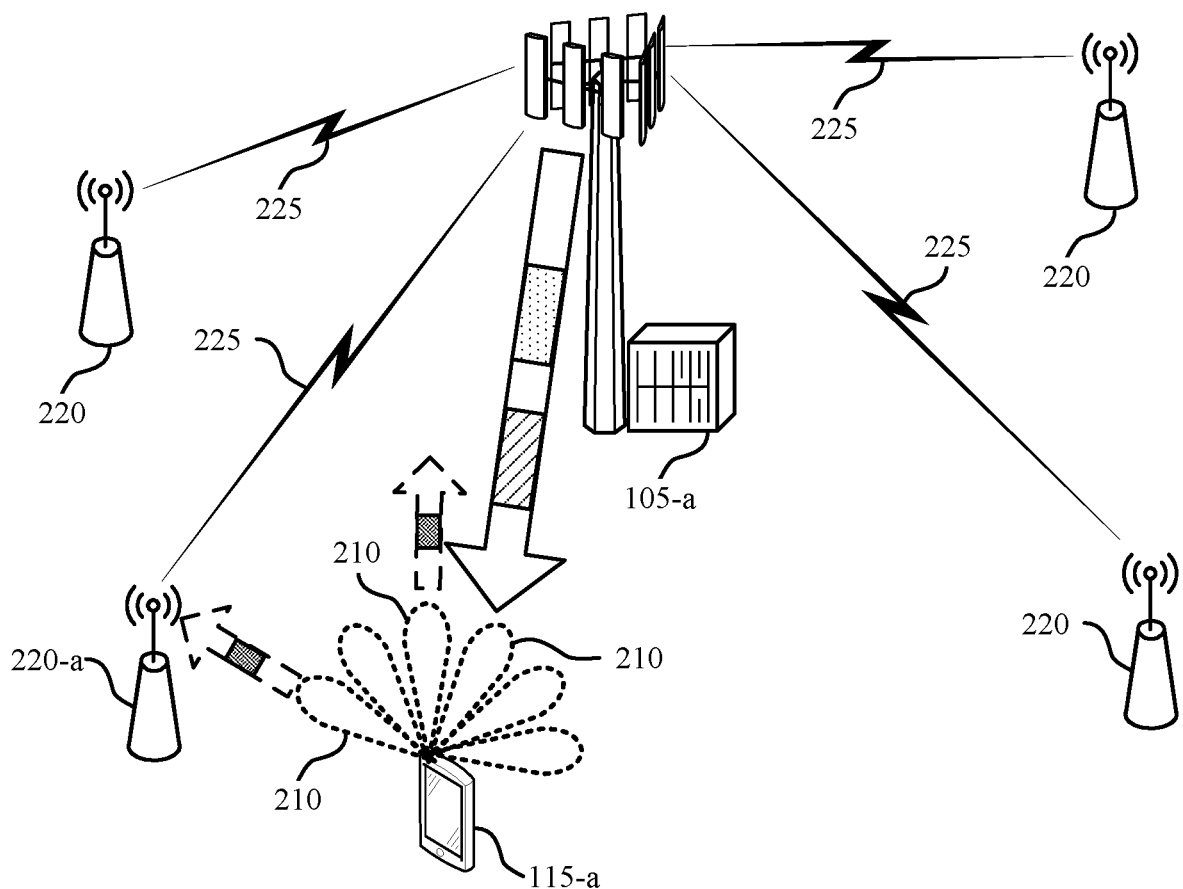
FIG. 2 illustrates an example of a wireless communications system that supports SRS resource sets across multiple slots in accordance with aspects of the present disclosure.

FIG. 2 illustrates an example of a wireless communications system 200 that supports SRS resource sets across multiple slots in accordance with aspects of the present disclosure. In some examples, wireless communications system 200 may implement aspects of or may be implemented by aspects of wireless communications system 100. For example, wireless communications system 200 may include a UE 115-a and a base station 105-a, which may be examples of corresponding devices as described with reference to FIG. 1. In some cases, wireless communications system 200 may also include one or more uplink nodes 220, which may be examples of an uplink node 155 described with reference to FIG. 1.

As described with reference to FIG. 1, UE 115-a and base station 105-a may communicate using one or more beams (e.g., communication beams, shaped using beamforming techniques). For example, for uplink communications, UE 115-a may use an uplink beam 210 (e.g., uplink transmit beam or transmit beam) for transmitting information or data to base station 105-a, and base station 105-a may use a receive beam (e.g., uplink receive beam) to receive the transmitted information or data. In the uplink, UE 115-a may transmit one or more SRS 215 to base station 105-a, where an applicability or usage of the SRS 215 (e.g., of a corresponding SRS resource set) may be configured by base station 105-a (e.g., using a higher layer parameter, such as a usage parameter within an SRS-ResourceSet configuration) and may, for example, be indicated by base station 105-*a* to UE 115-*a*.

For example, base station 105-*a* may configure a usage of an SRS resource set to be for beam management, codebook, non-codebook, or antenna switching, among other examples. In some cases, each SRS resource set may be configured (e.g., by base station 105-*a*) with up to 16 SRS resources, and each SRS resource set may include aperiodic, semi-persistent, or periodic SRS resources. If usage of an SRS resource set is set to be for beam management (e.g., set to beamManagement), only one SRS resource in each SRS resource set may be used for SRS transmission at a time (e.g., at a given time instant), while SRS resources in different SRS resource sets with a same time domain behavior (e.g., and in a same BWP) may be used for SRS transmission simultaneously.

An uplink beam 210 for SRS transmission may be configured (e.g., by base station 105-*a*), for example, by pointing to or indicating a reference signal for the uplink beam 210 (e.g., may include spatial relationship information for each SRS 215, such as by using SRS-SpatialRelationInfo). For example, the configuration of the SRS resource set may indicate a synchronization signal block (SSB) index, a channel state information reference signal (CSI-RS) resource identifier (ID), or a combination thereof, for SRS resources of the SRS resource set. In such cases, UE 115-*a* may transmit an SRS 215, in an indicated SRS resource, using a same spatial domain transmission filter (e.g., for beamforming) used for reception of the corresponding, indicated CSI-RS or SSB (e.g., synchronization signal and/or physical broadcast channel (PBCH) block). For example, if the SRS resource set configuration indicates an SSB index or a CSI-RS ID corresponding to a downlink, receive beam, UE 115-*a* may use a spatial domain filter that corresponds to that receive beam for transmitting the associated SRS 215.

Additionally or alternatively, the configuration of the SRS resource set may indicate an associated SRS resource ID for each SRS resource of the SRS resource set (e.g., to indicate a corresponding uplink beam 210 for each resource). In such cases, UE 115-*a* may transmit an SRS 215, in an indicated SRS resource, using a same spatial domain transmission filter used for transmission of the corresponding, indicated SRS. The configuration of the SRS resource set may, in some cases, include a transmission configuration indicator (TCI) state for the SRS resources of the SRS resource set, which may have a similar functionality as the spatial relationship information (e.g., may indicate corresponding uplink beams 210 for the SRS resources).

In some examples, when transmitting an SRS 215, UE 115-*a* may transmit the SRS 215 aperiodically. For example, base station 105-*a* may trigger an aperiodic SRS resource set for UE 115-*a* to transmit by transmitting a downlink DCI (e.g., DCI format 1_1 or 1_2), an uplink DCI (e.g., DCI format 0_1 or 0_2), or a group-common DCI (e.g., DCI format 2_3) to UE 115-*a*. In one of these types of DCIs, base station 105-*a* may include an SRS request field that indicates one or more SRS resource sets for UE 115-*a* to transmit. A mapping between SRS resource sets and codepoints of the SRS request field (e.g., '01', '10', '11', etc.) may be given as part of an aperiodic SRS resource trigger parameter (e.g., parameter aperiodicSRS-ResourceTrigger) or an aperiodic SRS resource trigger list parameter (e.g., parameter aperiodicSRS-ResourceTriggerList) configured for each of the SRS resource sets. UE 115-*a* may then transmit SRS resources in the indicated SRS resource set(s) after a slot offset configured for the SRS resource set(s) after a slot in which a DCI is received activating the aperiodic SRS. In some cases, UE 115-*a* may transmit all SRS resources in a given SRS resource set in a same slot.

In some cases, UE 115-*a* and base station 105-*a* may communicate in the uplink via one or more uplink nodes 220 (e.g., in an uplink dense deployment scenario). In such cases, UE 115-*a* may transmit uplink signals and/or channels to an uplink receive point, which may be represented by an uplink node 220 (e.g., uplink node 220-*a*). The uplink nodes 220 may be connected to base station 105-*a* (e.g., a macro node) via backhaul links 225 (e.g., wired or wireless links, which may be examples of a backhaul link 120 described with reference to FIG. 1), such that one or more uplink nodes 220 may receive the uplink signals and/or channels from UE 115-*a* and forward associated uplink data or uplink information to base station 105-*a* (e.g., transmit an indication of the uplink data or information, such as via the backhaul link 225). Downlink signals and/or channels may be transmitted to UE 115-*a* from base station 105-*a* (e.g., a macro node, serving cell, serving base station 105), which may represent a different communication node (e.g., at a different location) than any uplink nodes 220 used for uplink communications.

An uplink dense deployment scenario as described herein may improve uplink coverage and/or capacity. For example, using one or more uplink nodes 220 for communications between UE 115-*a* and base station 105-*a* may reduce uplink pathloss (e.g., among other examples). The reduction in pathloss may increase uplink communication speed and throughput, which may in turn reduce a bottlenecking effect for the uplink communications (e.g., as compared to downlink communications). Additionally or alternatively, uplink dense deployment may reduce deployment cost and/or complexity for network entities (e.g., for uplink nodes 220), while increasing coverage, because the uplink nodes 220 may not be configured to transmit downlink signals or perform configurations. For example, each uplink node 220 may be configured to receive uplink signals (e.g., from UE 115-*a*) and send the uplink signals to base station 105-*a* (e.g., with or without some processing).

In some cases, UE 115-*a* and base station 105-*a* may communicate in the uplink via an SUL carrier. In such cases, UE 115-*a* may be configured with two uplink carriers for one downlink carrier of a same serving cell, where uplink transmissions on the two uplink carriers may not be simultaneous (e.g., may never be simultaneous). One of the uplink carriers may be configured as SUL (e.g., such that the other uplink carrier may be a non-SUL or normal uplink (NUL) carrier), and UE 115-*a* may choose which uplink carrier to use for uplink transmissions. In one example, UE 115-*a* may be configured with a TDD band (e.g., TDD uplink carrier) and SUL carrier, such that UE 115-*a* may transmit uplink information on either the TDD band (e.g., non-SUL or NUL carrier) or on the SUL carrier.

In cases where UE 115-*a* communicates with base station 105-*a* in the uplink via an uplink node 220 (e.g., uplink node 220-*a*), uplink transmit and receive beams 210 may be associated with the uplink node 220 (e.g., and not with base station 105-*a*). Similarly, in cases where UE 115-*a* communicates with base station 105-*a* using an SUL carrier, uplink beams 210 and receive beams for the SUL carrier may not be associated with any corresponding beams for the associated downlink carrier. As such, when UE 115-*a* communicates in the uplink via an uplink node 220, or via an SUL carrier, a beam correspondence may not exist between downlink beams and the uplink beams 210 (e.g., for use in uplink beam management). A downlink reference signal (e.g., CSI-RS and/or SSB) may therefore not be used to indicate an uplink beam 210 (e.g., via spatial relation information), for example, because the uplink beams 210 and the downlink beams may not correspond to each other in these communication scenarios.

In such cases (e.g., where a correspondence does not exist between uplink beams 210 and downlink beams), uplink beam management (e.g., performing transmit and/or receive beam adjustment) may be performed based on SRS. For example, the SRS resource set configuration may indicate uplink beams 210 for the SRS resources of the set by indicating SRS associated with the uplink beams 210. Performing receive beam adjustment may include fixing a transmit beam at UE 115-a and adjusting receive beams for different SRSs at base station 105-a (e.g., at an uplink node 220 communicating with base station 105-a). Similarly, performing transmit beam adjustment may include adjusting uplink beams 210 for different SRS at UE 115-a, such that base station 105-a may select a best transmit beam (e.g., a beam resulting in a highest signal quality) for UE 115-a to use for subsequent communications. However, in some cases, an SRS resource set configuration for uplink beam management that is based on SRS (e.g., previously transmitted SRS) may fail to distinguish between receive beam adjustment at base station 105-a and transmit beam adjustment at UE 115-a (e.g., may fail to distinguish between receive and transmit beam adjustment within resources of the SRS resource set).

In some cases, a closed loop power control adjustment (e.g., a transmit power control (TPC) command) may be applied at a beginning of each SRS resource within an SRS resource set (e.g., if a closed loop power control adjustment is the same for SRS and for a physical uplink shared channel (PUSCH)), which may result in different transmit powers for different SRS 215. As such, UE 115-a may not maintain a fixed transmit power for one instance of transmit and/or receive beam adjustment (e.g., transmit and/or receive beam sweeping) across SRS resources within an SRS resource set, which may result in skewed results of the transmit and/or receive beam adjustment. For example, base station 105-a may be unable to select a best transmit beam or receive beam if transmit powers differ across SRS resources within an SRS resource set, because a signaling quality of the beams may be affected by the different power levels.

When an SRS resource set is used for beam management, the SRS resources may not overlap in the time domain. This constraint for the SRS resources not overlapping in time is due to the fact that for both transmit beam switching (e.g., at UE 115-a) as well as receive beam switching (e.g., at base station 105-a) different analogue beams may be needed, and two SRS resources may not be transmitted or received simultaneously. In addition, a gap may be needed between different SRS resources (e.g., especially for higher bands). Because the SRS resource do not overlap in time an amount of OFDM symbols may be larger than a slot duration across all SRS resources within the SRS resource set (e.g., the OFDM symbols needed for all the SRS resources may exceed the slot duration). As an example, an SRS resource set may include four (4) SRS resources with each SRS resource including four (4) symbols, resulting in a total of 16 OFDM symbols, which exceeds a slot duration (e.g., a slot duration may include 14 OFDM symbols). In another example, an SRS resource set may include 16 SRS resources with each SRS resource including one (1) symbol, where four (4) transmit beams are used overall (e.g., four (4) SRS resources transmitted with a same transmit beam) and one (1) symbol gap configured or needed for the transmit beam switching, resulting in 19 OFDM symbols.

However, for aperiodic SRS transmission (e.g., triggered by DCI), all SRS resources within a given SRS resource set are to be transmitted in a same slot. This constraint for all SRS resources of an SRS resource set to be transmitted in the same slot is assumed because a configured time domain property of aperiodic SRS resources includes a position within a slot (e.g., start position within a slot and number of symbols) and a slot offset that is configured as part of the SRS resource set as a whole (e.g., common to all SRS resources). For periodic or semi-persistent SRS resources, a configured time domain property may also include a periodicity and slot offset (e.g., by configuring different slot offsets for different SRS resources with the SRS resource set, the individual SRS resources can be transmitted in different slots).

As described herein, an aperiodic SRS resource set may be triggered by a DCI such that SRS resources within the SRS resource set span more than one slot. To support the SRS resource set spanning more than one slot, slot offsets between receiving the DCI triggering the aperiodic SRS resource set and transmitting each SRS resource of the aperiodic SRS resource set may be configured per SRS resource instead of per SRS resource set. The slot offsets may be configured as a vector for the SRS resource set, where each element of the vector corresponds to one SRS resource within the SRS resource set. In some examples, the slot offsets for each SRS resource may be based on a single reference slot, where each SRS resource is transmitted in respective "available slots" after the reference slot (e.g., the "available slot" is a slot in which there are enough uplink or flexible symbol(s) for time-domain location(s) for each SRS resource in the SRS resource set).

For example, base station 105-a may transmit control signaling 205 (e.g., DCI) to UE 115-a that triggers UE 115-a to transmit one or more SRSs 215 of an SRS resource set (e.g., directly to base station 105-a, via an SUL, via an uplink node 220, etc.), where the SRS resource set spans multiple TTIs (e.g., slots). Additionally, base station 105-a may transmit configuration information 230 to UE 115-a that includes timing information for transmission of the one or more SRSs 215 relative to a timing of receipt of the control signal. Subsequently, UE 115-a may then transmit the one or more SRSs 215 in corresponding TTIs of the multiple TTIs based on the configuration information. For example, the configuration information may include respective offset values for each SRS resource of the SRS resource set to indicate in which TTIs UE 115-a is to transmit the one or more SRSs 215 (e.g., described with reference to FIG. 3). Additionally or alternatively, the configuration information may include a vector of offset values for each SRS resource of the SRS resource set to indicate in which TTIs UE 115-a is to transmit the one or more SRSs 215 (e.g., also described with reference to FIG. 3). In some examples, UE 115-a may determine the TTIs for transmitting each SRS resource of the SRS resource set based on a reference TTI (e.g., described with reference to FIG. 4).

Figure 3:
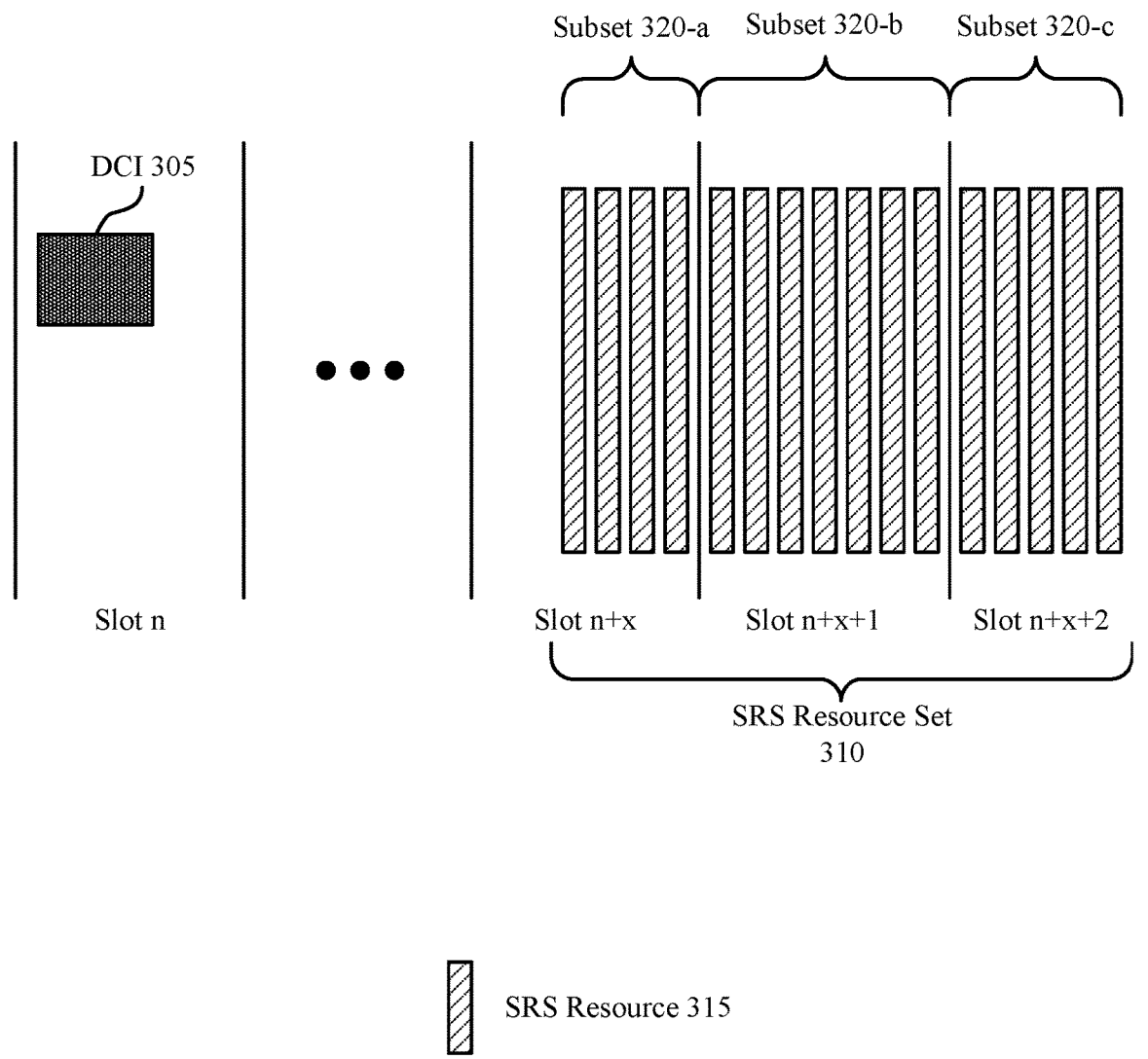
FIG. 3 illustrates an example of a slot offset configuration that supports SRS resource sets across multiple slots in accordance with aspects of the present disclosure.

FIG. 3 illustrates an example of a slot offset configuration 300 that supports SRS resource sets across multiple slots in accordance with aspects of the present disclosure. Slot offset configuration 300 may implement aspects of or may be implemented by aspects of wireless communications system 100, wireless communications 200, or both. For example, a UE 115 may use slot offset configuration 300 to transmit one or more SRSs that span multiple slots (e.g., TTIs). As described with reference to FIG. 2, the techniques described herein may support an SRS resource set 310 (e.g., aperiodic SRS resource set) that can be triggered by a DCI 305 such that SRS resources 315 within the SRS resource set 310 span more than one slot.

In some examples, a slot offset may be configured (e.g., by a base station in RRC signaling) per SRS resource 315 (e.g., aperiodic SRS resource) instead of per SRS resource set 310. For example, if a slot offset for a given SRS resource 315 is configured as 'x' slots and DCI 305 triggering SRS resource set 310 that includes the given SRS resource 315 is received in slot 'n', the UE 115 may transmit the SRS resource 315 in a slot 'n+x'. As shown in the example of FIG. 3, SRS resource set 310 may include 16 SRS resources 315 (e.g., each with two (2) OFDM symbols) that is triggered by DCI 305 in slot 'n'. Accordingly, SRS resources 315 in a first subset 320-*a* of SRS resource set 310 may be configured to be transmitted in slot 'n+x', SRS resources 315 in a second subset 320-*b* of SRS resource set 310 may be configured to be transmitted in slot 'n+x+1', and SRS resources 315 in a third subset 320-*c* of SRS resource set 310 may be configured to be transmitted in slot 'n+x+2'. That is, each SRS resource 315 in SRS resource set 310 may be configured with a particular slot for transmission relative to when DCI 305 is received.

In some cases, an overall slot offset may still be configured for SRS resource set 310 (e.g., a legacy slot offset). If the slot offset is configured for SRS resource set 310, the UE 115 may ignore the slot offset (e.g., the slot offset for SRS resource set 310 is overridden by the slot offset of individual SRS resources 315 within SRS resource set 310). Additionally or alternatively, the UE 115 may apply the slot offset configured for SRS resource set 310 to SRS resources 315 that belong to this SRS resource set 310 but are not configured with a separate slot offset. For example, some SRS resources 315 may appear in multiple SRS resource sets 310, and a different slot offset may be needed depending on the SRS resource set 310. For these SRS resources 315, the UE 115 may still use the slot offset configured per SRS resource set 310. For other SRS resources 315, the network may configure the slot offsets per SRS resource 315, and hence, the UE 115 may not apply the slot offset configured for the SRS resource set 310 for these other SRS resources 315.

Rather than configure slot offsets for each SRS resource 315, the slot offsets may be configured (e.g., in RRC signaling) as a vector in SRS resource set 310, where each element of the vector corresponds to one SRS resource 315 within SRS resource set 310. Using the vector in SRS resource set 310 to indicate slot offsets for the SRS resources 315 in SRS resource set 310 may have more flexibility because the slot offset is configured per SRS resource 315 and per SRS resource set 310. The flexibility may be used when some SRS resources 315 appear in multiple SRS resource sets 310. With the vector indicating the slot offsets, the UE 115 may ignore the slot offset configured for SRS resource set 310 (e.g., the single value is replaced by a vector of values). Additionally or alternatively, the UE 115 may still use the slot offset configured for SRS resource set 310 and may add the slot offset to each individual member of the vector.

In the example of FIG. 3, a slot offset for SRS resource set 310 (e.g., legacy slot offset, such as a single value configured for SRS resource set 310) may be 'x' slots (e.g., 'x' slots after DCI 305 is received in slot 'n'), and the new parameter of a vector of slot offset values may be configured for SRS resource set 310 as [0,0,0,0,1,1,1,1,1,1,1,2,2,2,2,2] corresponding to the 16 SRS resources 315 in SRS resource set 310. Accordingly, the first four (4) SRS resources 315 of SRS resource set 310 (e.g., first subset 320-*a*) may have slot offsets of '0' based on the vector (e.g., transmitted in slot 'n+x+0' or slot 'n+x'), the next seven (7) SRS resources 315 of SRS resource set 310 (e.g., second subset 320-*b*) may have slot offsets of '1' based on the vector (e.g., transmitted in slot 'n+x+1'), and the last five (5) SRS resources 315 of SRS resource set 310 (e.g., third subset 320-*b*) may have slot offsets of '2' based on the vector (e.g., transmitted in slot 'n+x+2'). That is, SRS resource set 310 may be configured with a slot offset 'x' (e.g., single value applied to all SRS resources 315 within SRS resource set 310) and a vector of additional slot offset values compared to the common value of 'x' as [0,0,0,0,1,1,1,1,1,1,1,2,2,2,2,2] corresponding to the 16 SRS resources 315 within SRS resource set 310.

Figure 4:
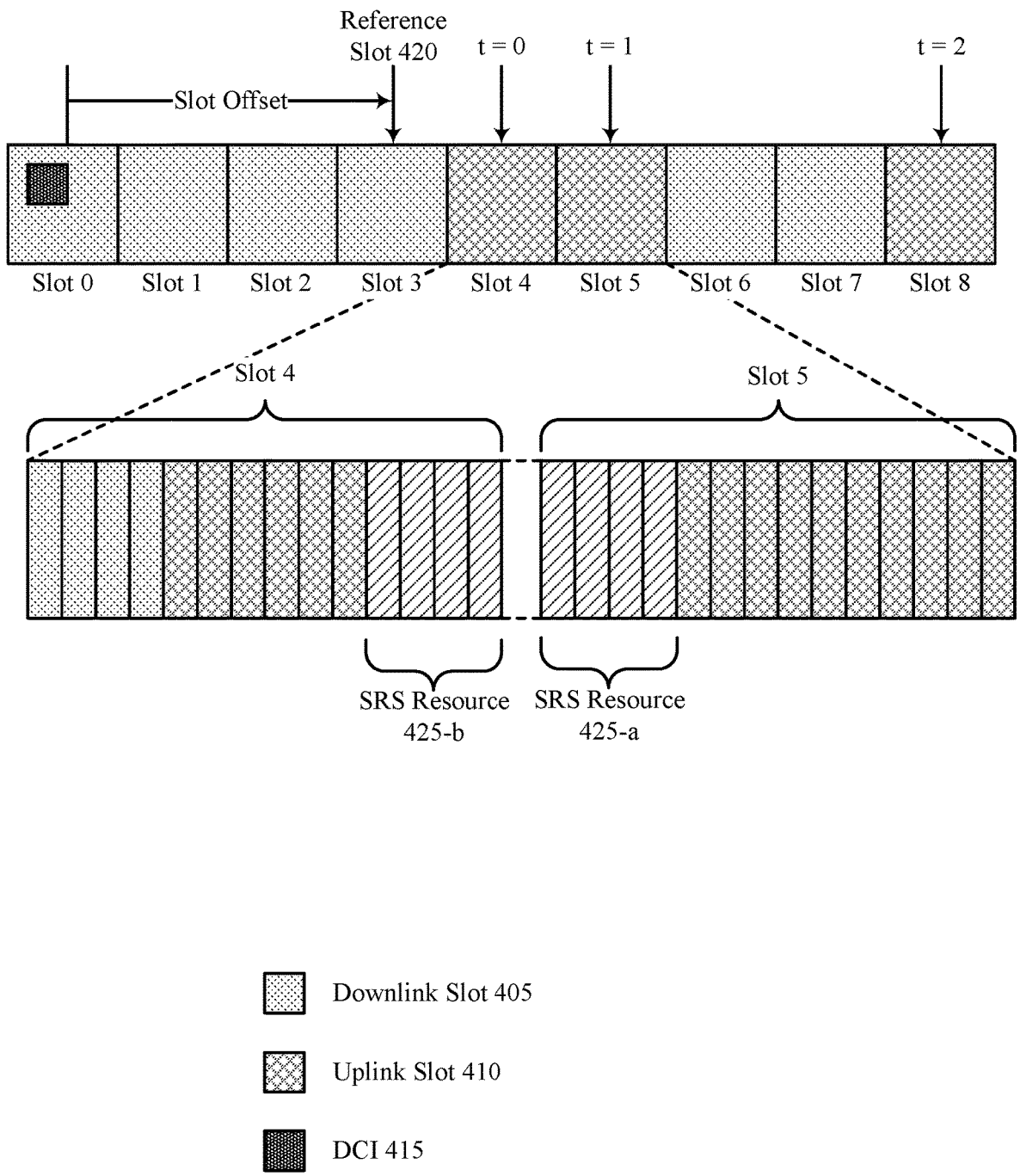
FIGS. 4 and 5 illustrate examples of reference slot configurations that support SRS resource sets across multiple slots in accordance with aspects of the present disclosure.

FIG. 4 illustrates an example of a reference slot configuration 400 that supports SRS resource sets across multiple slots in accordance with aspects of the present disclosure. Reference slot configuration 400 may implement aspects of or may be implemented by aspects of wireless communications system 100, wireless communications 200, or both. For example, a UE 115 may use reference slot configuration 400 to transmit one or more SRSs that span multiple slots (e.g., TTIs). Additionally, reference slot configuration 400 may include one or more downlink slots 405 (e.g., slots configured for downlink communications) and one or more uplink slots 410 (e.g., slots configured for uplink communications). As described with reference to FIG. 2, the techniques described herein may support an SRS resource set (e.g., aperiodic SRS resource set) that can be triggered by a DCI 415 such that SRS resources within the SRS resource set span more than one slot.

In some cases, a more flexible triggering of aperiodic SRS resource set may be used to indicate when and where the UE 115 is to transmit the SRS resource set. For example, a list of 't' values may be configured (e.g., in RRC signaling) for each SRS resource set. The list may contain one value, in which case additional selection of which T value (e.g., by DCI) is not needed. If the list contains more than one value, DCI 415 triggering the SRS resource set may select or indicate a value from the list. The aperiodic SRS resource set (e.g., including all resources within the set) may be transmitted in the (t+1)-th "available slot" counting from a reference slot 420. As described herein, an "available slot" may be a slot in which there are uplink or flexible symbol(s) for the time-domain location(s) for all the SRS resources in the SRS resource set. In some examples, reference slot 420 may be a slot in which DCI 415 is received that triggers the UE 115 to transmit the SRS resource set. Additionally or alternatively, reference slot 420 may be a slot indicated by a slot offset (e.g., legacy triggering offset or legacy slot offset) configured for the SRS resource set.

As described herein, an available slot may be determined per SRS resource 425. For example, the available slot for a given SRS resource 425 may be a slot in which there are a sufficient amount of uplink or flexible symbol(s) for the time-domain location(s) for that SRS resource 425 as opposed to a slot that has sufficient uplink or flexible symbols for the entire SRS resource set. In the example of FIG. 4, the UE 115 may not expect collisions between different SRS resources 425. By not expecting the collisions, the UE 115 may transmit the SRS resources 425 in different slots.

For example, a first SRS resource 425-*a* may be configured with symbols 0-3 of a slot (e.g., the first SRS resource 425-*a* is configured to be transmitted within symbols 0-3 of a slot), and a second SRS resource 425-*b* may be configured with symbols 10-13 of a slot (e.g., the second SRS resource 425-*b* is configured to be transmitted within symbols 10-13 of a slot). Additionally, a T value of zero (0) (e.g., t=0) may be indicated for the SRS resource set (e.g., in RRC and/or DCI). However, the first four (4) symbols of slot 4 may be downlink symbols, and the rest of the symbols may be uplink or flexible symbols, while all symbols of slot 5 may be uplink/flexible symbols. For the first SRS resource 425-a, a (t+1)-th available slot (e.g., after reference slot 420) may be slot 5 because slot 4 is not available in symbols 0-3 (e.g., symbols 0-3 are downlink symbols in slot 4), and as such, the UE 115 may transmit the first SRS resource 425-a in slot 5. For the second SRS resource 425-b, a (t+1)-th available slot (e.g., after reference slot 420) may be slot 4 because symbols 10-13 of slot 4 are uplink symbols, and as such, the UE 115 may transmit the second SRS resource 425-b in slot 4.

In some examples, the value of 't' may be common across all SRS resources 425 in a given SRS resource set, but the determined (t+1)-th available slot may result in different slots for different SRS resources 425 within the SRS resource set due to different determination of available slots as described. The value of T may be indicated by RRC (e.g., when the list includes one value) or by RRC and DCI (e.g., when the list includes more than one value).

Figure 5:
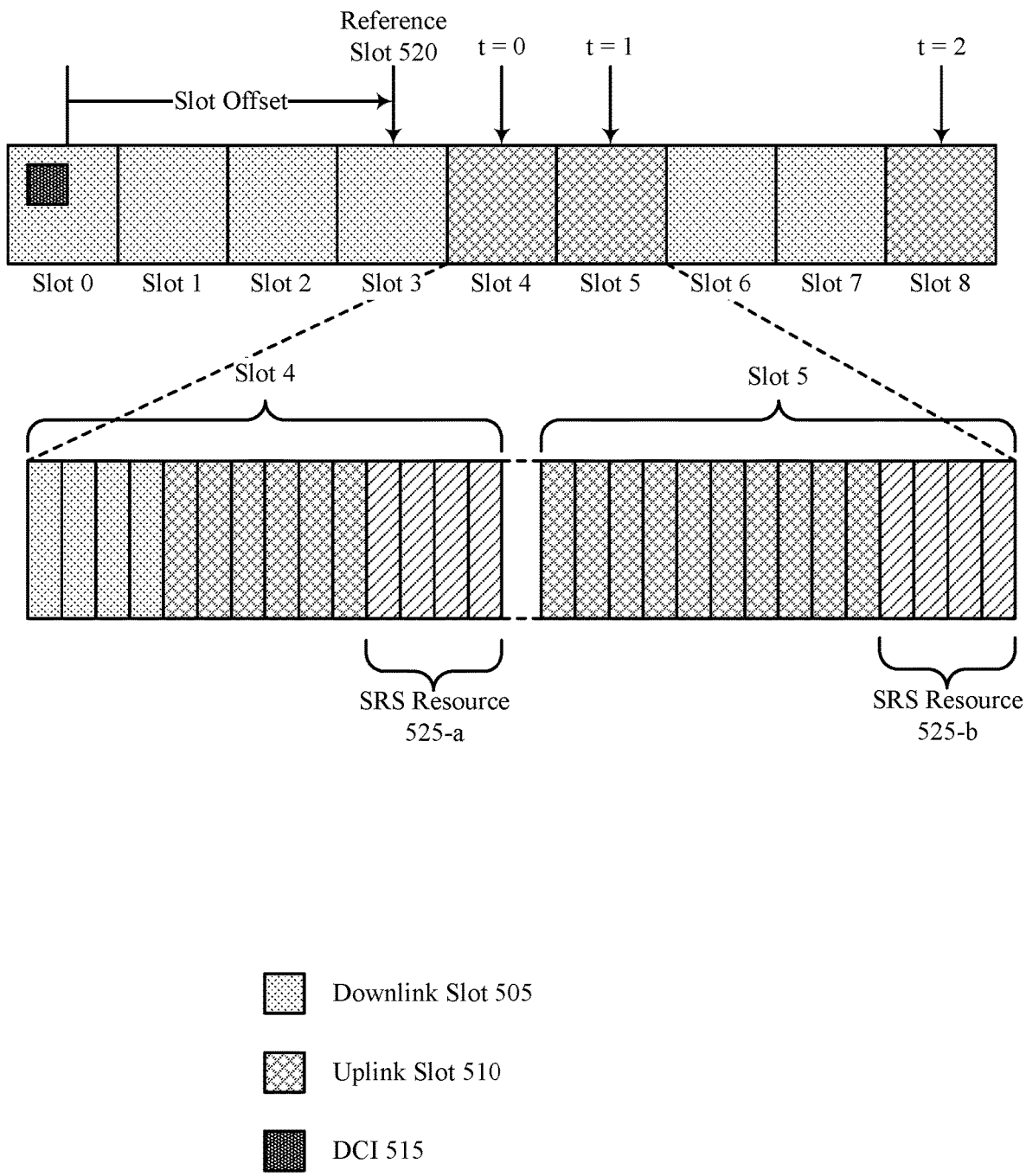

FIG. 5 illustrates an example of a reference slot configuration 500 that supports SRS resource sets across multiple slots in accordance with aspects of the present disclosure. Reference slot configuration 500 may implement aspects of or may be implemented by aspects of wireless communications system 100, wireless communications 200, reference slot configuration 400, or a combination thereof. For example, a UE 115 may use reference slot configuration 500 to transmit one or more SRSs that span multiple slots (e.g., TTIs). Additionally, reference slot configuration 500 may include one or more downlink slots 505 (e.g., slots configured for downlink communications) and one or more uplink slots 510 (e.g., slots configured for uplink communications). As described with reference to FIG. 2, the techniques described herein may support an SRS resource set (e.g., aperiodic SRS resource set) that can be triggered by a DCI 515 such that SRS resources within the SRS resource set span more than one slot Rather than or in addition to not expecting collisions between different SRS resources as described with reference to FIG. 4, the UE 115 may use an order or priority for determination of a (t+1)-th available slot across for an SRS resource 525 within an SRS resource set. If for a first SRS resource 525-a, this use of the order or priority may result in the first SRS resource 525-a being transmitted in a slot 'm'. Then, the determination of (t+1)-th available slot for a second SRS resource 525-b within the SRS resource set takes that into account. That is, if the second SRS resource 525-b is overlapping with the first SRS resource 525-a, then a next slot is considered for the second SRS resource 525-b. If a gap between SRS resources 525 is also needed (e.g., for transmit/receive beam sweeping), the gap may also impact the determination of the (t+1)-th available slot for the second SRS resource 525-b within the set (e.g., symbols for the first SRS resource 525-a and the required symbol gaps become "unavailable" for the second SRS resource 525-b).

In some examples, the ordering/priority may be based on SRS resource IDs among the SRS resources 525 that belong to this SRS resource set, based on an ordering of RRC configurations of the SRS resources 525 within the SRS resource set, or based on both. By using the ordering/priority for determining a slot to transmit a given SRS resource 525, SRS resources 525 in an SRS resource set may overlap, such as overlapping in the time domain alone (e.g., OFDM symbols) for the case of SRS for beam management, resource element (RE) overlapping (e.g., overlap in both time and frequency), RE and cyclic shift overlapping, or a combination thereof. In some cases, these parameters (e.g., OFDM symbols within a slot, REs in frequency, cyclic shift, etc.) may be configured (e.g., via RRC signaling) per SRS resource.

In the example of FIG. 5, both the first SRS resource 525-a and the second SRS resource 525-b may be configured with symbols 10-13, and t=0 is indicated for the SRS resource set (e.g., in RRC and/or DCI). Subsequently, for the first SRS resource 525-a, a (t+1)-th available slot (e.g., after a reference slot 520) may be slot 4. For the second SRS resource 525-b, a (t+1)-th available slot (e.g., after reference slot 520) may be slot 5 because the symbols 10-13 in slot 4 are already occupied by the first SRS resource 525-a (e.g., assuming that the priority/order is the first SRS resource 525-a first and then the second SRS resource 525-b next or after the first SRS resource 525-a).

In some examples, reference slot 520 may be determined for each SRS resource in an SRS resource set separately (e.g., based on the techniques described with reference to FIG. 3, such as individual slot offsets configured and indicated for each SRS resource or a vector of offset values included with the configuration for the SRS resource set), and then the (t+1)-th available slot may be determined for each SRS resource counting from the corresponding reference slot. Additionally, the available slot may be determined per SRS resource (e.g., a slot in which there are uplink or flexible symbol(s) for the time-domain location(s) for that SRS resource alone) based on the techniques described with reference to FIGS. 4 and 5. For example, the value of 't' may be common across all SRS resources in the SRS resource set, but the determined (t+1)-th available slot may result in different slots for different SRS resources within the SRS resource set due to different reference slots for different SRS resources, different determination of available slots, or both. The value of T may be indicated by RRC (e.g., when the list includes one value) or by RRC and DCI (e.g., when the list includes more than one value).

Additionally or alternatively, the list of T values may be configured per SRS resource (e.g., not common to all SRS resources within the set). If each of the lists contains one value, DCI signaling may not be needed. For example, for each SRS resource, a corresponding configured T value may be used to determine a (t+1)-th available slot. If the list for at least one SRS resource contains more than one value, DCI signaling may be needed. The DCI may indicate an i-th member of the list for each of the lists. For example, a list of T values for the first SRS resource 525-a may be {0,1}, and a list of T values for the second SRS resource 525-b may be {0,2}. Accordingly, when DCI 515 indicates a second member of each list, t=1 may be used for the first SRS resource 525-a, and t=2 may be used for the second SRS resource 525-b. In some examples, the size of the list may be restricted to be the same across all lists for the SRS resources 525 within the SRS resource set. Additionally or alternatively, the DCI size may be based on a maximum size across all lists for the SRS resources 525 within the SRS resource set.

In some examples, DCI 515 may separately indicate a member from each list corresponding to different SRS resources 525 within the SRS resource set. For example, a list of T values for the first SRS resource 525-a may be {0,1}, and a list of T values for the second SRS resource 525-b may be {0,2,4}. Accordingly, DCI 515 may indicate a first member for the first SRS resource 525-a (e.g., t=0)

and a third member for the second SRS resource 525-*b* (e.g., t=4). Additionally or alternatively, a list of T vectors may be configured per SRS resource set, where each vector includes T values for each SRS resource 525 in the SRS resource set (e.g., each member of the vector corresponds to one SRS resource). For example, if an SRS resource set has four (4) SRS resources 525, the list of 't' vectors may be configured as {(1,1,2,2), (3,2,3,1)}. If the list includes one vector, DCI signaling may not be needed to choose from the list. Otherwise, DCI 515 may indicate one vector from the list of vectors, and each element of the indicated vector is applied to a corresponding SRS resource 525 from the SRS resource set.

Figure 6:
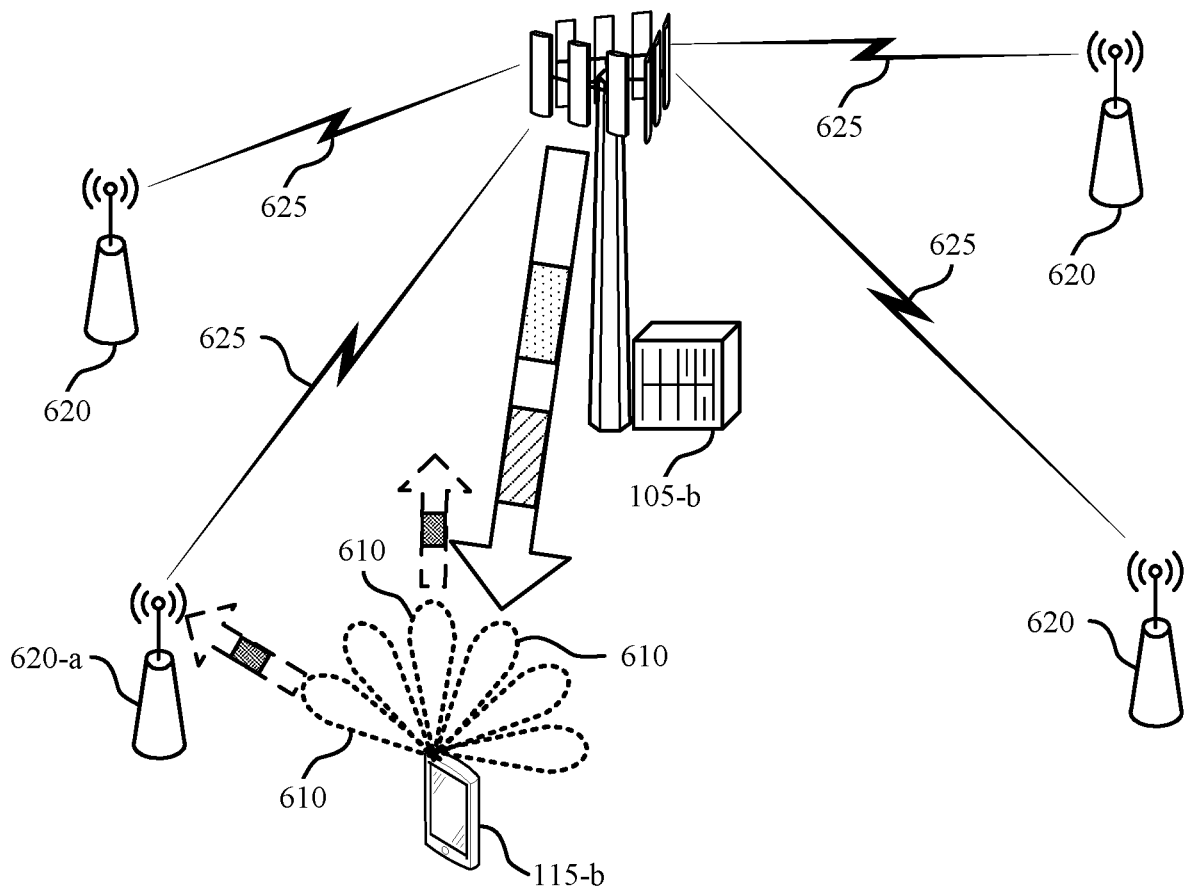
FIG. 6 illustrates an example of a wireless communications system that supports SRS resource sets across multiple slots in accordance with aspects of the present disclosure.

FIG. 6 illustrates an example of a wireless communications system 600 that supports SRS resource sets across multiple slots in accordance with aspects of the present disclosure. In some examples, wireless communications system 600 may implement aspects of or may be implemented by aspects of wireless communications system 100, wireless communications system 200, or both. For example, wireless communications system 600 may include a UE 115-*b* and a base station 105-*b*, which may be examples of corresponding devices as described with reference to FIGS. 1-5. In some cases, wireless communications system 600 may also include one or more uplink nodes 620, which may be examples of an uplink node described with reference to FIGS. 1 and 2.

As described with reference to FIGS. 1 and 2, UE 115-*b* and base station 105-*b* may communicate using one or more beams (e.g., communication beams, shaped using beamforming techniques). For example, for uplink communications, UE 115-*a* may use an uplink beam 610 (e.g., uplink transmit beam or transmit beam) for transmitting information or data to base station 105-*b*, and base station 105-*b* may use a receive beam (e.g., uplink receive beam) to receive the transmitted information or data. In the uplink, UE 115-*b* may transmit one or more SRS to base station 105-*b*, where an applicability or usage of the SRS (e.g., of a corresponding SRS resource set) may be configured by base station 105-*b* (e.g., using a higher layer parameter, such as a usage parameter within an SRS-ResourceSet configuration) and may, for example, be indicated by base station 105-*b* to UE 115-*b*.

For example, base station 105-*b* may configure a usage of an SRS resource set to be for beam management, codebook, non-codebook, or antenna switching, among other examples. In some cases, each SRS resource set may be configured (e.g., by base station 105-*b*) with up to 16 SRS resources, and each SRS resource set may include aperiodic, semi-persistent, or periodic SRS resources. If usage of an SRS resource set is set to be for beam management (e.g., set to beamManagement), only one SRS resource in each SRS resource set may be used for SRS transmission at a time (e.g., at a given time instant), while SRS resources in different SRS resource sets with a same time domain behavior (e.g., and in a same BWP) may be used for SRS transmission simultaneously.

An uplink beam 610 for SRS transmission may be configured (e.g., by base station 105-*b*), for example, by pointing to or indicating a reference signal for the uplink beam 610 (e.g., may include spatial relationship information for each SRS 615, such as by using SRS-SpatialRelationInfo). For example, the configuration of the SRS resource set may indicate an SSB index, a CSI-RS resource ID, or a combination thereof, for SRS resources of the SRS resource set. In such cases, UE 115-*b* may transmit an SRS 615, in an indicated SRS resource, using a same spatial domain transmission filter (e.g., for beamforming) used for reception of the corresponding, indicated CSI-RS or SSB (e.g., synchronization signal and/or PBCH block). For example, if the SRS resource set configuration indicates an SSB index or a CSI-RS ID corresponding to a downlink, receive beam, UE 115-*b* may use a spatial domain filter that corresponds to that receive beam for transmitting the associated SRS 615.

Additionally or alternatively, the configuration of the SRS resource set may indicate an associated SRS resource ID for each SRS resource of the SRS resource set (e.g., to indicate a corresponding uplink beam 610 for each resource). In such cases, UE 115-*b* may transmit an SRS 615, in an indicated SRS resource, using a same spatial domain transmission filter used for transmission of the corresponding, indicated SRS. The configuration of the SRS resource set may, in some cases, include a TCI state for the SRS resources of the SRS resource set, which may have a similar functionality as the spatial relationship information (e.g., may indicate corresponding uplink beams 610 for the SRS resources).

In some examples, when transmitting an SRS 615, UE 115-*a* may transmit the SRS 615 aperiodically. For example, base station 105-*b* may trigger an aperiodic SRS resource set for UE 115-*b* to transmit by transmitting a downlink DCI (e.g., DCI format 1_1 or 1_2), an uplink DCI (e.g., DCI format 0_1 or 0_2), or a group-common DCI (e.g., DCI format 2_3) to UE 115-*b*. In one of these types of DCIs, base station 105-*b* may include an SRS request field that indicates one or more SRS resource sets for UE 115-*b* to transmit. A mapping between SRS resource sets and codepoints of the SRS request field (e.g., '01', '10', '11', etc.) may be given as part of an aperiodic SRS resource trigger parameter (e.g., parameter aperiodicSRS-ResourceTrigger) or an aperiodic SRS resource trigger list parameter (e.g., parameter aperiodicSRS-ResourceTriggerList) configured for each of the SRS resource sets. UE 115-*b* may then transmit SRS resources in the indicated SRS resource set(s) after a slot offset configured for the SRS resource set(s) after a slot in which a DCI is received activating the aperiodic SRS. In some cases, UE 115-*b* may transmit all SRS resources in a given SRS resource set in a same slot.

In some cases, UE 115-*b* and base station 105-*b* may communicate in the uplink via one or more uplink nodes 620 (e.g., in an uplink dense deployment scenario). In such cases, UE 115-*a* may transmit uplink signals and/or channels to an uplink receive point, which may be represented by an uplink node 620 (e.g., uplink node 620-*a*). The uplink nodes 620 may be connected to base station 105-*b* (e.g., a macro node) via backhaul links 625 (e.g., wired or wireless links, which may be examples of a backhaul link 120 described with reference to FIG. 1), such that one or more uplink nodes 620 may receive the uplink signals and/or channels from UE 115-*b* and forward associated uplink data or uplink information to base station 105-*b* (e.g., transmit an indication of the uplink data or information, such as via the backhaul link 625). Downlink signals and/or channels may be transmitted to UE 115-*b* from base station 105-*b* (e.g., a macro node, serving cell, serving base station 105), which may represent a different communication node (e.g., at a different location) than any uplink nodes 620 used for uplink communications.

An uplink dense deployment scenario as described herein may improve uplink coverage and/or capacity. For example, using one or more uplink nodes 620 for communications between UE 115-*b* and base station 105-*b* may reduce uplink pathloss (e.g., among other examples). The reduction in pathloss may increase uplink communication speed and throughput, which may in turn reduce a bottlenecking effect for the uplink communications (e.g., as compared to downlink communications). Additionally or alternatively, uplink dense deployment may reduce deployment cost and/or complexity for network entities (e.g., for uplink nodes 620), while increasing coverage, because the uplink nodes 620 may not be configured to transmit downlink signals or perform configurations. For example, each uplink node 620 may be configured to receive uplink signals (e.g., from UE 115-*b*) and send the uplink signals to base station 105-*b* (e.g., with or without some processing).

In some cases, UE 115-*b* and base station 105-*b* may communicate in the uplink via an SUL carrier. In such cases, UE 115-*b* may be configured with two uplink carriers for one downlink carrier of a same serving cell, where uplink transmissions on the two uplink carriers may not be simultaneous (e.g., may never be simultaneous). One of the uplink carriers may be configured as SUL (e.g., such that the other uplink carrier may be a non-SUL or NUL carrier), and UE 115-*b* may choose which uplink carrier to use for uplink transmissions. In one example, UE 115-*b* may be configured with a TDD band (e.g., TDD uplink carrier) and SUL carrier, such that UE 115-*b* may transmit uplink information on either the TDD band (e.g., non-SUL or NUL carrier) or on the SUL carrier.

In cases where UE 115-*b* communicates with base station 105-*b* in the uplink via an uplink node 620 (e.g., uplink node 620-*a*), uplink transmit and receive beams 610 may be associated with the uplink node 620 (e.g., and not with base station 105-*b*). Similarly, in cases where UE 115-*b* communicates with base station 105-*b* using an SUL carrier, uplink beams 610 and receive beams for the SUL carrier may not be associated with any corresponding beams for the associated downlink carrier. As such, when UE 115-*b* communicates in the uplink via an uplink node 620, or via an SUL carrier, a beam correspondence may not exist between downlink beams and the uplink beams 610 (e.g., for use in uplink beam management). A downlink reference signal (e.g., CSI-RS and/or SSB) may therefore not be used to indicate an uplink beam 610 (e.g., via spatial relation information), for example, because the uplink beams 610 and the downlink beams may not correspond to each other in these communication scenarios.

In such cases (e.g., where a correspondence does not exist between uplink beams 610 and downlink beams), uplink beam management (e.g., performing transmit and/or receive beam adjustment) may be performed based on SRS. For example, the SRS resource set configuration may indicate uplink beams 610 for the SRS resources of the set by indicating SRS associated with the uplink beams 610. Performing receive beam adjustment may include fixing a transmit beam at UE 115-*b* and adjusting receive beams for different SRSs at base station 105-*b* (e.g., at an uplink node 620 communicating with base station 105-*b*). Similarly, performing transmit beam adjustment may include adjusting uplink beams 610 for different SRS at UE 115-*b*, such that base station 105-*b* may select a best transmit beam (e.g., a beam resulting in a highest signal quality) for UE 115-*b* to use for subsequent communications. However, in some cases, an SRS resource set configuration for uplink beam management that is based on SRS (e.g., previously transmitted SRS) may fail to distinguish between receive beam adjustment at base station 105-*b* and transmit beam adjustment at UE 115-*b* (e.g., may fail to distinguish between receive and transmit beam adjustment within resources of the SRS resource set).

In some cases, a closed loop power control adjustment (e.g., a TPC command) may be applied at a beginning of each SRS resource within an SRS resource set (e.g., if a closed loop power control adjustment is the same for SRS and for a PUSCH), which may result in different transmit powers for different SRS 615. As such, UE 115-*b* may not maintain a fixed transmit power for one instance of transmit and/or receive beam adjustment (e.g., transmit and/or receive beam sweeping) across SRS resources within an SRS resource set, which may result in skewed results of the transmit and/or receive beam adjustment. For example, base station 105-*b* may be unable to select a best transmit beam or receive beam if transmit powers differ across SRS resources within an SRS resource set, because a signaling quality of the beams may be affected by the different power levels.

For uplink beam management based on SRS, the following may be needed: a receive beam adjustment at the receiver (e.g., base station 105-*b*), where UE 115-*a* fixes the transmit beam and the receiver adjusts the receive beam; a transmit beam adjustment at the transmitter (e.g., UE 115-*b*), where UE 115-*b* uses different transmit beams and base station 105-*b* selects a best transmit beam; or both. When an SRS resource set includes a large number of SRS symbols (e.g., for transmit/receive beam adjustment) across the configured SRS resources, the number of SRS symbols may exceed a slot duration. However, aperiodic SRS resource set triggering (e.g., by DCI) may include all SRS resources within an SRS resource set to be contained in one slot. Hence, using two or more SRS resource sets for one-shot of receive/transmit beam sweeping is useful to be able transmit the SRS in more than one slot. Additionally, using two or more SRS resource sets across more than one slot may increase a flexibility of SRS-based beam management.

In some cases, multiple SRS resource sets may be configured for beam management (e.g., configured with usage=beamManagement). However, these multiple SRS resource sets may not be used for a one-shot of beam management because there is no linking/relationship between the SRS resource sets in terms of using same or different transmit beams, SRS resources in different resource sets may be overlapping in time (e.g., different transmit beams cannot be transmitted and even different receive beams may not be used at the network/base station side in overlapping symbols), and there is no consistency in term of using a same transmit power for all SRS resources across multiple SRS resource sets (e.g., uplink power control parameters, such as alpha, P0, pathloss reference signal (PL-RS), closed loop index, etc., are configured per SRS resource set).

As described herein, two or more SRS resource sets may be linked or associated with each other when the two or more SRS resource sets are configured with a "usage" set to a same value, such as beamManagement. Based on the linkage or association, UE 115-*b* may determine a transmit beam for each SRS resource across the two or more linked SRS resource sets (e.g., this can be further based on a rule). For example, UE 115-*b* to receive control signaling 605 that indicates an SRS beam management configuration that identifies at least a first SRS resource set and a second SRS resource set that are linked together. Accordingly, UE 115-*b* may determine a transmit beam for an SRS resource of the second SRS resource set based on an additional transmit beam for a corresponding SRS resource of the first SRS resource set. Subsequently, UE 115-*b* may transmit the SRS resources of each SRS resource set using the determined transmit beams. In some examples, UE 115-*b* may transmit each SRS resource of a given SRS resource set using a same transmit beam but may use different transmit beams per SRS resource set (e.g., described with reference to FIG. 7A).

Additionally or alternatively, UE 115-*b* may transmit each SRS resource of each SRS resource set via respective different transmit beams, where corresponding SRS resources of each SRS resource set are transmitted with a same transmit beam (e.g., described with reference to FIG. 7B).

Figure 7A:
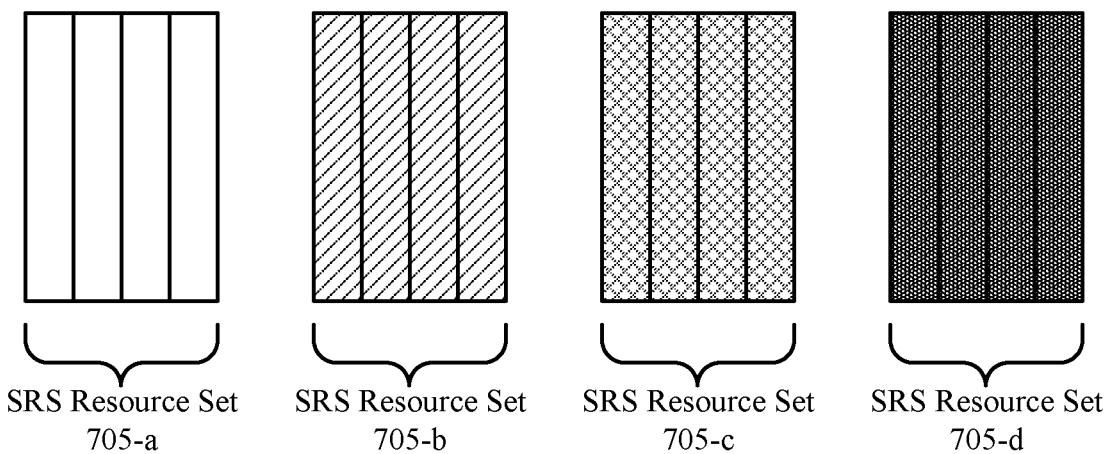
FIGS. 7A and 7B illustrate examples of transmit beam linkages that support SRS resource sets across multiple slots in accordance with aspects of the present disclosure.
Figure 7B:
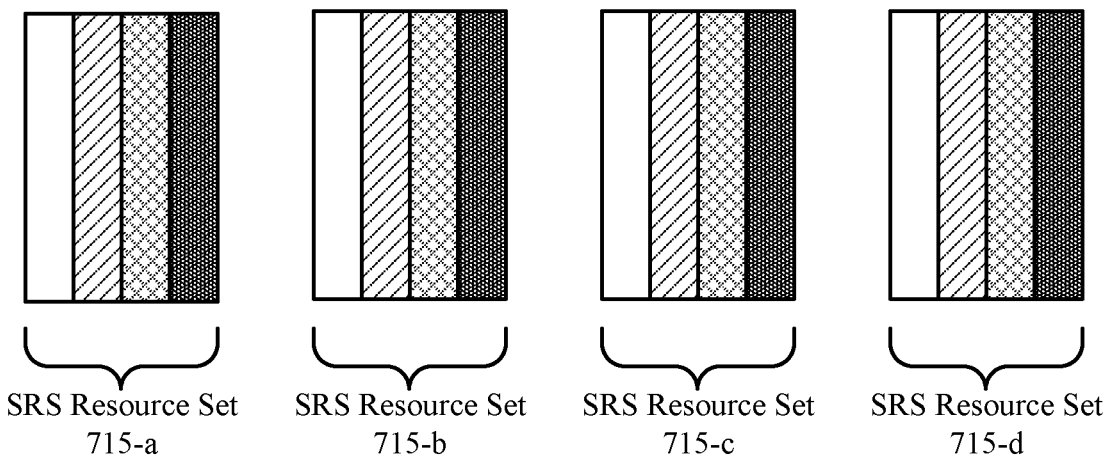

FIGS. 7A and 7B illustrate examples of a transmit beam linkage 700 and a transmit beam linkage 701 that support SRS resource sets across multiple slots in accordance with aspects of the present disclosure. Transmit beam linkage 700 and transmit beam linkage 701 may implement aspects of or may be implemented by aspects of wireless communications system 100, wireless communications system 600, or both. For example, a UE 115 may use transmit beam linkage 700 or transmit beam linkage 701 when transmitting two or more SRS resource sets across multiple slots, where the two or more SRS resource sets are linked together (e.g., based on each SRS resource set having a same "usage" set to beam-Management).

In the example of FIG. 7A, the UE 115 may transmit SRS resources within each of two or more linked SRS resource sets 705 with a same transmit beam 710, while across different SRS resource sets 705, different transmit beams 710 may be used. For example, for a first SRS resource set 705-*a*, the UE 115 may transmit all SRS resources in the first SRS resource set 705-*a* using a first transmit beam 710-*a*. Additionally, the UE 115 may transmit all SRS resources in a second SRS resource set 705-*b* using a second transmit beam 710-*b*, all SRS resources in a third SRS resource set 705-*c* using a third transmit beam 710-*c*, and all SRS resources in a fourth SRS resource set 705-*b* using a fourth transmit beam 710-*d*. In some examples, the SRS resources within each SRS resource set 705 may be used for receive beam sweeping (e.g., at a base station side), and SRS resources across different SRS resource sets 705 may be used for transmit beam sweeping (e.g., at the UE side), where a base station 105 can then select a best transmit beam. Additionally, the two or more SRS resource sets 705 may span multiple slots (e.g., TTIs).

In the example of FIG. 7B, the UE 115 may transmit SRS resources within each of two or more linked SRS resource sets 715 with different transmit beams 710, while an 'i-th' SRS resource of each of the two or more linked SRS resource sets 715 may be transmitted with a same transmit beam 710. For example, for a first SRS resource set 715-*a* that includes four (4) SRS resources, the UE 115 may use the first transmit beam 710-*a* to transmit a first SRS resource of the first SRS resource set 715-*a*, the second transmit beam 710-*b* to transmit a second SRS resource of the first SRS resource set 715-*a*, the third transmit beam 710-*c* to transmit a third SRS resource of the first SRS resource set 715-*a*, and the fourth transmit beam 710-*d* to transmit a fourth SRS resource of the first SRS resource set 715-*a*. Additionally, the UE 115 may use this same order of transmit beams 710 for corresponding SRS resources of a second SRS resource set 715-*b*, a third SRS resource set 715-*c*, and a fourth SRS resource set 715-*d*. In some examples, the 'i-th' SRS resource across different SRS resource sets 715 may be used for receive beam sweeping (e.g., at the base station side), and SRS resources within each SRS resource set 715 may be used for transmit beam sweeping (e.g., at the UE side), where the base station can then select a best transmit beam.

Additionally or alternatively, a pattern of transmit/receive beam sweeping may be indicated to the UE 115 (e.g., by a base station 105 or another device). This indicated pattern of transmit/receive beam sweeping may determine or indicate which SRS resources in the two or more linked SRS resource sets should be transmitted with a same transmit beam 710 and which SRS resources in the two or more linked SRS resource sets can be transmitted with different transmit beams 710. In some examples, the pattern may be indicated and/or applied across the multiple SRS resource sets (e.g., that are linked).

In some examples, the linkage/association between the multiple SRS resource sets may be conditioned on one or more parameters. For example, if the one or more conditional parameters are not met, the UE 115 may not assume the multiple SRS resource sets are linked or associated with each other. Additionally or alternatively, if the multiple SRS resource sets are linked, the UE may expect the one or more conditional parameters to be true.

For example, the one or more conditional parameters may include that SRS resources in the two or more SRS resource sets are not configured with spatial relation information or uplink TCI states. Additionally or alternatively, this condition may include that the SRS resources are not configured with downlink reference signals (e.g., SSBs or CSI-RSs) for spatial relation information or uplink TCI states. The one or more conditional parameters may also include that the two or more SRS resource sets are configured with a same time domain behavior (e.g., periodic SRS transmissions, semi-persistent SRS transmissions, aperiodic SRS transmissions, etc.). In some examples, this linkage may be applicable to aperiodic SRS resource sets alone (e.g., when the two or more SRS resource sets are configured with aperiodic time domain behavior). For the case of periodic and semi-persistent SRS transmissions, all SRS resources across the two or more SRS resource sets may be configured with a same periodicity.

The one or more conditional parameters may also include that all SRS resources in the two or more SRS resource sets are not overlapping in time domain (e.g., not overlapping in a same symbol and same slot). In some examples, this condition may include that the two or more SRS resource sets are configured with different values of slot offsets so that each of the two or more SRS resource sets are transmitted in different slots. Additionally or alternatively, the one or more conditional parameters may include that the two or more SRS resource sets are configured with same uplink power control parameters (e.g., initial power (P0), alpha, PL-RS, whether to use the same closed loop power control adjustment as PUSCH or not, such as being configured with an RRC parameter "srs-PowerControlAdjustmentStates" for closed loop index, etc.). The one or more conditional parameters may also include that the two or more SRS resource sets each have a same number of SRS resources.

In some examples, the linkage or association between the two or more SRS resource sets may be indicated in different ways. For example, the linkage or association may be indicated via RRC signaling (e.g., applicable to periodic, semi-persistent, and aperiodic SRS resource sets). With the RRC signaling, for the case of semi-persistent SRS resource sets, when a MAC control element (CE) activates or deactivates a first SRS resource set, the other SRS resource set(s) that are linked to that first SRS resource set may also be activated or deactivated based on the linkage. Additionally or alternatively, with the RRC signaling, for the case of aperiodic SRS resource sets, when a DCI triggers a first SRS resource set, the other SRS resource sets that are linked to the first SRS resource set may also be triggered based on the linkage.

In some examples, the linkage or association may be indicated via MAC-CE (e.g., applicable to semi-persistent and aperiodic resource sets). With the MAC-CE indication, for the case of semi-persistent SRS resource sets, when an SRS resource set with an indicated ID in the MAC-CE is activated, the MAC-CE may also indicate whether this SRS resource set is activated alone or together with other linked SRS resource sets. For this purpose, one or two reserved bits in MAC-CE signaling may be used. With the MAC-CE indication, RRC signaling may still be used to configure "potential" linkage between two or more SRS resource sets. Additionally or alternatively, for the case of semi-persistent SRS resource sets with the MAC-CE indication, the MAC-CE may indicate two or more SRS resource set IDs, which means that those SRS resource sets are linked and are activated together. For the case of aperiodic SRS resource sets, when a DCI triggers one SRS resource set, the other SRS resource sets that are linked (e.g., based on a previously received MAC-CE) may also be triggered based on the linkage.

In some examples, the linkage or association may be indicated via DCI (e.g., applicable to aperiodic SRS resource sets). For example, the DCI that triggers two or more aperiodic SRS resource sets can indicate whether the SRS resource sets among the two or more SRS resource sets that are configured with a same usage (e.g., usage=beamManagement) are linked or not, which of the SRS resource sets among the two or more SRS resource sets that are configured with the same usage are linked, or a combination thereof.

Additionally, in some examples, a TPC command (e.g., to adjust, increase, or decrease the transmit power for SRS transmission) may be received in the middle of the UE 115 transmitting the two or more linked SRS resource sets. The conditional parameter described previously for the two or more linked SRS resource sets to have same uplink power control parameters may ensure that open loop parameters and closed loop index are the same across the two or more linked SRS resource sets, but that conditional parameter may not ensure a same transmit power when a TPC command is applied in the middle of transmitting the two or more linked SRS resource sets. This reception of the TPC command may happen irrespective of whether closed loop power control adjustment for SRS and PUSCH is the same or not. In some cases, if a power control adjustment indication (e.g., srs-PowerControlAdjustmentStates) indicates a same power control adjustment state for SRS transmissions and PUSCH transmissions, the update of the power control adjustment state for SRS transmission occasion i may occur at the beginning of each SRS resource in a SRS resource set $q_s$; otherwise, the update of the power control adjustment state SRS transmission occasion i may occur at the beginning of the first transmitted SRS resource in the SRS resource set $q_s$.

To address this issue for the two or more linked SRS resource sets (e.g., configured with usage=beamManagement), the power control adjustment (e.g., TPC command) may be delayed until after transmission of all SRS resources in the two or more linked SRS resource sets. That is, an update of the power control adjustment (e.g., TPC command) may occur at the beginning of a first (e.g., earliest) transmitted SRS resource in the earliest SRS resource set among the two or more linked SRS resource sets. Additionally or alternatively, the UE 115 may not expect to receive DCIs with TPC commands that results in transmit power change within one instance of SRS transmissions of different SRS resources in the two or more linked SRS resource sets. That is, the UE 115 may treat receiving such TPC commands (e.g., when result in applying the TPC command in the middle of the UE 115 transmitting the two or more linked SRS resource sets) as an error case (e.g., receiving the TPC command may be defined as an error case if the TPC command is received in the middle of the UE 115 transmitting the two or more linked SRS resource sets).

Figure 8:
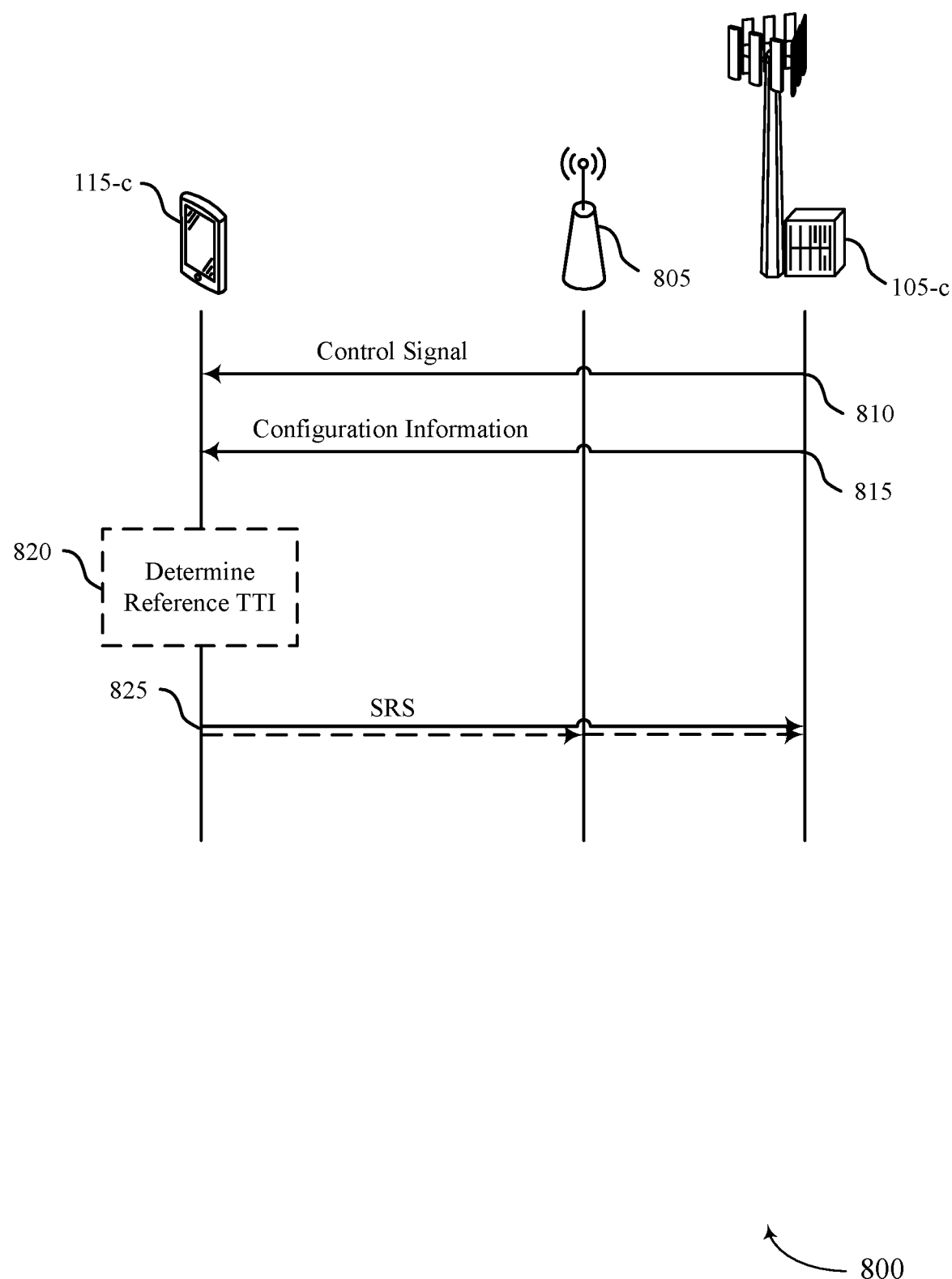
FIGS. 8 and 9 illustrate examples of process flows that support SRS resource sets across multiple slots in accordance with aspects of the present disclosure.

FIG. 8 illustrates an example of a process flow 800 that supports SRS resource sets across multiple slots in accordance with aspects of the present disclosure. In some examples, process flow 800 may implement aspects of or may be implemented by aspects of wireless communications system 100, wireless communications system 200, or both. For example, process flow 800 may be implemented by a base station 105-c and a UE 115-c, which may represent respective examples of a base station 105 and UEs 115 described with reference to FIGS. 1-7. In some cases, process flow 800 may also include an uplink node 805, which may be an example of an uplink node as described with reference to FIGS. 1, 2, and 6.

In the following description of process flow 800, the operations may be performed in a different order than the order shown, or the operations performed by UE 115-c and base station 105-c may be performed in different orders or at different times. For example, some operations may also be left out of process flow 800, or other operations may be added to process flow 800. As another example, operations shown as performed in a single instance (e.g., a single transmission) may in some cases be performed as multiple instances (e.g., multiple transmissions) over some duration of time. Although UE 115-c and base station 105-c are shown performing the operations of process flow 800, some aspects of some operations may also be performed by one or more other wireless devices. For example, some operations described as being performed by base station 105-c may additionally or alternatively be performed by another base station 105 or by uplink node 805.

At 810, UE 115-c may receive, from base station 105-c, a control signal triggering UE 115-c to transmit one or more SRSs of an SRS resource set, the SRS resource set spanning a set of multiple TTIs.

At 815, UE 115-c may receive, from base station 105-c, configuration information including timing information for transmission of the one or more SRSs relative to a timing of receipt of the control signal, the configuration information indicating respective TTIs of the set of multiple TTIs for transmitting each SRS of the one or more SRSs. In some examples, UE 115-c may receive an indication of one or more offset values configured for transmitting at least a subset of the one or more SRSs of the SRS resource set over the set of multiple TTIs, where the one or more offset values include a number of TTIs between receiving the control signal and transmitting at least the subset of the one or more SRSs. Additionally or alternatively, UE 115-c may receive an indication of a vector including respective offset values for each of the one or more SRSs of the SRS resource set, where the respective offset values include a number of TTIs between receiving the control signal and transmitting the one or more SRSs.

At 820, UE 115-c may determine a reference TTI for the timing information received in the configuration information. In some examples, UE 115-c may determine the reference TTI based on a TTI in which the control signal is received, a TTI indicated by an offset value configured for the SRS resource set, RRC signaling, DCI, or a combination thereof. Additionally or alternatively, UE 115-c may receive, via RRC signaling, a first indication of one or more offset values configured for transmitting at least a subset of the one or more SRSs, a second indication of a vector including respective offset values for each of the one or more SRSs, or both, where the reference TTI is determined based on the first indication, the second indication, or both.

Additionally or alternatively, UE 115-*c* may receive a first indication of one or more respective reference TTIs for transmission of each of the one or more SRSs, where the one or more SRSs are transmitted based on the indication. In some examples, UE 115-*c* may receive, via DCI, a second indication of a specific reference TTI of the one or more respective reference TTIs for transmission of each of the one or more SRSs, where the specific reference TTI corresponds to a same entry in an order of the one or more respective reference TTIs for each of the one or more SRSs or corresponds to separate entries in the order of the one or more respective reference TTIs for each of the one or more SRSs.

At 825, UE 115-*c* may transmit the one or more SRSs of the SRS resource set based on the received configuration information. For example, UE 115-*c* may transmit the one or more SRSs directly to base station 105-*c* or may transmit the one or more SRSs to uplink node 805, and uplink node 805 may forward the one or more SRSs or measurements of the one or more SRSs to base station 105-*c*. In some examples, UE 115-*c* may transmit each of the one or more SRSs of the SRS resource set over the set of multiple TTIs using the one or more offset values instead of an offset value configured for the SRS resource set based on receiving the indication of the one or more offsets. Additionally or alternatively, UE 115-*c* may transmit a first subset of the one or more SRSs of the SRS resource set using an offset value configured for the SRS resource set and may transmit a second subset of the one or more SRSs of the SRS resource set using the one or more offset values. In some examples, UE 115-*c* may transmit the one or more SRSs of the SRS resource set using the respective offset values instead of an offset value configured for the SRS resource set based on receiving the indication of the vector. Additionally or alternatively, UE 115-*c* may transmit the one or more SRSs of the SRS resource set based on the respective offset values and an offset value configured for the SRS resource set.

In some examples, UE 115-*c* may transmit the one or more SRSs of the SRS resource set based on the reference TTI. For example, UE 115-*c* may transmit each of the one or more SRSs based on respective TTIs after the reference TTI that include available resources for carrying corresponding SRSs of the one or more SRSs. In some examples, UE 115-*c* may transmit each of the one or more SRSs over the respective TTIs based on not expecting collisions between different SRSs of the one or more SRSs. Additionally or alternatively, UE 115-*c* may transmit each of the one or more SRSs over the respective TTIs based on a priority for the one or more SRSs, where the priority is based on a SRS resource ID for each of the one or more SRSs, an ordering of the one or more SRSs in a configuration message for the SRS resource set, or a combination thereof.

Figure 9:
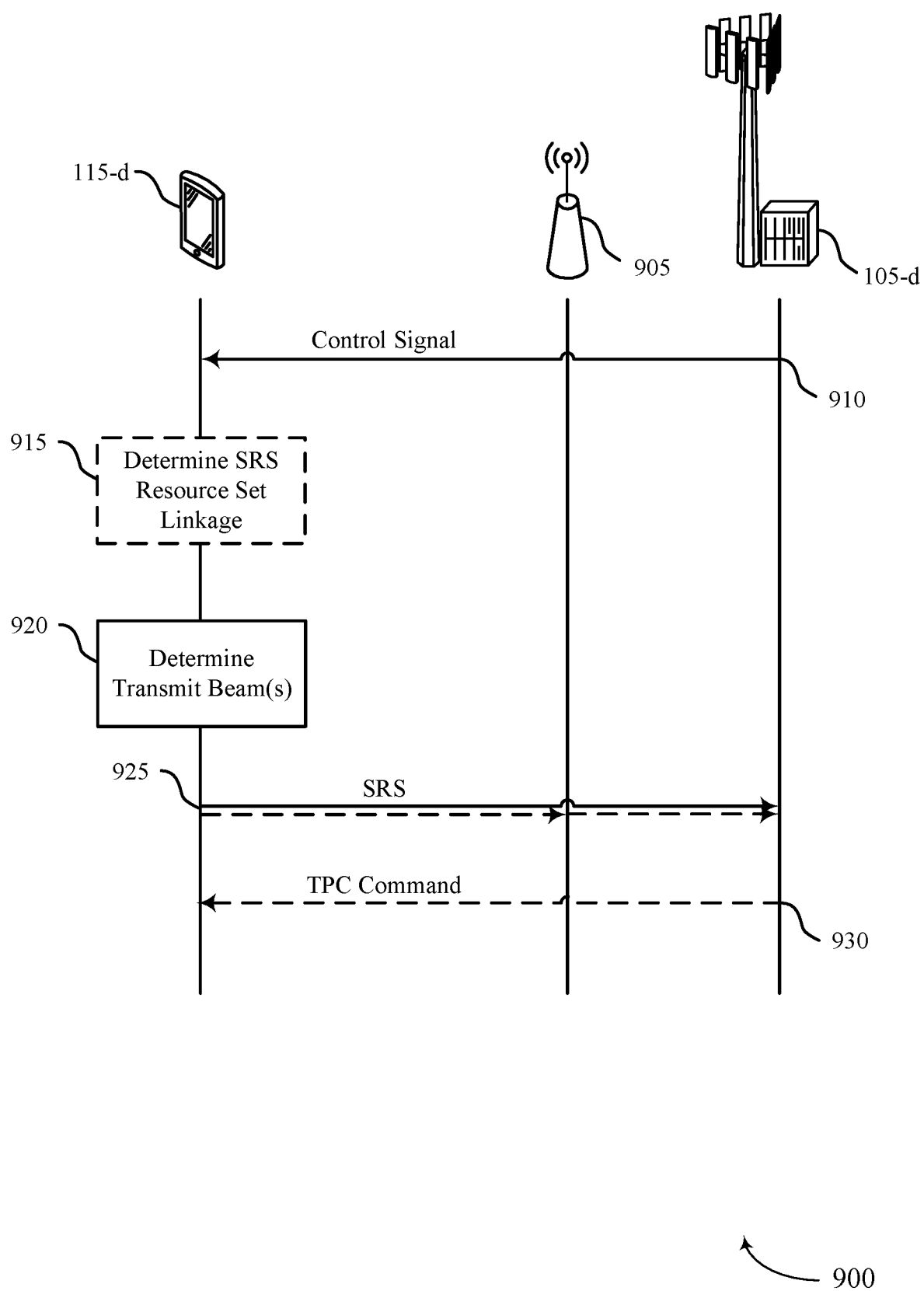

FIG. 9 illustrates an example of a process flow 900 that supports SRS resource sets across multiple slots in accordance with aspects of the present disclosure. In some examples, process flow 900 may implement aspects of or may be implemented by aspects of wireless communications system 100, wireless communications system 600, or both. For example, process flow 900 may be implemented by a base station 105-*d* and a UE 115-*d*, which may represent respective examples of a base station 105 and UEs 115 described with reference to FIGS. 1-8. In some cases, process flow 900 may also include an uplink node 905, which may be an example of an uplink node as described with reference to FIGS. 1, 2, and 6.

In the following description of process flow 900, the operations may be performed in a different order than the order shown, or the operations performed by UE 115-*d* and base station 105-*d* may be performed in different orders or at different times. For example, some operations may also be left out of process flow 900, or other operations may be added to process flow 900. As another example, operations shown as performed in a single instance (e.g., a single transmission) may in some cases be performed as multiple instances (e.g., multiple transmissions) over some duration of time. Although UE 115-*d* and base station 105-*d* are shown performing the operations of process flow 900, some aspects of some operations may also be performed by one or more other wireless devices. For example, some operations described as being performed by base station 105-*d* may additionally or alternatively be performed by another base station 105 or by uplink node 905.

At 910, UE 115-*d* may receive, from base station 105-*d*, a control signal that indicates an SRS beam management configuration that identifies at least a first SRS resource set and a second SRS resource set, the second SRS resource set linked to the first SRS resource set.

At 915, UE 115-*d* may determine the first SRS resource set and the second SRS resource set are linked based on a lack of spatial relation information or uplink TCI states being configured for each SRS resource set, each SRS resource set being configured with a same time domain behavior, each SRS resource set not overlapping in the time domain, each SRS resource set being configured with same uplink power control parameters, each SRS resource set having a same number of SRS resources, or a combination thereof.

In some examples, UE 115-*d* may receive, from base station 105-*d*, an indication that the first SRS resource set and the second SRS resource set are linked via RRC signaling, MAC-CE signaling, DCI, or a combination thereof. Subsequently, UE 115-*d* may trigger the second SRS resource set when the first SRS resource set is triggered based on the indication. Additionally or alternatively, UE 115-*d* may trigger both the first SRS resource set and the second SRS resource set based on the MAC-CE signaling including a first identifier for the first SRS resource set and an additional indication that the second SRS resource set is to be triggered with the first SRS resource set. Additionally or alternatively, UE 115-*d* may trigger both the first SRS resource set and the second SRS resource set based on the MAC-CE signaling including a first ID for the first SRS resource set and a second ID for the second SRS resource set. Additionally or alternatively, UE 115-*d* may trigger both the first SRS resource set and the second SRS resource set based on the DCI indicating that the first SRS resource set and the second SRS resource set are linked out of a set of multiple SRS resource sets.

At 920, UE 115-*d* may determine a first transmit beam for at least one SRS resource of the second SRS resource set based on a second transmit beam for a corresponding SRS resource of the first SRS resource set. In some examples, UE 115-*d* may receive, from base station 105-*d*, an indication of a pattern of transmit beams for the first SRS resource set and the second SRS resource set, where the at least one SRS resource of the second SRS resource set is transmitted on the first transmit beam and the corresponding SRS resource of the first SRS resource set is transmitted on the second transmit beam based on the indication.

At 925, UE 115-*d* may transmit the at least one SRS resource of the second SRS resource set using the first transmit beam. For example, UE 115-*d* may transmit the one or more SRSs directly to base station 105-*d* or may transmit the one or more SRSs to uplink node 905, and uplink node 905 may forward the one or more SRSs or measurements of the one or more SRSs to base station 105-*d*. In some examples, UE 115-*d* may transmit each SRS resource of the second SRS resource set using the first transmit beam, where each SRS resource of the first SRS resource set is transmitted using the second transmit beam. Additionally or alternatively, UE 115-*d* may transmit each SRS resource of the second SRS resource set using respective different transmit beams, where the first transmit beam for the at least one SRS resource of the second SRS resource set and the second transmit beam for the corresponding SRS resource of the first SRS resource set are a same transmit beam.

At 930, UE 115-*d* may receive, from base station 105-*d*, DCI including a TPC command that adjusts one or more power control parameters for the first SRS resource set and the second SRS resource set. In some examples, UE 115-*d* may adjust the one or more power control parameters after the first SRS resource set and the second SRS resource set have both been fully transmitted based on receiving the DCI before both the first SRS resource set and the second SRS resource set have been fully transmitted. Additionally or alternatively, UE 115-*d* may determine that receiving the DCI is an error case based on receiving the DCI before both the first SRS resource set and the second SRS resource set have been fully transmitted.

Figure 10:
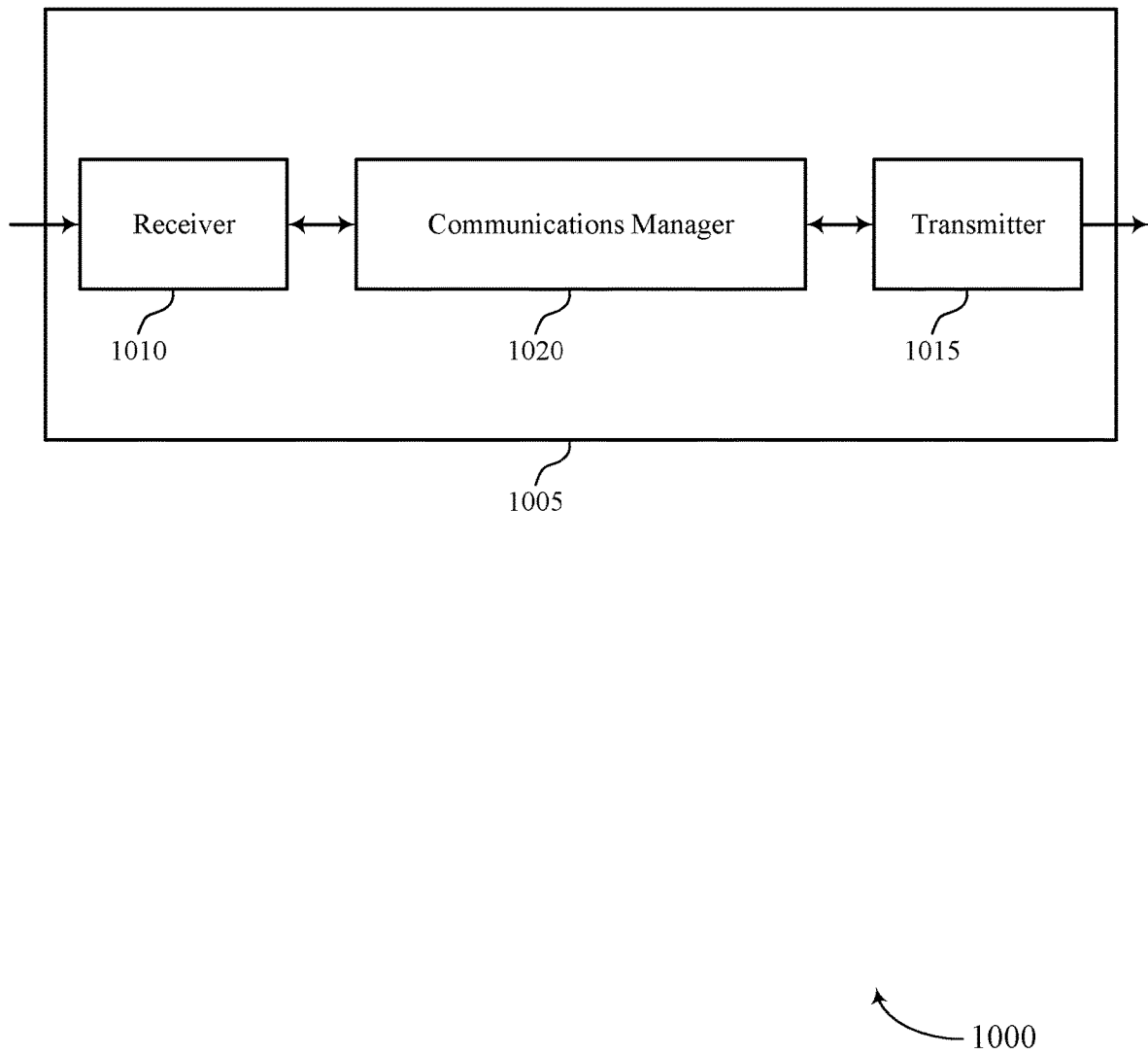
FIGS. 10 and 11 show block diagrams of devices that support SRS resource sets across multiple slots in accordance with aspects of the present disclosure.

FIG. 10 shows a block diagram 1000 of a device 1005 that supports SRS resource sets across multiple slots in accordance with aspects of the present disclosure. The device 1005 may be an example of aspects of a UE 115 as described herein. The device 1005 may include a receiver 1010, a transmitter 1015, and a communications manager 1020. The device 1005 may also include one or more processors, memory coupled with the one or more processors, and instructions stored in the memory that are executable by the one or more processors to enable the one or more processors to perform the beam management and SRS resource sets allocation features discussed herein. Each of these components may be in communication with one another (e.g., via one or more buses).

The receiver 1010 may provide a means for receiving information such as packets, user data, control information, or any combination thereof associated with various information channels (e.g., control channels, data channels, information channels related to SRS resource sets across multiple slots). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to SRS resource sets across multiple slots). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of SRS resource sets across multiple slots as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a UE in accordance with examples as disclosed herein. For example, the communications manager 1020 may be configured as or otherwise support a means for receiving, from a base station, a control signal triggering the UE to transmit one or more SRSs of an SRS resource set, the SRS resource set spanning a set of multiple TTIs. The communications manager 1020 may be configured as or otherwise support a means for receiving, from the base station, configuration information including timing information for transmission of the one or more SRSs relative to a timing of receipt of the control signal, the configuration information indicating respective TTIs of the set of multiple TTIs for transmitting each SRS of the one or more SRSs. The communications manager 1020 may be configured as or otherwise support a means for transmitting the one or more SRSs of the SRS resource set based on the received configuration information.

Additionally or alternatively, the communications manager 1020 may support wireless communications at a UE in accordance with examples as disclosed herein. For example, the communications manager 1020 may be configured as or otherwise support a means for receiving, from a base station, a control signal that indicates an SRS beam management configuration that identifies at least a first SRS resource set and a second SRS resource set, the second SRS resource set linked to the first SRS resource set. The communications manager 1020 may be configured as or otherwise support a means for determining a first transmit beam for at least one SRS resource of the second SRS resource set based on a second transmit beam for a corresponding SRS resource of the first SRS resource set. The communications manager 1020 may be configured as or otherwise support a means for transmitting the at least one SRS resource of the second SRS resource set using the first transmit beam.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for increasing communication quality at a wireless device (e.g., a UE 115) by enabling SRS resource sets to be transmitted across multiple slots. For example, the wireless device may receive timing information in a configuration message for transmitting different SRS resources of an SRS resource set to support beam switching, which may increase the quality of measurements for the SRS resources to then in turn increase communication quality. Additionally, the wireless device may determine a linkage or association between two or more SRS resource sets to then determine which transmit beams to transmit different SRS resources of each SRS resource set, thereby increasing the diversity of the SRS transmissions to give better measurements at a base station to enable the base station to make a better decision on which beam the wireless device should use for communicating with the base station.

Figure 11:
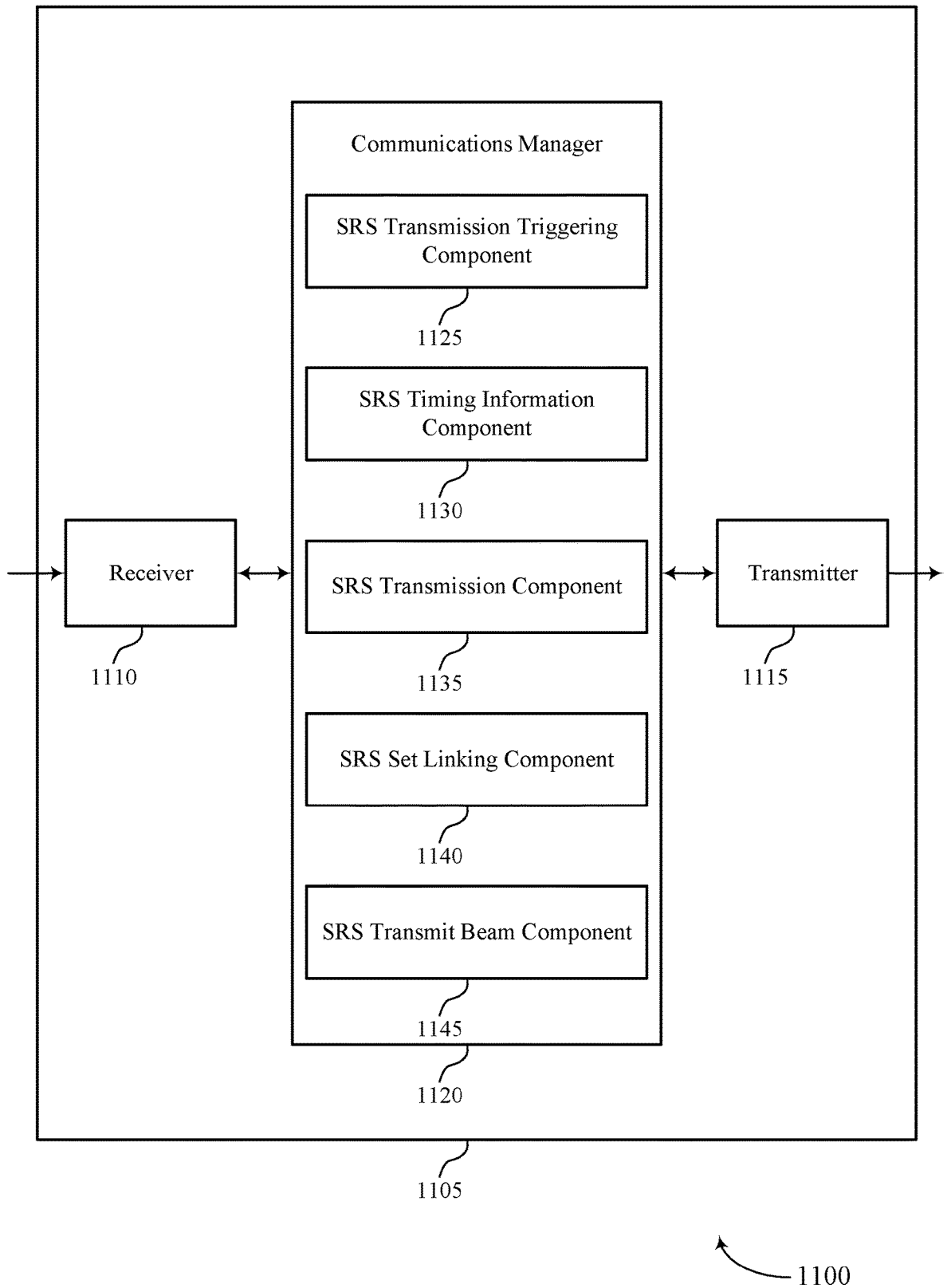

FIG. 11 shows a block diagram 1100 of a device 1105 that supports SRS resource sets across multiple slots in accordance with aspects of the present disclosure. The device 1105 may be an example of aspects of a device 1005 or a UE 115 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to SRS resource sets across multiple slots). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to SRS resource sets across multiple slots). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of SRS resource sets across multiple slots as described herein. For example, the communications manager 1120 may include an SRS transmission triggering component 1125, an SRS timing information component 1130, an SRS transmission component 1135, an SRS set linking component 1140, an SRS transmit beam component 1145, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a UE in accordance with examples as disclosed herein. The SRS transmission triggering component 1125 may be configured as or otherwise support a means for receiving, from a base station, a control signal triggering the UE to transmit one or more SRSs of an SRS resource set, the SRS resource set spanning a set of multiple TTIs. The SRS timing information component 1130 may be configured as or otherwise support a means for receiving, from the base station, configuration information including timing information for transmission of the one or more SRSs relative to a timing of receipt of the control signal, the configuration information indicating respective TTIs of the set of multiple TTIs for transmitting each SRS of the one or more SRSs. The SRS transmission component 1135 may be configured as or otherwise support a means for transmitting the one or more SRSs of the SRS resource set based on the received configuration information.

Additionally or alternatively, the communications manager 1120 may support wireless communications at a UE in accordance with examples as disclosed herein. The SRS set linking component 1140 may be configured as or otherwise support a means for receiving, from a base station, a control signal that indicates an SRS beam management configuration that identifies at least a first SRS resource set and a second SRS resource set, the second SRS resource set linked to the first SRS resource set. The SRS transmit beam component 1145 may be configured as or otherwise support a means for determining a first transmit beam for at least one SRS resource of the second SRS resource set based on a second transmit beam for a corresponding SRS resource of the first SRS resource set. The SRS transmission component 1135 may be configured as or otherwise support a means for transmitting the at least one SRS resource of the second SRS resource set using the first transmit beam.

In some cases, the SRS transmission triggering component 1125, the SRS timing information component 1130, the SRS transmission component 1135, the SRS set linking component 1140, and the SRS transmit beam component 1145 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the SRS transmission triggering component 1125, the SRS timing information component 1130, the SRS transmission component 1135, the SRS set linking component 1140, and the SRS transmit beam component 1145 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 12:
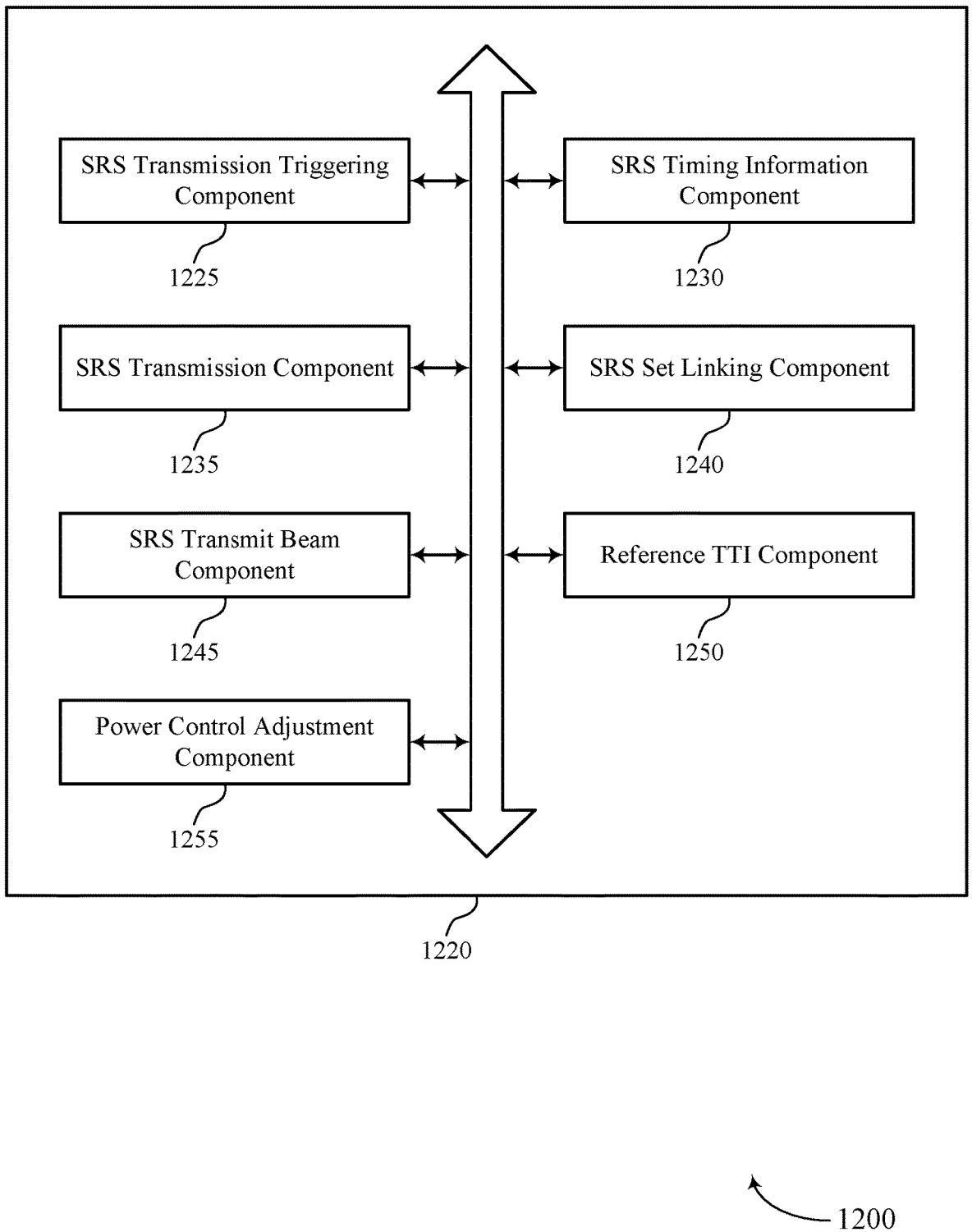
FIG. 12 shows a block diagram of a communications manager that supports SRS resource sets across multiple slots in accordance with aspects of the present disclosure.

FIG. 12 shows a block diagram 1200 of a communications manager 1220 that supports SRS resource sets across multiple slots in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of SRS resource sets across multiple slots as described herein. For example, the communications manager 1220 may include an SRS transmission triggering component 1225, an SRS timing information component 1230, an SRS transmission component 1235, an SRS set linking component 1240, an SRS transmit beam component 1245, a reference TTI component 1250, a power control adjustment component 1255, or any combination thereof. Each of these components may communicate, directly or indirectly, with one another (e.g., via one or more buses).

The communications manager 1220 may support wireless communications at a UE in accordance with examples as disclosed herein. The SRS transmission triggering component 1225 may be configured as or otherwise support a means for receiving, from a base station, a control signal triggering the UE to transmit one or more SRSs of an SRS resource set, the SRS resource set spanning a set of multiple TTIs. The SRS timing information component 1230 may be configured as or otherwise support a means for receiving, from the base station, configuration information including timing information for transmission of the one or more SRSs relative to a timing of receipt of the control signal, the configuration information indicating respective TTIs of the set of multiple TTIs for transmitting each SRS of the one or more SRSs. The SRS transmission component 1235 may be configured as or otherwise support a means for transmitting the one or more SRSs of the SRS resource set based on the received configuration information.

In some examples, to support receiving the configuration information including the timing information, the SRS timing information component 1230 may be configured as or otherwise support a means for receiving an indication of one or more offset values configured for transmitting at least a subset of the one or more SRSs of the SRS resource set over the set of multiple TTIs, where the one or more offset values include a number of TTIs between receiving the control signal and transmitting at least the subset of the one or more SRSs.

In some examples, the SRS transmission component 1235 may be configured as or otherwise support a means for transmitting each of the one or more SRSs of the SRS resource set over the set of multiple TTIs using the one or more offset values instead of an offset value configured for the SRS resource set based on receiving the indication of the one or more offsets.

In some examples, the SRS transmission component 1235 may be configured as or otherwise support a means for transmitting a first subset of the one or more SRSs of the SRS resource set using an offset value configured for the SRS resource set. In some examples, the SRS transmission component 1235 may be configured as or otherwise support a means for transmitting a second subset of the one or more SRSs of the SRS resource set using the one or more offset values.

In some examples, to support receiving the configuration information including the timing information, the SRS timing information component 1230 may be configured as or otherwise support a means for receiving an indication of a vector including respective offset values for each of the one or more SRSs of the SRS resource set, where the respective offset values include a number of TTIs between receiving the control signal and transmitting the one or more SRSs.

In some examples, the SRS transmission component 1235 may be configured as or otherwise support a means for transmitting the one or more SRSs of the SRS resource set using the respective offset values instead of an offset value configured for the SRS resource set based on receiving the indication of the vector.

In some examples, the SRS transmission component 1235 may be configured as or otherwise support a means for transmitting the one or more SRSs of the SRS resource set based on the respective offset values and an offset value configured for the SRS resource set.

In some examples, the reference TTI component 1250 may be configured as or otherwise support a means for determining a reference TTI for the timing information received in the configuration information. In some examples, the reference TTI component 1250 may be configured as or otherwise support a means for transmitting the one or more SRSs of the SRS resource set based on the reference TTI.

In some examples, to support transmitting the one or more SRSs of the SRS resource set, the SRS transmission component 1235 may be configured as or otherwise support a means for transmitting each of the one or more SRSs based on respective TTIs after the reference TTI that include available resources for carrying corresponding SRSs of the one or more SRSs.

In some examples, the SRS transmission component 1235 may be configured as or otherwise support a means for transmitting each of the one or more SRSs over the respective TTIs based on not expecting collisions between different SRSs of the one or more SRSs.

In some examples, the SRS transmission component 1235 may be configured as or otherwise support a means for transmitting each of the one or more SRSs over the respective TTIs based on a priority for the one or more SRSs.

In some examples, the priority is based on an SRS resource identifier for each of the one or more SRSs, an ordering of the one or more SRSs in a configuration message for the SRS resource set, or a combination thereof.

In some examples, to support determining the reference TTI, the reference TTI component 1250 may be configured as or otherwise support a means for determining the reference TTI based on a TTI in which the control signal is received, a TTI indicated by an offset value configured for the SRS resource set, RRC signaling, DCI, or a combination thereof.

In some examples, the SRS timing information component 1230 may be configured as or otherwise support a means for receiving, via RRC signaling, a first indication of one or more offset values configured for transmitting at least a subset of the one or more SRSs, a second indication of a vector including respective offset values for each of the one or more SRSs, or both, where the reference TTI is determined based on the first indication, the second indication, or both.

In some examples, to support receiving the configuration information including the timing information, the reference TTI component 1250 may be configured as or otherwise support a means for receiving a first indication of one or more respective reference TTIs for transmission of each of the one or more SRSs, where the one or more SRSs are transmitted based on the indication.

In some examples, the reference TTI component 1250 may be configured as or otherwise support a means for receiving, via DCI, a second indication of a specific reference TTI of the one or more respective reference TTIs for transmission of each of the one or more SRSs.

In some examples, the specific reference TTI corresponds to a same entry in an order of the one or more respective reference TTIs for each of the one or more SRSs or corresponds to separate entries in the order of the one or more respective reference TTIs for each of the one or more SRSs.

In some examples, to support receiving the first indication, the reference TTI component 1250 may be configured as or otherwise support a means for receiving one or more vectors indicating the one or more respective reference TTIs for transmission of each of the one or more SRSs.

In some examples, the reference TTI component 1250 may be configured as or otherwise support a means for receiving, via DCI, a second indication of a specific vector of the one or more vectors to indicate the one or more respective reference TTIs for transmission of each of the one or more SRSs.

Additionally or alternatively, the communications manager 1220 may support wireless communications at a UE in accordance with examples as disclosed herein. The SRS set linking component 1240 may be configured as or otherwise support a means for receiving, from a base station, a control signal that indicates an SRS beam management configuration that identifies at least a first SRS resource set and a second SRS resource set, the second SRS resource set linked to the first SRS resource set. The SRS transmit beam component 1245 may be configured as or otherwise support a means for determining a first transmit beam for at least one SRS resource of the second SRS resource set based on a second transmit beam for a corresponding SRS resource of the first SRS resource set. In some examples, the SRS transmission component 1235 may be configured as or otherwise support a means for transmitting the at least one SRS resource of the second SRS resource set using the first transmit beam.

In some examples, to support transmitting the at least one SRS resource of the second SRS resource set, the SRS transmission component 1235 may be configured as or otherwise support a means for transmitting each SRS resource of the second SRS resource set using the first transmit beam.

In some examples, the SRS transmission component 1235 may be configured as or otherwise support a means for transmitting each SRS resource of the first SRS resource set using the second transmit beam.

In some examples, to support transmitting the at least one SRS resource of the second SRS resource set, the SRS transmission component 1235 may be configured as or otherwise support a means for transmitting each SRS resource of the second SRS resource set using respective different transmit beams, where the first transmit beam for the at least one SRS resource of the second SRS resource set and the second transmit beam for the corresponding SRS resource of the first SRS resource set are a same transmit beam.

In some examples, the SRS transmit beam component 1245 may be configured as or otherwise support a means for receiving, from the base station, an indication of a pattern of transmit beams for the first SRS resource set and the second SRS resource set, where the at least one SRS resource of the second SRS resource set is transmitted on the first transmit beam and the corresponding SRS resource of the first SRS resource set is transmitted on the second transmit beam based on the indication.

In some examples, the SRS set linking component 1240 may be configured as or otherwise support a means for determining the first SRS resource set and the second SRS resource set are linked based on a lack of spatial relation information or uplink TCI states being configured for each SRS resource set, each SRS resource set being configured with a same time domain behavior, each SRS resource set not overlapping in the time domain, each SRS resource set being configured with same uplink power control parameters, each SRS resource set having a same number of SRS resources, or a combination thereof.

In some examples, the SRS set linking component 1240 may be configured as or otherwise support a means for receiving, from the base station, an indication that the first SRS resource set and the second SRS resource set are linked via RRC signaling, MAC-CE signaling, DCI, or a combination thereof.

In some examples, the SRS set linking component 1240 may be configured as or otherwise support a means for triggering the second SRS resource set when the first SRS resource set is triggered based on the indication.

In some examples, the SRS set linking component 1240 may be configured as or otherwise support a means for triggering both the first SRS resource set and the second SRS resource set based on the MAC-CE signaling including a first identifier for the first SRS resource set and an additional indication that the second SRS resource set is to be triggered with the first SRS resource set.

In some examples, the SRS set linking component 1240 may be configured as or otherwise support a means for triggering both the first SRS resource set and the second SRS resource set based on the MAC-CE signaling including a first identifier for the first SRS resource set and a second identifier for the second SRS resource set.

In some examples, the SRS set linking component 1240 may be configured as or otherwise support a means for triggering both the first SRS resource set and the second SRS resource set based on the DCI indicating that the first SRS resource set and the second SRS resource set are linked out of a set of multiple SRS resource sets.

In some examples, the power control adjustment component 1255 may be configured as or otherwise support a means for receiving, from the base station, DCI including a TPC command that adjusts one or more power control parameters for the first SRS resource set and the second SRS resource set.

In some examples, the power control adjustment component 1255 may be configured as or otherwise support a means for adjusting the one or more power control parameters after the first SRS resource set and the second SRS resource set have both been fully transmitted based on receiving the DCI before both the first SRS resource set and the second SRS resource set have been fully transmitted.

In some examples, the power control adjustment component 1255 may be configured as or otherwise support a means for determining that receiving the DCI is an error case based on receiving the DCI before both the first SRS resource set and the second SRS resource set have been fully transmitted.

In some cases, the SRS transmission triggering component 1225, the SRS timing information component 1230, the SRS transmission component 1235, the SRS set linking component 1240, the SRS transmit beam component 1245, the reference TTI component 1250, and the power control adjustment component 1255 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the SRS transmission triggering component 1225, the SRS timing information component 1230, the SRS transmission component 1235, the SRS set linking component 1240, the SRS transmit beam component 1245, the reference TTI component 1250, and the power control adjustment component 1255 discussed herein.

Figure 13:
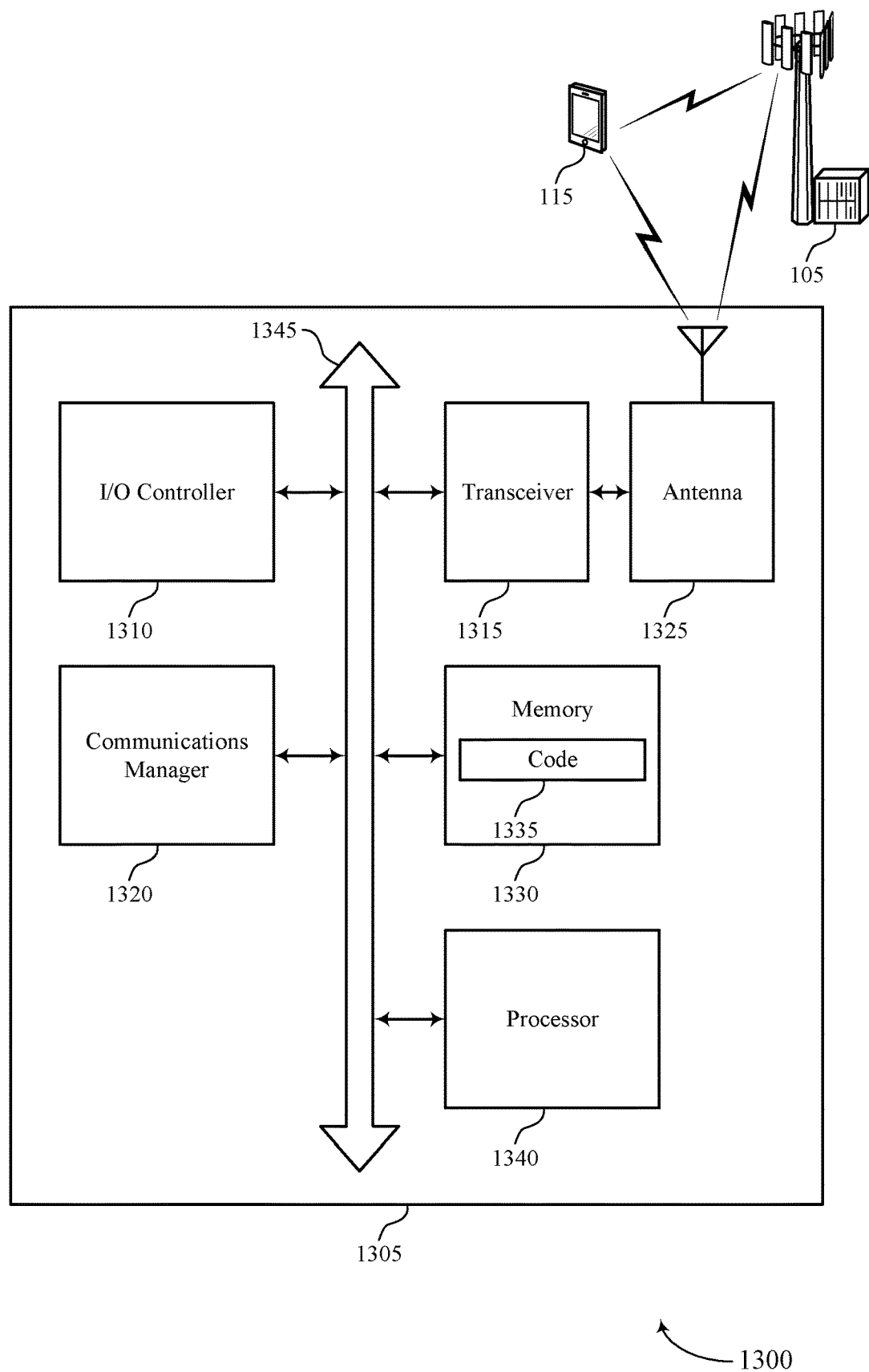
FIG. 13 shows a diagram of a system including a device that supports SRS resource sets across multiple slots in accordance with aspects of the present disclosure.

FIG. 13 shows a diagram of a system 1300 including a device 1305 that supports SRS resource sets across multiple slots in accordance with aspects of the present disclosure. The device 1305 may be an example of or include the components of a device 1005, a device 1105, or a UE 115 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, an input/output (I/O) controller 1310, a transceiver 1315, an antenna 1325, a memory 1330, code 1335, and a processor 1340. These components may be in electronic communication or otherwise coupled (e.g., operatively, communicatively, functionally, electronically, electrically) via one or more buses (e.g., a bus 1345).

The I/O controller 1310 may manage input and output signals for the device 1305. The I/O controller 1310 may also manage peripherals not integrated into the device 1305. In some cases, the I/O controller 1310 may represent a physical connection or port to an external peripheral. In some cases, the I/O controller 1310 may utilize an operating system such as iOS®, ANDROID®, MS-DOS®, MS-WINDOWS®, OS/2®, UNIX®, LINUX®, or another known operating system. Additionally or alternatively, the I/O controller 1310 may represent or interact with a modem, a keyboard, a mouse, a touchscreen, or a similar device. In some cases, the I/O controller 1310 may be implemented as part of a processor, such as the processor 1340. In some cases, a user may interact with the device 1305 via the I/O controller 1310 or via hardware components controlled by the I/O controller 1310.

In some cases, the device 1305 may include a single antenna 1325. However, in some other cases, the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include random access memory (RAM) and read-only memory (ROM). The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a basic I/O system (BIOS) which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting SRS resource sets across multiple slots). For example, the device 1305 or a component of the device 1305 may include a processor 1340 and memory 1330 coupled to the processor 1340, the processor 1340 and memory 1330 configured to perform various functions described herein.

The communications manager 1320 may support wireless communications at a UE in accordance with examples as disclosed herein. For example, the communications manager 1320 may be configured as or otherwise support a means for receiving, from a base station, a control signal triggering the UE to transmit one or more SRSs of an SRS resource set, the SRS resource set spanning a set of multiple TTIs. The communications manager 1320 may be configured as or otherwise support a means for receiving, from the base station, configuration information including timing information for transmission of the one or more SRSs relative to a timing of receipt of the control signal, the configuration information indicating respective TTIs of the set of multiple TTIs for transmitting each SRS of the one or more SRSs. The communications manager 1320 may be configured as or otherwise support a means for transmitting the one or more SRSs of the SRS resource set based on the received configuration information.

Additionally or alternatively, the communications manager 1320 may support wireless communications at a UE in accordance with examples as disclosed herein. For example, the communications manager 1320 may be configured as or otherwise support a means for receiving, from a base station, a control signal that indicates an SRS beam management configuration that identifies at least a first SRS resource set and a second SRS resource set, the second SRS resource set linked to the first SRS resource set. The communications manager 1320 may be configured as or otherwise support a means for determining a first transmit beam for at least one SRS resource of the second SRS resource set based on a second transmit beam for a corresponding SRS resource of the first SRS resource set. The communications manager 1320 may be configured as or otherwise support a means for transmitting the at least one SRS resource of the second SRS resource set using the first transmit beam.

By including or configuring the communications manager 1320 in accordance with examples as described herein, the device 1305 may support techniques for improved communication reliability and improved coordination between devices. For example, the described techniques may enable a wireless device (e.g., a UE 115) to transmit SRS resource sets across multiple slots. In some examples, the wireless device may receive timing information in a configuration message for transmitting different SRS resources of an SRS resource set to support beam switching, which may increase the quality of measurements for the SRS resources to then in turn increase communication quality. Additionally, the wireless device may determine a linkage or association between two or more SRS resource sets to then determine which transmit beams to transmit different SRS resources of each SRS resource set, thereby increasing the diversity of the SRS transmissions to give better measurements at a base station to enable the base station to make a better decision on which beam the wireless device should use for communicating with the base station.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of SRS resource sets across multiple slots as described herein, or the processor 1340 and the memory 1330 may be otherwise configured to perform or support such operations.

Figure 14:
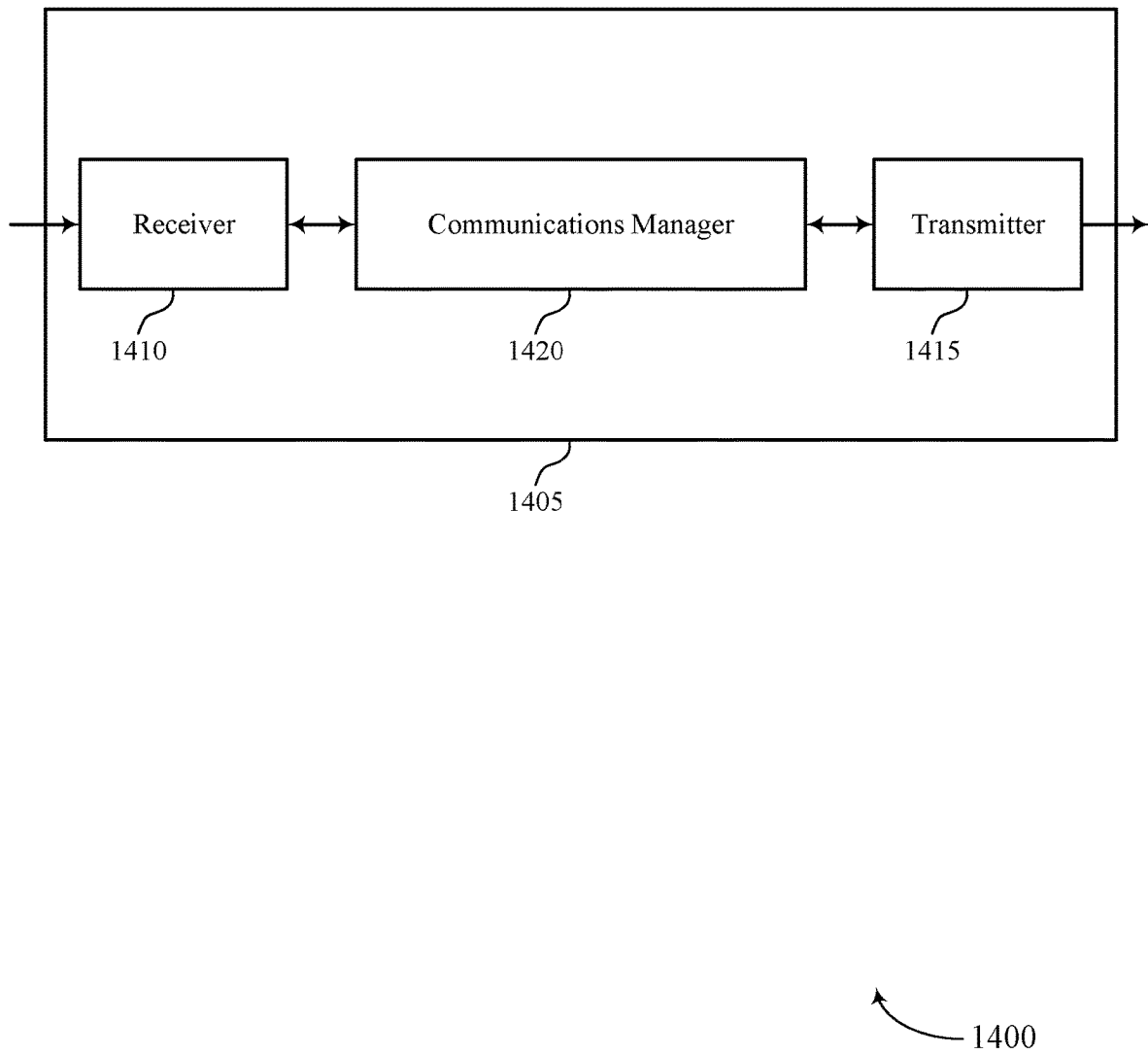
FIGS. 14 and 15 show block diagrams of devices that support SRS resource sets across multiple slots in accordance with aspects of the present disclosure.

FIG. 14 shows a block diagram 1400 of a device 1405 that supports SRS resource sets across multiple slots in accordance with aspects of the present disclosure. The device 1405 may be an example of aspects of a base station 105 as described herein. The device 1405 may include a receiver 1410, a transmitter 1415, and a communications manager 1420. The device 1405 may also include one or more processors, memory coupled with the one or more processors, and instructions stored in the memory that are executable by the one or more processors to enable the one or more processors to perform the beam management and SRS resource sets allocation features discussed herein. Each of these components may be in communication with one another (e.g., via one or more buses).

The receiver 1410 may provide a means for receiving information such as packets, user data, control information, or any combination thereof associated with various information channels (e.g., control channels, data channels, information channels related to SRS resource sets across multiple slots). Information may be passed on to other components of the device 1405. The receiver 1410 may utilize a single antenna or a set of multiple antennas.

The transmitter 1415 may provide a means for transmitting signals generated by other components of the device 1405. For example, the transmitter 1415 may transmit information such as packets, user data, control information, or any combination thereof associated with various information channels (e.g., control channels, data channels, information channels related to SRS resource sets across multiple slots). In some examples, the transmitter 1415 may be co-located with a receiver 1410 in a transceiver module. The transmitter 1415 may utilize a single antenna or a set of multiple antennas.

The communications manager 1420, the receiver 1410, the transmitter 1415, or various combinations thereof or various components thereof may be examples of means for performing various aspects of SRS resource sets across multiple slots as described herein. For example, the communications manager 1420, the receiver 1410, the transmitter 1415, or various combinations or components thereof may support a method for performing one or more of the functions described herein.

In some examples, the communications manager 1420, the receiver 1410, the transmitter 1415, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1420, the receiver 1410, the transmitter 1415, or various combinations or components thereof may be implemented in code (e.g., as communications management software or firmware) executed by a processor. If implemented in code executed by a processor, the functions of the communications manager 1420, the receiver 1410, the transmitter 1415, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1420 may be configured to perform various operations (e.g., receiving, monitoring, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to receive information, transmit information, or perform various other operations as described herein.

The communications manager 1420 may support wireless communications at a base station in accordance with examples as disclosed herein. For example, the communications manager 1420 may be configured as or otherwise support a means for transmitting, to a UE, a control signal triggering the UE to transmit one or more SRSs of an SRS resource set, the SRS resource set spanning a set of multiple TTIs. The communications manager 1420 may be configured as or otherwise support a means for transmitting, to the UE, configuration information including timing information for transmission of the one or more SRSs relative to a timing of transmission of the control signal, the configuration information indicating respective TTIs of the set of multiple TTIs for the UE to transmit each SRS of the one or more SRSs. The communications manager 1420 may be configured as or otherwise support a means for receiving the one or more SRSs of the SRS resource set based on the transmitted configuration information.

Additionally or alternatively, the communications manager 1420 may support wireless communications at a base station in accordance with examples as disclosed herein. For example, the communications manager 1420 may be configured as or otherwise support a means for transmitting, to a UE, a control signal that indicates an SRS beam management configuration that identifies at least a first SRS resource set and a second SRS resource set, the second SRS resource set linked to the first SRS resource set. The communications manager 1420 may be configured as or otherwise support a means for determining a first transmit beam for at least one SRS resource of the second SRS resource set based on a second transmit beam for a corresponding SRS resource of the first SRS resource set. The communications manager 1420 may be configured as or otherwise support a means for receiving the at least one SRS resource of the second SRS resource set via the first transmit beam.

Figure 15:
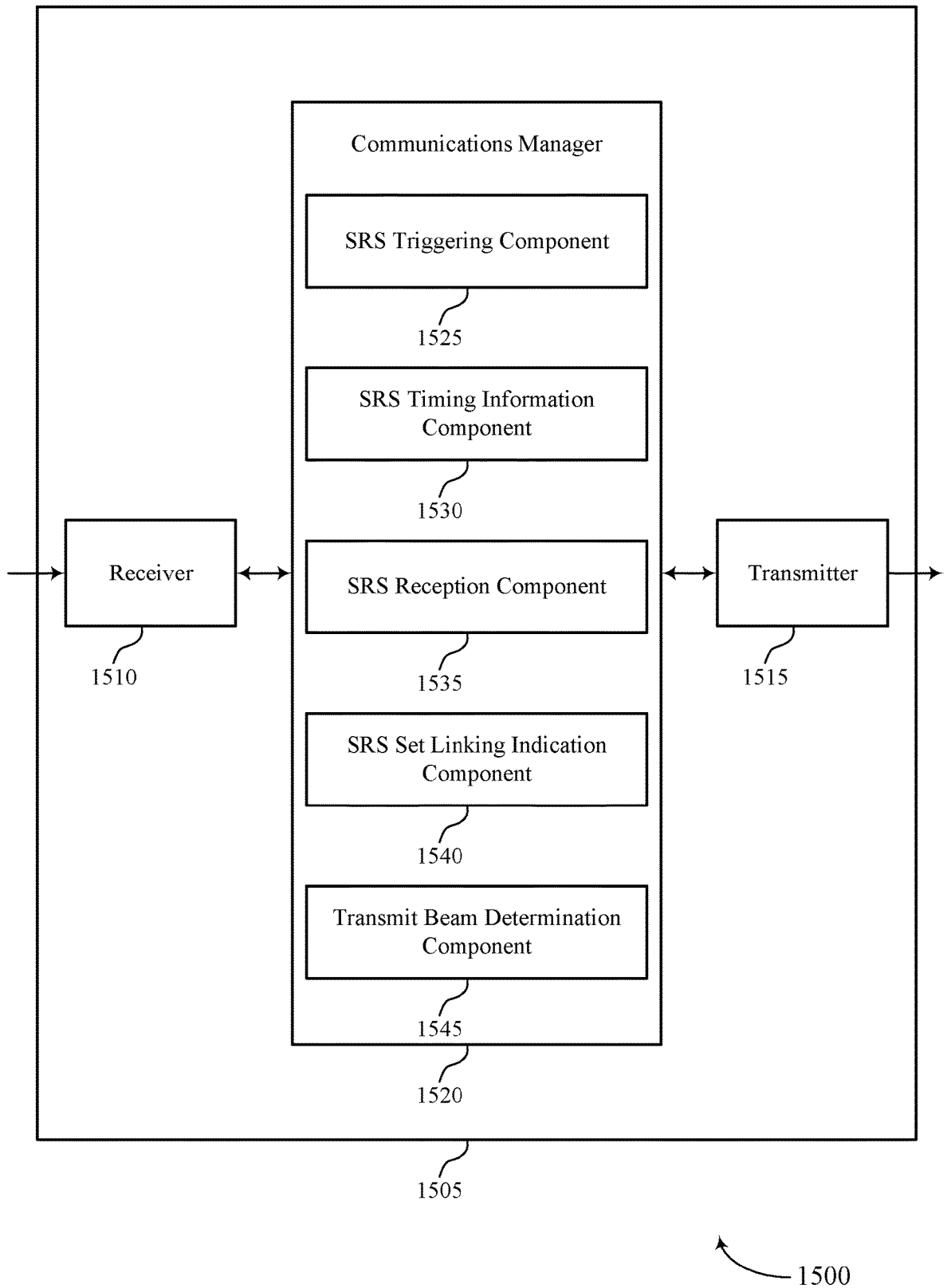

FIG. 15 shows a block diagram 1500 of a device 1505 that supports SRS resource sets across multiple slots in accordance with aspects of the present disclosure. The device 1505 may be an example of aspects of a device 1405 or a base station 105 as described herein. The device 1505 may include a receiver 1510, a transmitter 1515, and a communications manager 1520. The device 1505 may also include a processor. Each of these components may be in communication with one another (e.g., via one or more buses).

The receiver 1510 may provide a means for receiving information such as packets, user data, control information, or any combination thereof associated with various information channels (e.g., control channels, data channels, information channels related to SRS resource sets across multiple slots). Information may be passed on to other components of the device 1505. The receiver 1510 may utilize a single antenna or a set of multiple antennas.

The transmitter 1515 may provide a means for transmitting signals generated by other components of the device 1505. For example, the transmitter 1515 may transmit information such as packets, user data, control information, or any combination thereof associated with various information channels (e.g., control channels, data channels, information channels related to SRS resource sets across multiple slots). In some examples, the transmitter 1515 may be co-located with a receiver 1510 in a transceiver module. The transmitter 1515 may utilize a single antenna or a set of multiple antennas.

The device 1505, or various components thereof, may be an example of means for performing various aspects of SRS resource sets across multiple slots as described herein. For example, the communications manager 1520 may include an SRS triggering component 1525, an SRS timing information component 1530, an SRS reception component 1535, an SRS set linking indication component 1540, a transmit beam determination component 1545, or any combination thereof. The communications manager 1520 may be an example of aspects of a communications manager 1420 as described herein. In some examples, the communications manager 1520, or various components thereof, may be configured to perform various operations (e.g., receiving, monitoring, transmitting) using or otherwise in cooperation with the receiver 1510, the transmitter 1515, or both. For example, the communications manager 1520 may receive information from the receiver 1510, send information to the transmitter 1515, or be integrated in combination with the receiver 1510, the transmitter 1515, or both to receive information, transmit information, or perform various other operations as described herein.

The communications manager 1520 may support wireless communications at a base station in accordance with examples as disclosed herein. The SRS triggering component 1525 may be configured as or otherwise support a means for transmitting, to a UE, a control signal triggering the UE to transmit one or more SRSs of an SRS resource set, the SRS resource set spanning a set of multiple TTIs. The SRS timing information component 1530 may be configured as or otherwise support a means for transmitting, to the UE, configuration information including timing information for transmission of the one or more SRSs relative to a timing of transmission of the control signal, the configuration information indicating respective TTIs of the set of multiple TTIs for the UE to transmit each SRS of the one or more SRSs. The SRS reception component 1535 may be configured as or otherwise support a means for receiving the one or more SRSs of the SRS resource set based on the transmitted configuration information.

Additionally or alternatively, the communications manager 1520 may support wireless communications at a base station in accordance with examples as disclosed herein. The SRS set linking indication component 1540 may be configured as or otherwise support a means for transmitting, to a UE, a control signal that indicates an SRS beam management configuration that identifies at least a first SRS resource set and a second SRS resource set, the second SRS resource set linked to the first SRS resource set. The transmit beam determination component 1545 may be configured as or otherwise support a means for determining a first transmit beam for at least one SRS resource of the second SRS resource set based on a second transmit beam for a corresponding SRS resource of the first SRS resource set. The SRS reception component 1535 may be configured as or otherwise support a means for receiving the at least one SRS resource of the second SRS resource set via the first transmit beam.

In some cases, the SRS triggering component 1525, the SRS timing information component 1530, the SRS reception component 1535, the SRS set linking indication component 1540, and the transmit beam determination component 1545 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the SRS triggering component 1525, the SRS timing information component 1530, the SRS reception component 1535, the SRS set linking indication component 1540, and the transmit beam determination component 1545 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 16:
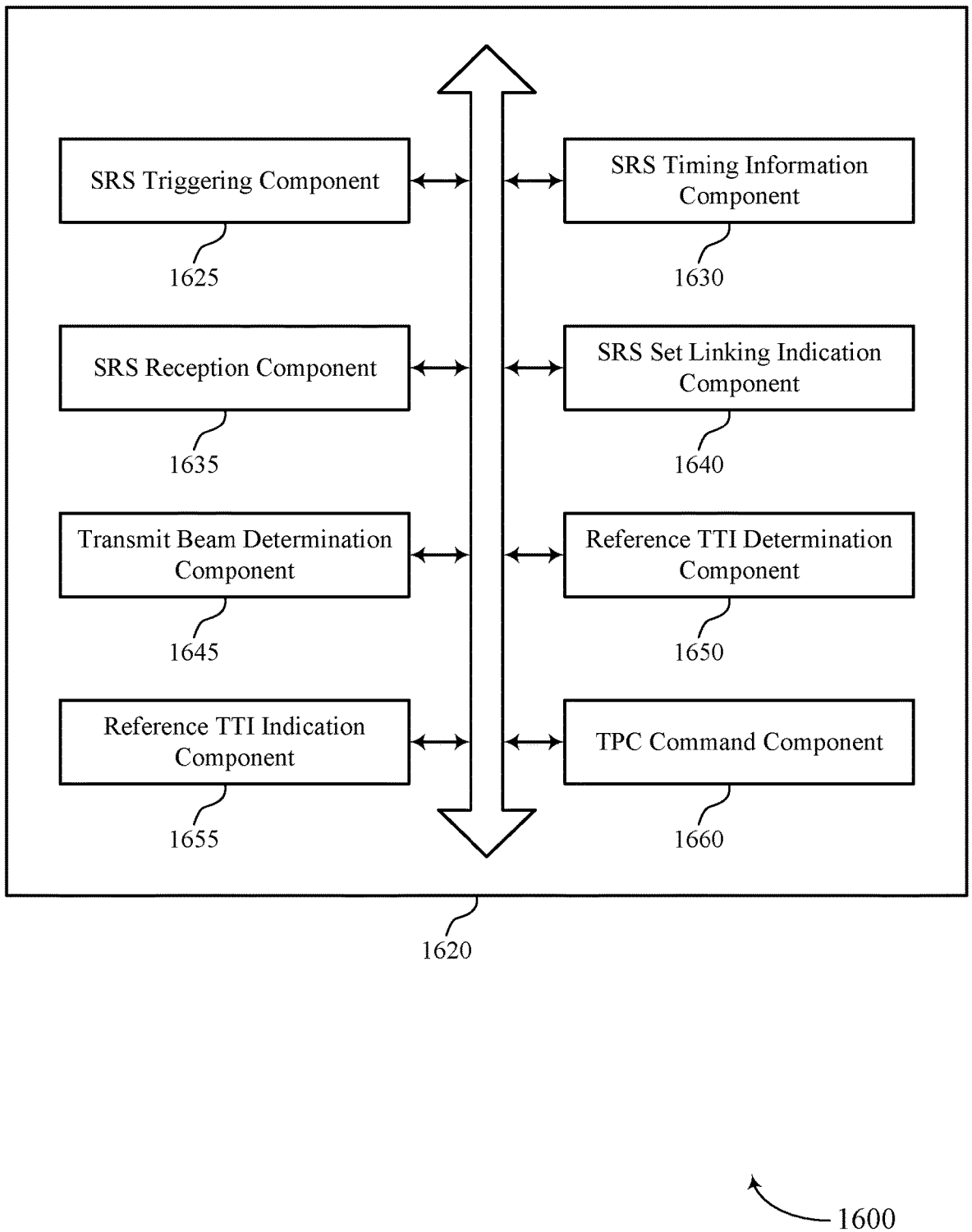
FIG. 16 shows a block diagram of a communications manager that supports SRS resource sets across multiple slots in accordance with aspects of the present disclosure.

FIG. 16 shows a block diagram 1600 of a communications manager 1620 that supports SRS resource sets across multiple slots in accordance with aspects of the present disclosure. The communications manager 1620 may be an example of aspects of a communications manager 1420, a communications manager 1520, or both, as described herein. The communications manager 1620, or various components thereof, may be an example of means for performing various aspects of SRS resource sets across multiple slots as described herein. For example, the communications manager 1620 may include an SRS triggering component 1625, an SRS timing information component 1630, an SRS reception component 1635, an SRS set linking indication component 1640, a transmit beam determination component 1645, a reference TTI determination component 1650, a reference TTI indication component 1655, a TPC command component 1660, or any combination thereof. Each of these components may communicate, directly or indirectly, with one another (e.g., via one or more buses).

The communications manager 1620 may support wireless communications at a base station in accordance with examples as disclosed herein. The SRS triggering component 1625 may be configured as or otherwise support a means for transmitting, to a UE, a control signal triggering the UE to transmit one or more SRSs of an SRS resource set, the SRS resource set spanning a set of multiple TTIs. The SRS timing information component 1630 may be configured as or otherwise support a means for transmitting, to the UE, configuration information including timing information for transmission of the one or more SRSs relative to a timing of transmission of the control signal, the configuration information indicating respective TTIs of the set of multiple TTIs for the UE to transmit each SRS of the one or more SRSs. The SRS reception component 1635 may be configured as or otherwise support a means for receiving the one or more SRSs of the SRS resource set based on the transmitted configuration information.

In some examples, to support transmitting the configuration information including the timing information, the SRS timing information component 1630 may be configured as or otherwise support a means for transmitting an indication of one or more offset values configured for the UE to transmit at least a subset of the one or more SRSs of the SRS resource set over the set of multiple TTIs, where the one or more offset values include a number of TTIs between transmitting the control signal and receiving at least the subset of the one or more SRSs.

In some examples, the SRS reception component 1635 may be configured as or otherwise support a means for receiving each of the one or more SRSs of the SRS resource set over the set of multiple TTIs according to the one or more offset values instead of an offset value configured for the SRS resource set based on transmitting the indication of the one or more offsets.

In some examples, the SRS reception component 1635 may be configured as or otherwise support a means for receiving a first subset of the one or more SRSs of the SRS resource set according to an offset value configured for the SRS resource set. In some examples, the SRS reception component 1635 may be configured as or otherwise support a means for receiving a second subset of the one or more SRSs of the SRS resource set according to the one or more offset values.

In some examples, to support transmitting the configuration information including the timing information, the SRS timing information component 1630 may be configured as or otherwise support a means for transmitting an indication of a vector including respective offset values for each of the one or more SRSs of the SRS resource set, where the respective offset values include a number of TTIs between transmitting the control signal and receiving the one or more SRSs.

In some examples, the SRS reception component 1635 may be configured as or otherwise support a means for receiving the one or more SRSs of the SRS resource set according to the respective offset values instead of an offset value configured for the SRS resource set based on transmitting the indication of the vector.

In some examples, the SRS reception component 1635 may be configured as or otherwise support a means for receiving the one or more SRSs of the SRS resource set based on the respective offset values and an offset value configured for the SRS resource set.

In some examples, the reference TTI determination component 1650 may be configured as or otherwise support a means for determining a reference TTI for the timing information received in the configuration information. In some examples, the reference TTI determination component 1650 may be configured as or otherwise support a means for receiving the one or more SRSs of the SRS resource set based on the reference TTI.

In some examples, to support receiving the one or more SRSs of the SRS resource set, the SRS reception component 1635 may be configured as or otherwise support a means for receiving each of the one or more SRSs based on respective TTIs after the reference TTI that include available resources for carrying corresponding SRSs of the one or more SRSs.

In some examples, the SRS reception component 1635 may be configured as or otherwise support a means for receiving each of the one or more SRSs over the respective TTIs based on a priority for the one or more SRSs.

In some examples, the priority is based on an SRS resource identifier for each of the one or more SRSs, an ordering of the one or more SRSs in a configuration message for the SRS resource set, or a combination thereof.

In some examples, to support determining the reference TTI, the reference TTI determination component 1650 may be configured as or otherwise support a means for determining the reference TTI based on a TTI in which the control signal is transmitted, a TTI indicated by an offset value configured for the SRS resource set, or a combination thereof.

In some examples, the SRS timing information component 1630 may be configured as or otherwise support a means for transmitting, via RRC signaling, a first indication of one or more offset values configured for transmitting at least a subset of the one or more SRSs, a second indication of a vector including respective offset values for each of the one or more SRSs, or both, where the reference TTI is determined based on the first indication, the second indication, or both.

In some examples, to support transmitting the configuration information including the timing information, the reference TTI indication component 1655 may be configured as or otherwise support a means for transmitting a first indication of one or more respective reference TTIs for transmission of each of the one or more SRSs, where the one or more SRSs are received based on the indication.

In some examples, the reference TTI indication component 1655 may be configured as or otherwise support a means for transmitting, via DCI, a second indication of a specific reference TTI of the one or more respective reference TTIs for the UE to transmit each of the one or more SRSs.

In some examples, the specific reference TTI corresponds to a same entry in an order of the one or more respective reference TTIs for each of the one or more SRSs or corresponds to separate entries in the order of the one or more respective reference TTIs for each of the one or more SRSs.

In some examples, to support transmitting the first indication, the reference TTI indication component 1655 may be configured as or otherwise support a means for transmitting one or more vectors indicating the one or more respective reference TTIs for transmission of each of the one or more SRSs.

In some examples, the reference TTI indication component 1655 may be configured as or otherwise support a means for transmitting, via DCI, a second indication of a specific vector of the one or more vectors to indicate the one or more respective reference TTIs for the UE to transmit each of the one or more SRSs.

Additionally or alternatively, the communications manager 1620 may support wireless communications at a base station in accordance with examples as disclosed herein. The SRS set linking indication component 1640 may be configured as or otherwise support a means for transmitting, to a UE, a control signal that indicates an SRS beam management configuration that identifies at least a first SRS resource set and a second SRS resource set, the second SRS resource set linked to the first SRS resource set. The transmit beam determination component 1645 may be configured as or otherwise support a means for determining a first transmit beam for at least one SRS resource of the second SRS resource set based on a second transmit beam for a corresponding SRS resource of the first SRS resource set. In some examples, the SRS reception component 1635 may be configured as or otherwise support a means for receiving the at least one SRS resource of the second SRS resource set via the first transmit beam.

In some examples, to support receiving the at least one SRS resource of the second SRS resource set, the SRS reception component 1635 may be configured as or otherwise support a means for receiving each SRS resource of the second SRS resource set via the first transmit beam.

In some examples, the SRS reception component 1635 may be configured as or otherwise support a means for receiving each SRS resource of the first SRS resource set via the second transmit beam.

In some examples, to support receiving the at least one SRS resource of the second SRS resource set, the SRS reception component 1635 may be configured as or otherwise support a means for receiving each SRS resource of the second SRS resource set via respective different transmit beams, where the first transmit beam for the at least one SRS resource of the second SRS resource set and the second transmit beam for the corresponding SRS resource of the first SRS resource set are a same transmit beam.

In some examples, the transmit beam determination component 1645 may be configured as or otherwise support a means for transmitting, to the UE, an indication of a pattern of transmit beams for the first SRS resource set and the second SRS resource set, where the at least one SRS resource of the second SRS resource set is received via the first transmit beam and the corresponding SRS resource of the first SRS resource set is received via the second transmit beam based on the indication.

In some examples, the SRS set linking indication component 1640 may be configured as or otherwise support a means for transmitting an indication that the first SRS resource set and the second SRS resource set are linked based on a lack of spatial relation information or uplink TCI states being configured for each SRS resource set, each SRS resource set being configured with a same time domain behavior, each SRS resource set not overlapping in the time domain, each SRS resource set being configured with same uplink power control parameters, each SRS resource set having a same number of SRS resources, or a combination thereof.

In some examples, the SRS set linking indication component 1640 may be configured as or otherwise support a means for transmitting, to the UE, an indication that the first SRS resource set and the second SRS resource set are linked via RRC signaling, MAC-CE signaling, DCI, or a combination thereof.

In some examples, the SRS set linking indication component 1640 may be configured as or otherwise support a means for triggering the second SRS resource set when the first SRS resource set is triggered based on the indication.

In some examples, the SRS set linking indication component 1640 may be configured as or otherwise support a means for triggering both the first SRS resource set and the second SRS resource set based on the MAC-CE signaling including a first identifier for the first SRS resource set and an additional indication that the second SRS resource set is to be triggered with the first SRS resource set.

In some examples, the SRS set linking indication component 1640 may be configured as or otherwise support a means for triggering both the first SRS resource set and the second SRS resource set based on the MAC-CE signaling including a first identifier for the first SRS resource set and a second identifier for the second SRS resource set.

In some examples, the SRS set linking indication component 1640 may be configured as or otherwise support a means for triggering both the first SRS resource set and the second SRS resource set based on the DCI indicating that the first SRS resource set and the second SRS resource set are linked out of a set of multiple SRS resource sets.

In some examples, the TPC command component 1660 may be configured as or otherwise support a means for transmitting, to the UE, DCI including a TPC command that adjusts one or more power control parameters for the first SRS resource set and the second SRS resource set.

In some examples, the TPC command component 1660 may be configured as or otherwise support a means for receiving additional instances of the first SRS resource set and the second SRS resource set according to the adjusted one or more power control parameters after first instances of the first SRS resource set and the second SRS resource set have both been fully received based on transmitting the DCI before both first instances of the first SRS resource set and the second SRS resource set have been fully received.

In some cases, the SRS triggering component 1625, the SRS timing information component 1630, the SRS reception component 1635, the SRS set linking indication component 1640, the transmit beam determination component 1645, the reference TTI determination component 1650, the reference TTI indication component 1655, and the TPC command component 1660 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the SRS triggering component 1625, the SRS timing information component 1630, the SRS reception component 1635, the SRS set linking indication component 1640, the transmit beam determination component 1645, the reference TTI determination component 1650, the reference TTI indication component 1655, and the TPC command component 1660 discussed herein.

Figure 17:
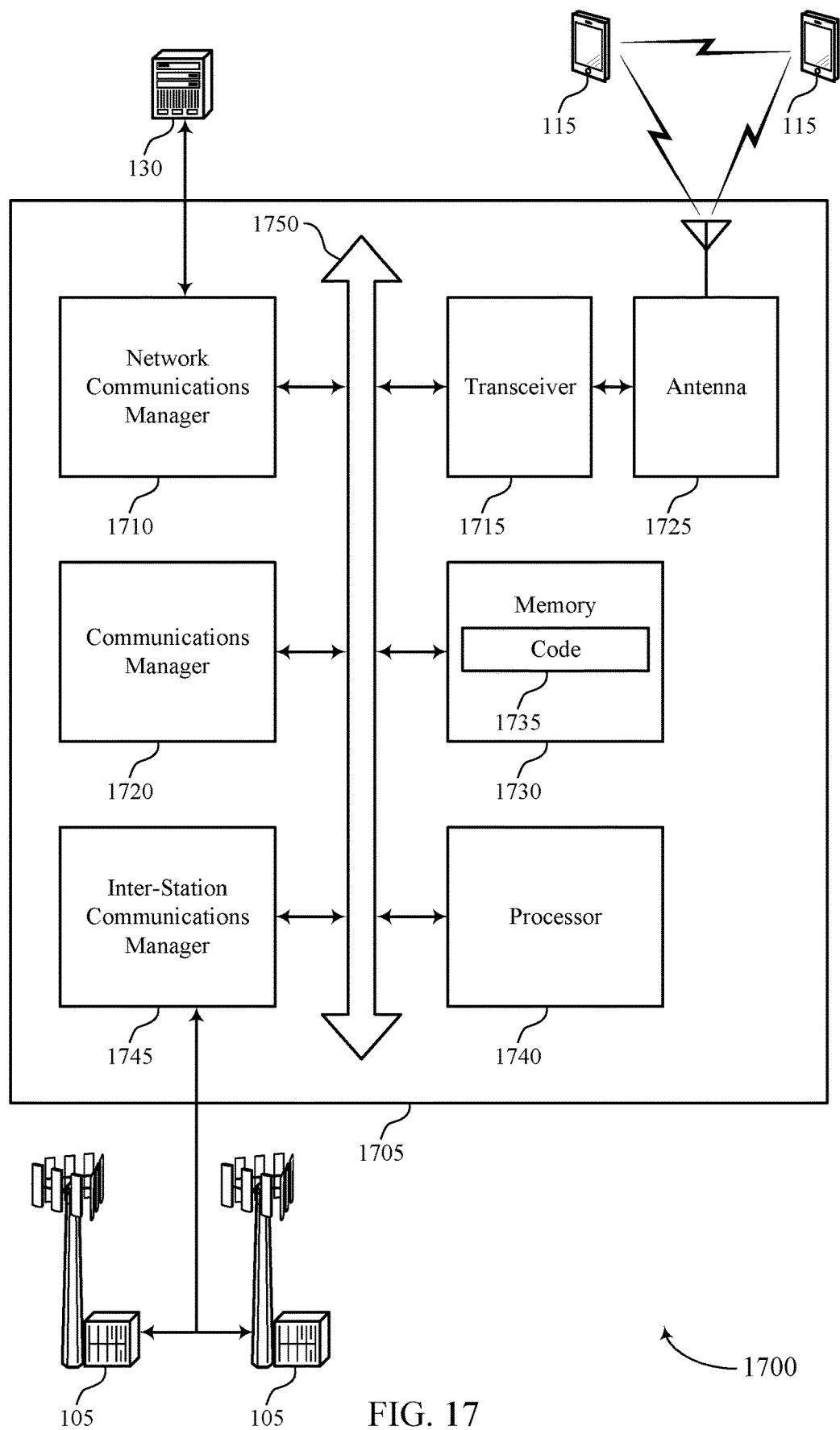
FIG. 17 shows a diagram of a system including a device that supports SRS resource sets across multiple slots in accordance with aspects of the present disclosure.

FIG. 17 shows a diagram of a system 1700 including a device 1705 that supports SRS resource sets across multiple slots in accordance with aspects of the present disclosure. The device 1705 may be an example of or include the components of a device 1405, a device 1505, or a base station 105 as described herein. The device 1705 may communicate wirelessly with one or more base stations 105, UEs 115, or any combination thereof. The device 1705 may include components for bi-directional voice and data communications including components for transmitting and receiving communications, such as a communications manager 1720, a network communications manager 1710, a transceiver 1715, an antenna 1725, a memory 1730, code 1735, a processor 1740, and an inter-station communications manager 1745. These components may be in electronic communication or otherwise coupled (e.g., operatively, communicatively, functionally, electronically, electrically) via one or more buses (e.g., a bus 1750).

The network communications manager 1710 may manage communications with a core network 130 (e.g., via one or more wired backhaul links). For example, the network communications manager 1710 may manage the transfer of data communications for client devices, such as one or more UEs 115.

In some cases, the device 1705 may include a single antenna 1725. However, in some other cases the device 1705 may have more than one antenna 1725, which may be capable of concurrently transmitting or receiving multiple wireless transmissions. The transceiver 1715 may communicate bi-directionally, via the one or more antennas 1725, wired, or wireless links as described herein. For example, the transceiver 1715 may represent a wireless transceiver and may communicate bi-directionally with another wireless transceiver. The transceiver 1715 may also include a modem to modulate the packets, to provide the modulated packets to one or more antennas 1725 for transmission, and to demodulate packets received from the one or more antennas 1725. The transceiver 1715, or the transceiver 1715 and one or more antennas 1725, may be an example of a transmitter 1415, a transmitter 1515, a receiver 1410, a receiver 1510, or any combination thereof or component thereof, as described herein.

The memory 1730 may include RAM and ROM. The memory 1730 may store computer-readable, computer-executable code 1735 including instructions that, when executed by the processor 1740, cause the device 1705 to perform various functions described herein. The code 1735 may be stored in a non-transitory computer-readable medium such as system memory or another type of memory. In some cases, the code 1735 may not be directly executable by the processor 1740 but may cause a computer (e.g., when compiled and executed) to perform functions described herein. In some cases, the memory 1730 may contain, among other things, a BIOS which may control basic hardware or software operation such as the interaction with peripheral components or devices.

The processor 1740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1740 may be configured to operate a memory array using a memory controller. In some other cases, a memory controller may be integrated into the processor 1740. The processor 1740 may be configured to execute computer-readable instructions stored in a memory (e.g., the memory 1730) to cause the device 1705 to perform various functions (e.g., functions or tasks supporting SRS resource sets across multiple slots). For example, the device 1705 or a component of the device 1705 may include a processor 1740 and memory 1730 coupled to the processor 1740, the processor 1740 and memory 1730 configured to perform various functions described herein.

The inter-station communications manager 1745 may manage communications with other base stations 105, and may include a controller or scheduler for controlling communications with UEs 115 in cooperation with other base stations 105. For example, the inter-station communications manager 1745 may coordinate scheduling for transmissions to UEs 115 for various interference mitigation techniques such as beamforming or joint transmission. In some examples, the inter-station communications manager 1745 may provide an X2 interface within an LTE/LTE-A wireless communications network technology to provide communication between base stations 105.

The communications manager 1720 may support wireless communications at a base station in accordance with examples as disclosed herein. For example, the communications manager 1720 may be configured as or otherwise support a means for transmitting, to a UE, a control signal triggering the UE to transmit one or more SRSs of an SRS resource set, the SRS resource set spanning a set of multiple TTIs. The communications manager 1720 may be configured as or otherwise support a means for transmitting, to the UE, configuration information including timing information for transmission of the one or more SRSs relative to a timing of transmission of the control signal, the configuration information indicating respective TTIs of the set of multiple TTIs for the UE to transmit each SRS of the one or more SRSs. The communications manager 1720 may be configured as or otherwise support a means for receiving the one or more SRSs of the SRS resource set based on the transmitted configuration information.

Additionally or alternatively, the communications manager 1720 may support wireless communications at a base station in accordance with examples as disclosed herein. For example, the communications manager 1720 may be configured as or otherwise support a means for transmitting, to a UE, a control signal that indicates an SRS beam management configuration that identifies at least a first SRS resource set and a second SRS resource set, the second SRS resource set linked to the first SRS resource set. The communications manager 1720 may be configured as or otherwise support a means for determining a first transmit beam for at least one SRS resource of the second SRS resource set based on a second transmit beam for a corresponding SRS resource of the first SRS resource set. The communications manager 1720 may be configured as or otherwise support a means for receiving the at least one SRS resource of the second SRS resource set via the first transmit beam.

In some examples, the communications manager 1720 may be configured to perform various operations (e.g., receiving, monitoring, transmitting) using or otherwise in cooperation with the transceiver 1715, the one or more antennas 1725, or any combination thereof. Although the communications manager 1720 is illustrated as a separate component, in some examples, one or more functions described with reference to the communications manager 1720 may be supported by or performed by the processor 1740, the memory 1730, the code 1735, or any combination thereof. For example, the code 1735 may include instructions executable by the processor 1740 to cause the device 1705 to perform various aspects of SRS resource sets across multiple slots as described herein, or the processor 1740 and the memory 1730 may be otherwise configured to perform or support such operations.

Figure 18:
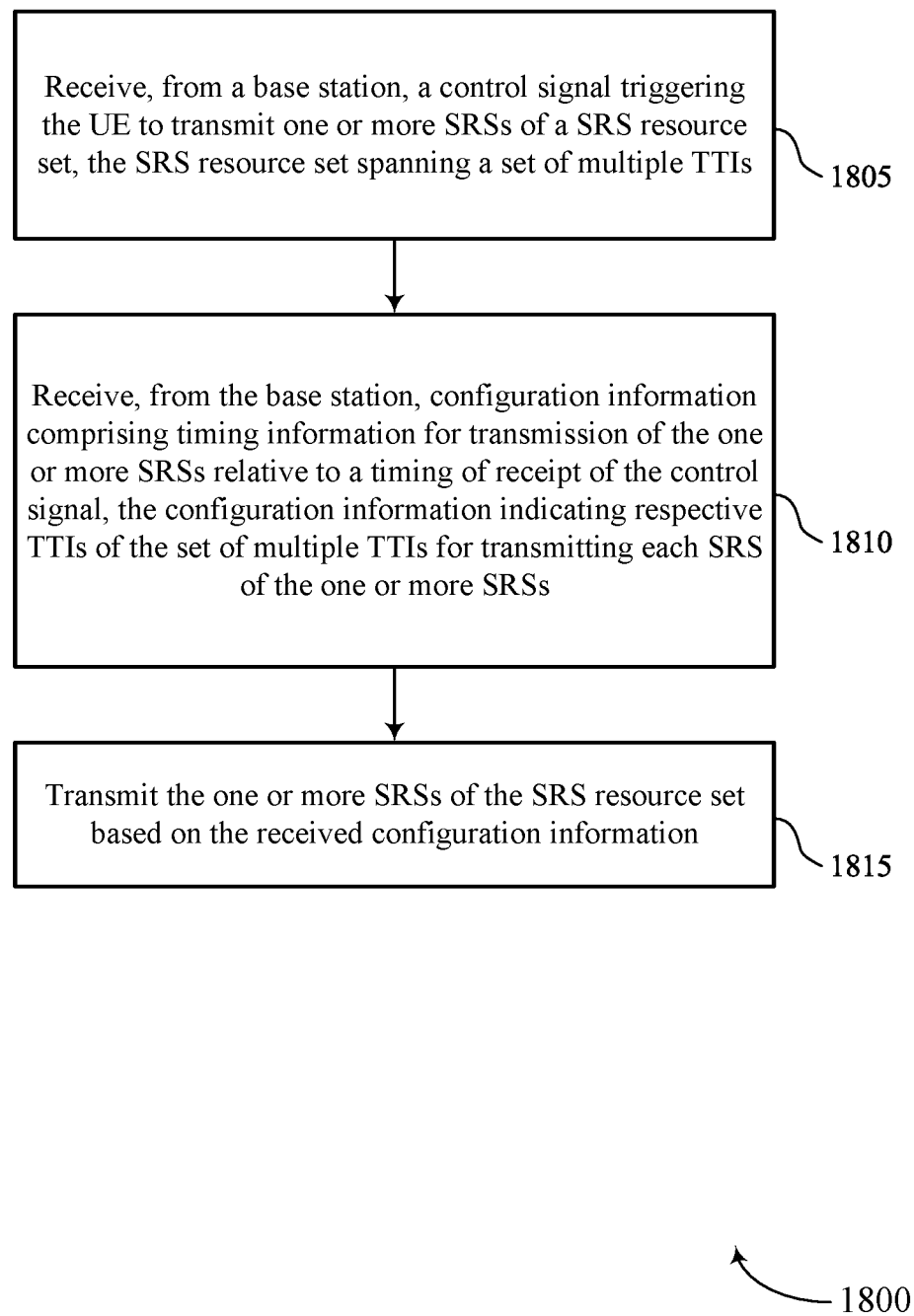
FIGS. 18 through 25 show flowcharts illustrating methods that support SRS resource sets across multiple slots in accordance with aspects of the present disclosure.

FIG. 18 shows a flowchart illustrating a method 1800 that supports SRS resource sets across multiple slots in accordance with aspects of the present disclosure. The operations of the method 1800 may be implemented by a UE or its components as described herein. For example, the operations of the method 1800 may be performed by a UE 115 as described with reference to FIGS. 1 through 13. In some examples, a UE may execute a set of instructions to control the functional elements of the UE to perform the described functions. Additionally or alternatively, the UE may perform aspects of the described functions using special-purpose hardware.

At 1805, the method may include receiving, from a base station, a control signal triggering the UE to transmit one or more SRSs of an SRS resource set, the SRS resource set spanning a set of multiple TTIs. The operations of 1805 may be performed in accordance with examples as disclosed herein. In some examples, aspects of the operations of 1805 may be performed by an SRS transmission triggering component 1225 as described with reference to FIG. 12.

At 1810, the method may include receiving, from the base station, configuration information including timing information for transmission of the one or more SRSs relative to a timing of receipt of the control signal, the configuration information indicating respective TTIs of the set of multiple TTIs for transmitting each SRS of the one or more SRSs. The operations of 1810 may be performed in accordance with examples as disclosed herein. In some examples, aspects of the operations of 1810 may be performed by an SRS timing information component 1230 as described with reference to FIG. 12.

At 1815, the method may include transmitting the one or more SRSs of the SRS resource set based on the received configuration information. The operations of 1815 may be performed in accordance with examples as disclosed herein. In some examples, aspects of the operations of 1815 may be performed by an SRS transmission component 1235 as described with reference to FIG. 12.

Figure 19:
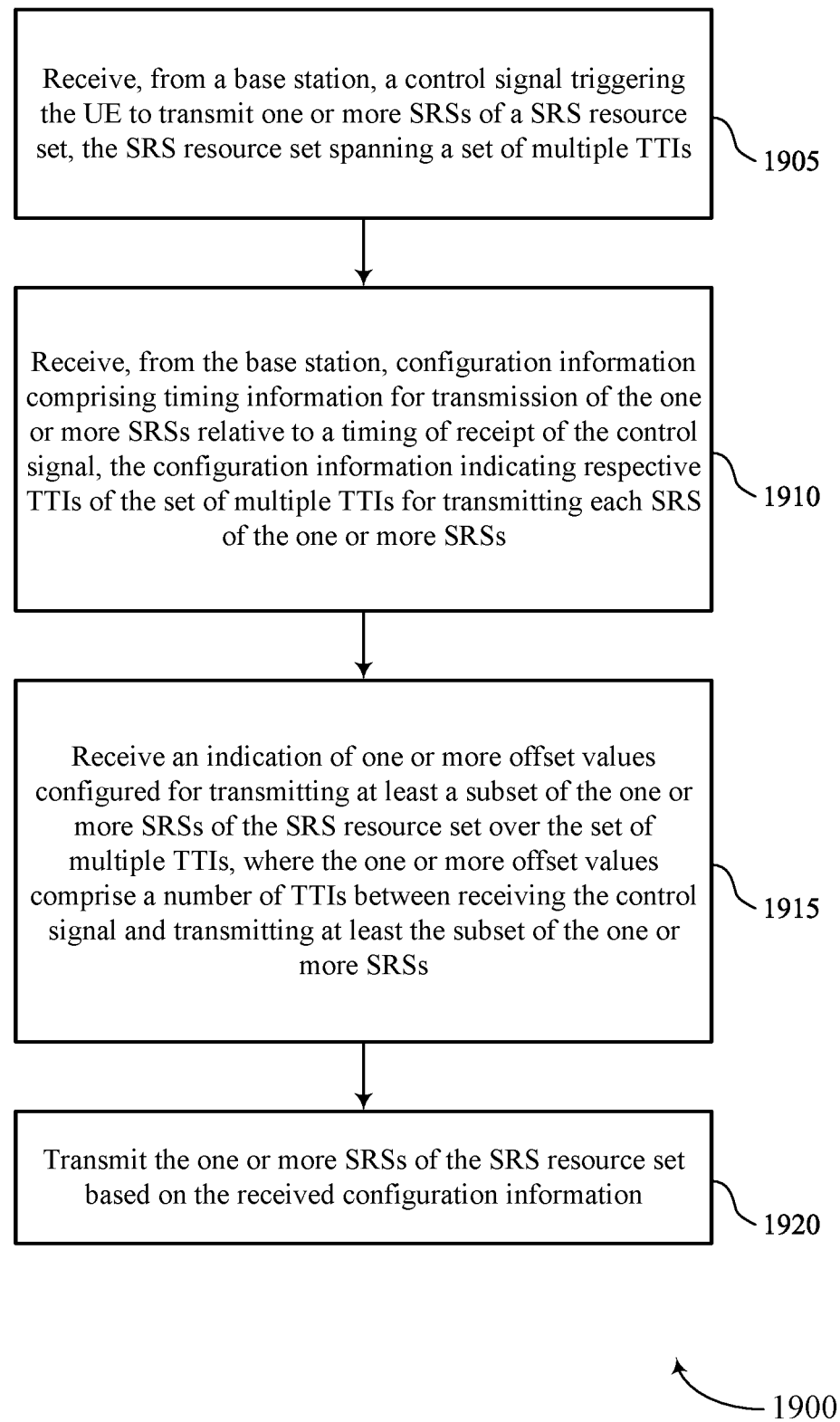

FIG. 19 shows a flowchart illustrating a method 1900 that supports SRS resource sets across multiple slots in accordance with aspects of the present disclosure. The operations of the method 1900 may be implemented by a UE or its components as described herein. For example, the operations of the method 1900 may be performed by a UE 115 as described with reference to FIGS. 1 through 13. In some examples, a UE may execute a set of instructions to control the functional elements of the UE to perform the described functions. Additionally or alternatively, the UE may perform aspects of the described functions using special-purpose hardware.

At 1905, the method may include receiving, from a base station, a control signal triggering the UE to transmit one or more SRSs of an SRS resource set, the SRS resource set spanning a set of multiple TTIs. The operations of 1905 may be performed in accordance with examples as disclosed herein. In some examples, aspects of the operations of 1905 may be performed by an SRS transmission triggering component 1225 as described with reference to FIG. 12.

At 1910, the method may include receiving, from the base station, configuration information including timing information for transmission of the one or more SRSs relative to a timing of receipt of the control signal, the configuration information indicating respective TTIs of the set of multiple TTIs for transmitting each SRS of the one or more SRSs. The operations of 1910 may be performed in accordance with examples as disclosed herein. In some examples, aspects of the operations of 1910 may be performed by an SRS timing information component 1230 as described with reference to FIG. 12.

At 1915, the method may include receiving an indication of one or more offset values configured for transmitting at least a subset of the one or more SRSs of the SRS resource set over the set of multiple TTIs, where the one or more offset values include a number of TTIs between receiving the control signal and transmitting at least the subset of the one or more SRSs. The operations of 1915 may be performed in accordance with examples as disclosed herein. In some examples, aspects of the operations of 1915 may be performed by an SRS timing information component 1230 as described with reference to FIG. 12.

At 1920, the method may include transmitting the one or more SRSs of the SRS resource set based on the received configuration information. The operations of 1920 may be performed in accordance with examples as disclosed herein. In some examples, aspects of the operations of 1920 may be performed by an SRS transmission component 1235 as described with reference to FIG. 12.

Figure 20:
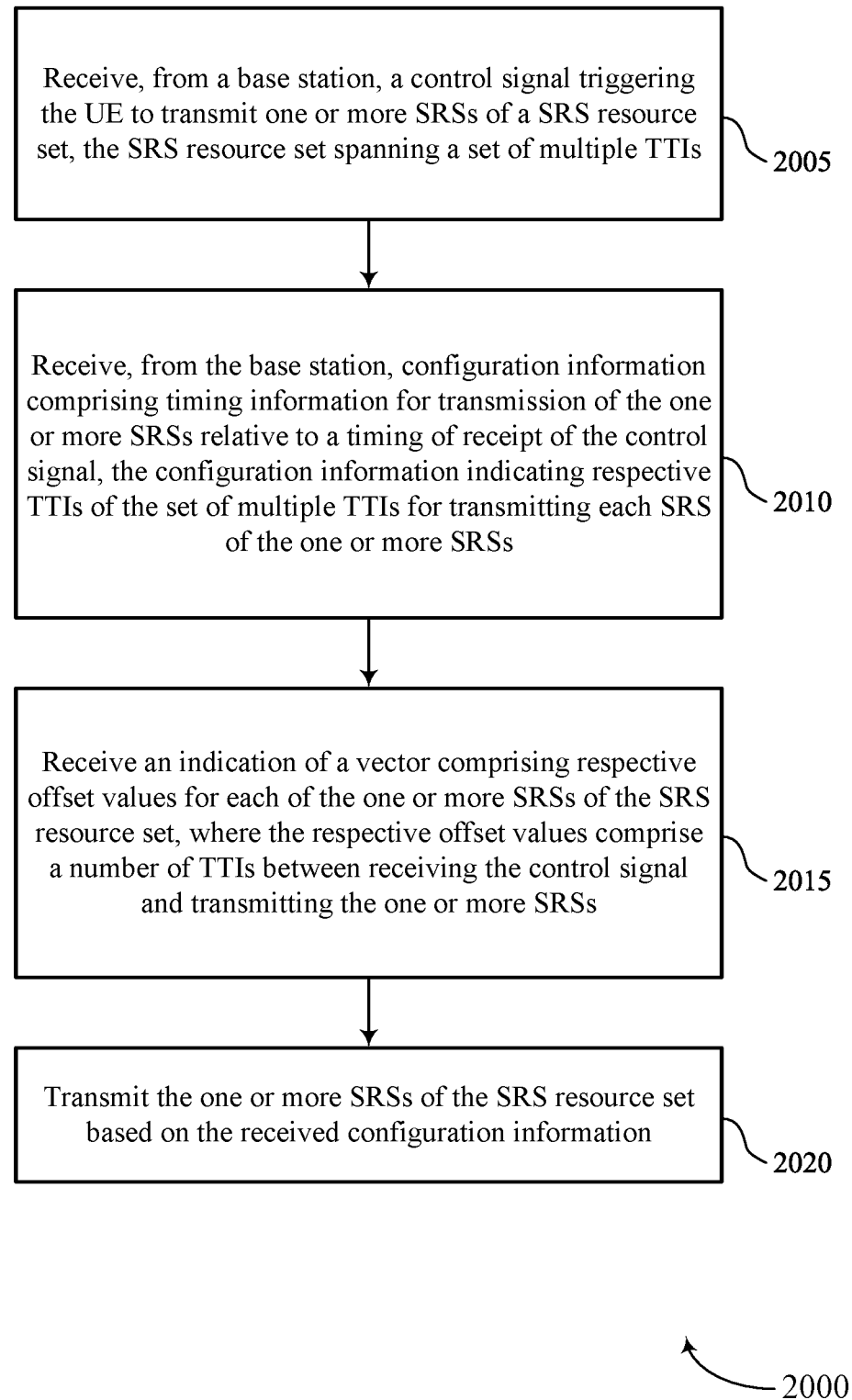

FIG. 20 shows a flowchart illustrating a method 2000 that supports SRS resource sets across multiple slots in accordance with aspects of the present disclosure. The operations of the method 2000 may be implemented by a UE or its components as described herein. For example, the operations of the method 2000 may be performed by a UE 115 as described with reference to FIGS. 1 through 13. In some examples, a UE may execute a set of instructions to control the functional elements of the UE to perform the described functions. Additionally or alternatively, the UE may perform aspects of the described functions using special-purpose hardware.

At 2005, the method may include receiving, from a base station, a control signal triggering the UE to transmit one or more SRSs of an SRS resource set, the SRS resource set spanning a set of multiple TTIs. The operations of 2005 may be performed in accordance with examples as disclosed herein. In some examples, aspects of the operations of 2005 may be performed by an SRS transmission triggering component 1225 as described with reference to FIG. 12.

At 2010, the method may include receiving, from the base station, configuration information including timing information for transmission of the one or more SRSs relative to a timing of receipt of the control signal, the configuration information indicating respective TTIs of the set of multiple TTIs for transmitting each SRS of the one or more SRSs. The operations of 2010 may be performed in accordance with examples as disclosed herein. In some examples, aspects of the operations of 2010 may be performed by an SRS timing information component 1230 as described with reference to FIG. 12.

At 2015, the method may include receiving an indication of a vector including respective offset values for each of the one or more SRSs of the SRS resource set, where the respective offset values include a number of TTIs between receiving the control signal and transmitting the one or more SRSs. The operations of 2015 may be performed in accordance with examples as disclosed herein. In some examples, aspects of the operations of 2015 may be performed by an SRS timing information component 1230 as described with reference to FIG. 12.

At 2020, the method may include transmitting the one or more SRSs of the SRS resource set based on the received configuration information. The operations of 2020 may be performed in accordance with examples as disclosed herein. In some examples, aspects of the operations of 2020 may be performed by an SRS transmission component 1235 as described with reference to FIG. 12.

Figure 21:
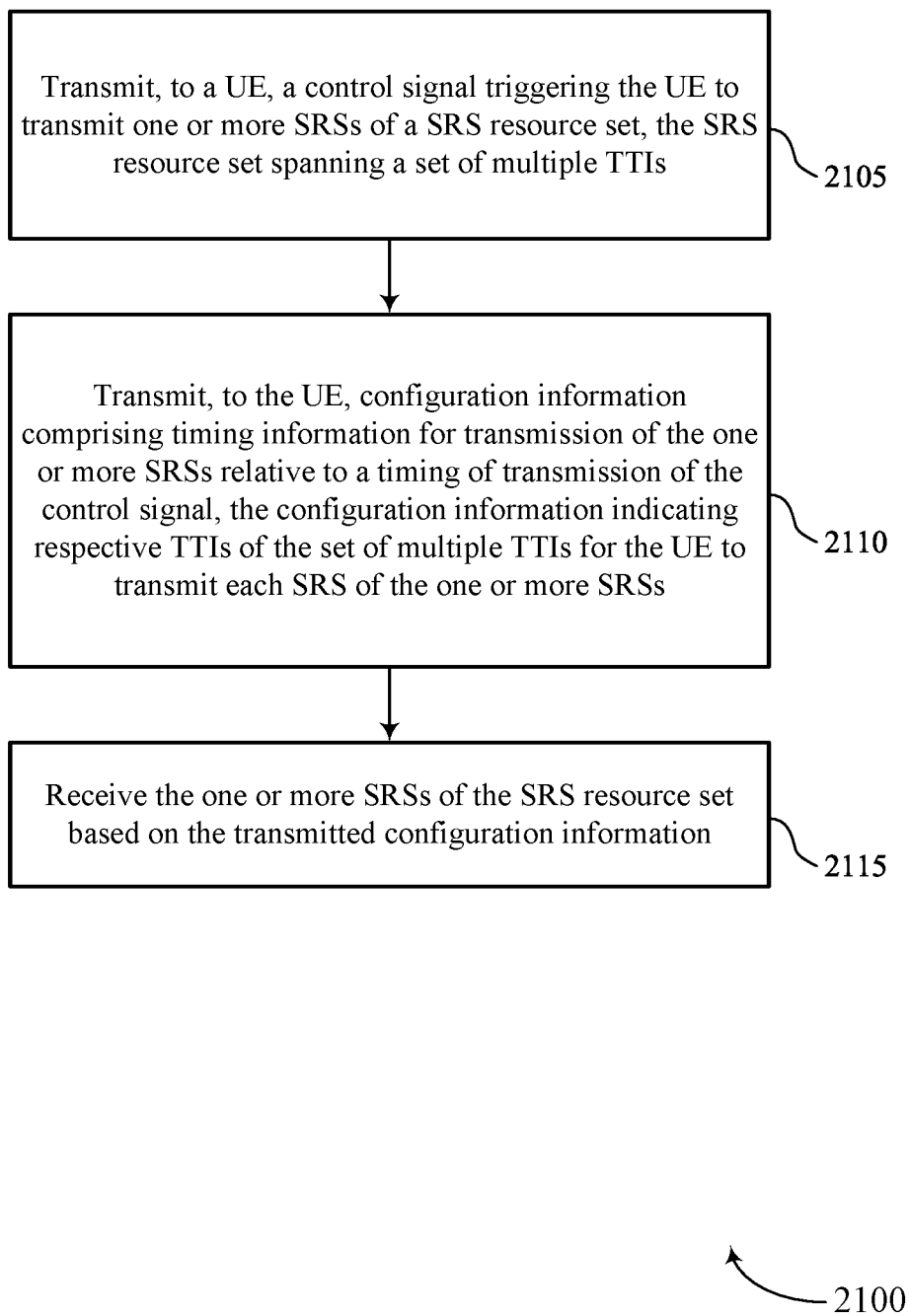

FIG. 21 shows a flowchart illustrating a method 2100 that supports SRS resource sets across multiple slots in accordance with aspects of the present disclosure. The operations of the method 2100 may be implemented by a base station or its components as described herein. For example, the operations of the method 2100 may be performed by a base station 105 as described with reference to FIGS. 1 through 9 and 14 through 17. In some examples, a base station may execute a set of instructions to control the functional elements of the base station to perform the described functions. Additionally or alternatively, the base station may perform aspects of the described functions using special-purpose hardware.

At 2105, the method may include transmitting, to a UE, a control signal triggering the UE to transmit one or more SRSs of an SRS resource set, the SRS resource set spanning a set of multiple TTIs. The operations of 2105 may be performed in accordance with examples as disclosed herein. In some examples, aspects of the operations of 2105 may be performed by an SRS triggering component 1625 as described with reference to FIG. 16.

At 2110, the method may include transmitting, to the UE, configuration information including timing information for transmission of the one or more SRSs relative to a timing of transmission of the control signal, the configuration information indicating respective TTIs of the set of multiple TTIs for the UE to transmit each SRS of the one or more SRSs. The operations of 2110 may be performed in accordance with examples as disclosed herein. In some examples, aspects of the operations of 2110 may be performed by an SRS timing information component 1630 as described with reference to FIG. 16.

At 2115, the method may include receiving the one or more SRSs of the SRS resource set based on the transmitted configuration information. The operations of 2115 may be performed in accordance with examples as disclosed herein. In some examples, aspects of the operations of 2115 may be performed by an SRS reception component 1635 as described with reference to FIG. 16.

Figure 22:
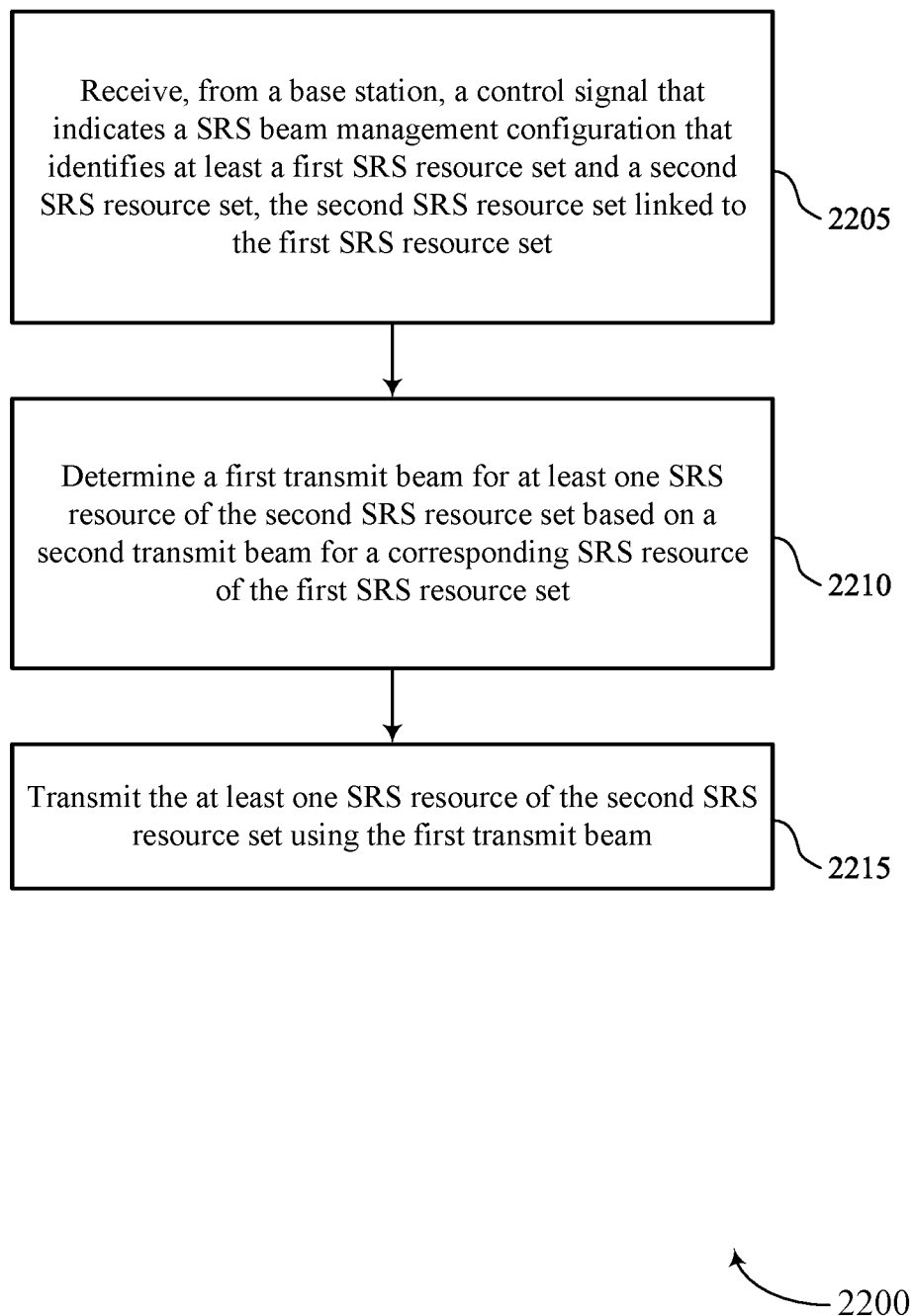

FIG. 22 shows a flowchart illustrating a method 2200 that supports SRS resource sets across multiple slots in accordance with aspects of the present disclosure. The operations of the method 2200 may be implemented by a UE or its components as described herein. For example, the operations of the method 2200 may be performed by a UE 115 as described with reference to FIGS. 1 through 13. In some examples, a UE may execute a set of instructions to control the functional elements of the UE to perform the described functions. Additionally or alternatively, the UE may perform aspects of the described functions using special-purpose hardware.

At 2205, the method may include receiving, from a base station, a control signal that indicates an SRS beam management configuration that identifies at least a first SRS resource set and a second SRS resource set, the second SRS resource set linked to the first SRS resource set. The operations of 2205 may be performed in accordance with examples as disclosed herein. In some examples, aspects of the operations of 2205 may be performed by an SRS set linking component 1240 as described with reference to FIG. 12.

At 2210, the method may include determining a first transmit beam for at least one SRS resource of the second SRS resource set based on a second transmit beam for a corresponding SRS resource of the first SRS resource set. The operations of 2210 may be performed in accordance with examples as disclosed herein. In some examples, aspects of the operations of 2210 may be performed by an SRS transmit beam component 1245 as described with reference to FIG. 12.

At 2215, the method may include transmitting the at least one SRS resource of the second SRS resource set using the first transmit beam. The operations of 2215 may be performed in accordance with examples as disclosed herein. In some examples, aspects of the operations of 2215 may be performed by an SRS transmission component 1235 as described with reference to FIG. 12.

Figure 23:
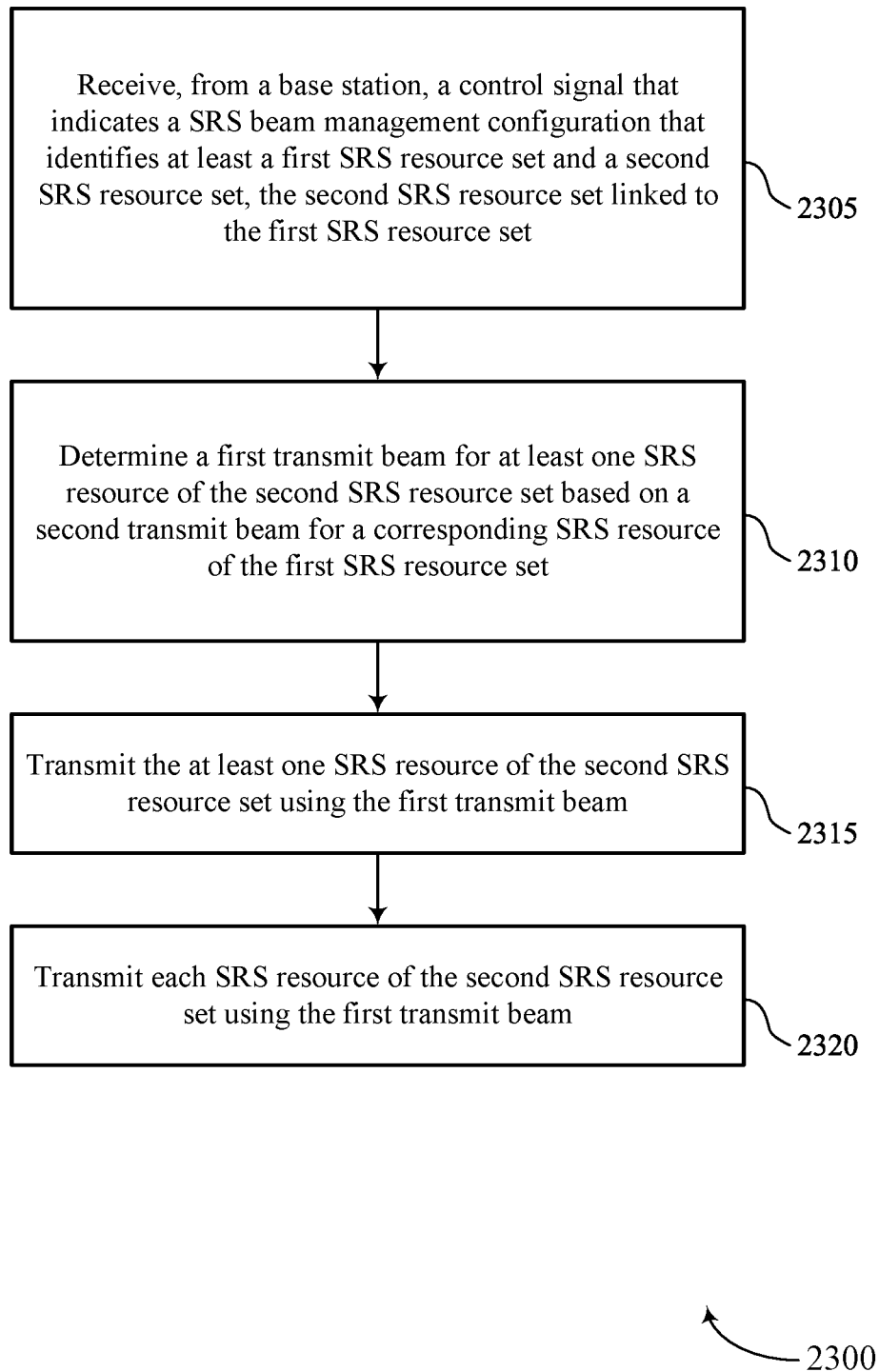

FIG. 23 shows a flowchart illustrating a method 2300 that supports SRS resource sets across multiple slots in accordance with aspects of the present disclosure. The operations of the method 2300 may be implemented by a UE or its components as described herein. For example, the operations of the method 2300 may be performed by a UE 115 as described with reference to FIGS. 1 through 13. In some examples, a UE may execute a set of instructions to control the functional elements of the UE to perform the described functions. Additionally or alternatively, the UE may perform aspects of the described functions using special-purpose hardware.

At 2305, the method may include receiving, from a base station, a control signal that indicates an SRS beam management configuration that identifies at least a first SRS resource set and a second SRS resource set, the second SRS resource set linked to the first SRS resource set. The operations of 2305 may be performed in accordance with examples as disclosed herein. In some examples, aspects of the operations of 2305 may be performed by an SRS set linking component 1240 as described with reference to FIG. 12.

At 2310, the method may include determining a first transmit beam for at least one SRS resource of the second SRS resource set based on a second transmit beam for a corresponding SRS resource of the first SRS resource set. The operations of 2310 may be performed in accordance with examples as disclosed herein. In some examples, aspects of the operations of 2310 may be performed by an SRS transmit beam component 1245 as described with reference to FIG. 12.

At 2315, the method may include transmitting the at least one SRS resource of the second SRS resource set using the first transmit beam. The operations of 2315 may be performed in accordance with examples as disclosed herein. In some examples, aspects of the operations of 2315 may be performed by an SRS transmission component 1235 as described with reference to FIG. 12.

At 2320, the method may include transmitting each SRS resource of the second SRS resource set using the first transmit beam. The operations of 2320 may be performed in accordance with examples as disclosed herein. In some examples, aspects of the operations of 2320 may be performed by an SRS transmission component 1235 as described with reference to FIG. 12.

Figure 24:
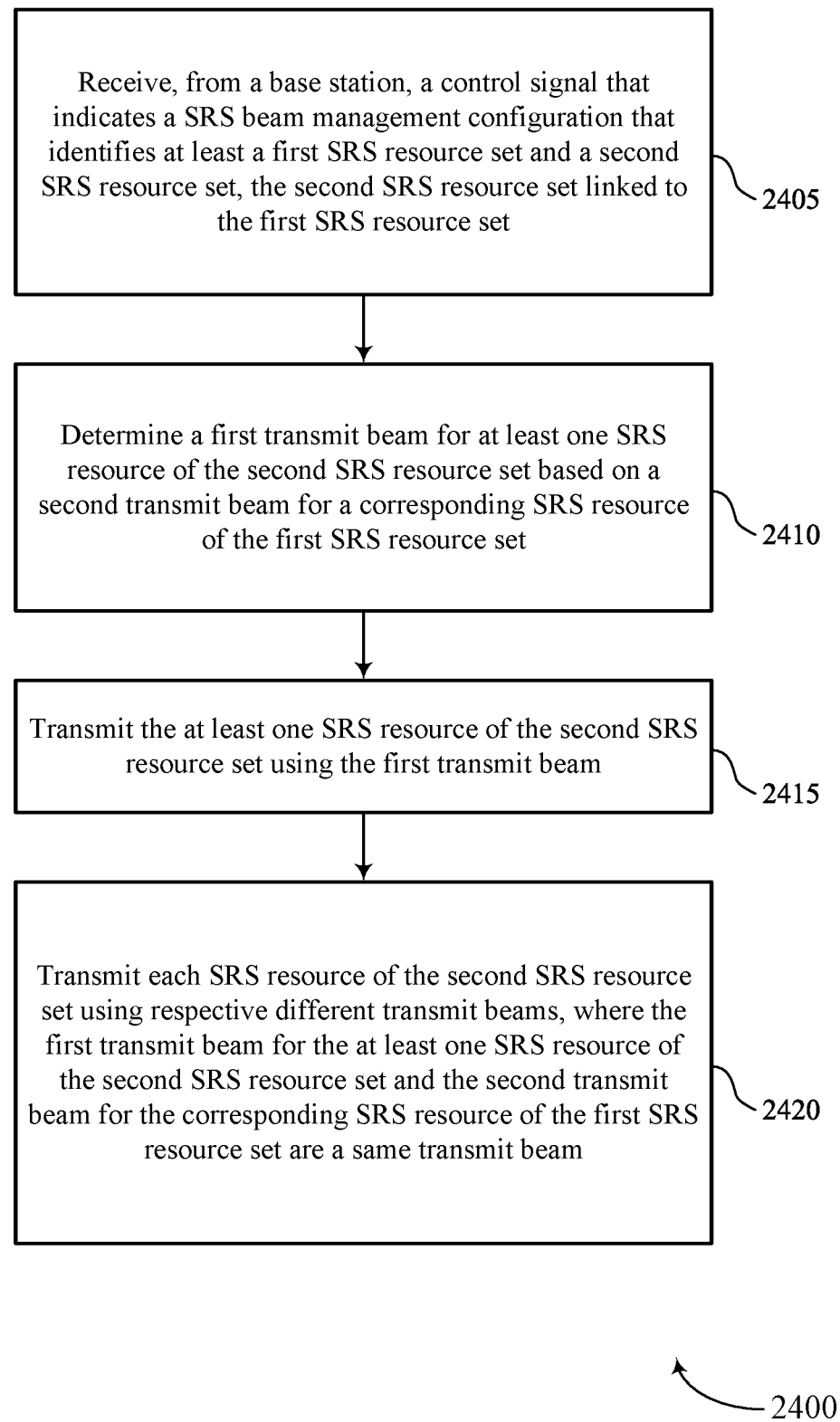

FIG. 24 shows a flowchart illustrating a method 2400 that supports SRS resource sets across multiple slots in accordance with aspects of the present disclosure. The operations of the method 2400 may be implemented by a UE or its components as described herein. For example, the operations of the method 2400 may be performed by a UE 115 as described with reference to FIGS. 1 through 13. In some examples, a UE may execute a set of instructions to control the functional elements of the UE to perform the described functions. Additionally or alternatively, the UE may perform aspects of the described functions using special-purpose hardware.

At 2405, the method may include receiving, from a base station, a control signal that indicates an SRS beam management configuration that identifies at least a first SRS resource set and a second SRS resource set, the second SRS resource set linked to the first SRS resource set. The operations of 2405 may be performed in accordance with examples as disclosed herein. In some examples, aspects of the operations of 2405 may be performed by an SRS set linking component 1240 as described with reference to FIG. 12.

At 2410, the method may include determining a first transmit beam for at least one SRS resource of the second SRS resource set based on a second transmit beam for a corresponding SRS resource of the first SRS resource set. The operations of 2410 may be performed in accordance with examples as disclosed herein. In some examples, aspects of the operations of 2410 may be performed by an SRS transmit beam component 1245 as described with reference to FIG. 12.

At 2415, the method may include transmitting the at least one SRS resource of the second SRS resource set using the first transmit beam. The operations of 2415 may be performed in accordance with examples as disclosed herein. In some examples, aspects of the operations of 2415 may be performed by an SRS transmission component 1235 as described with reference to FIG. 12.

At 2420, the method may include transmitting each SRS resource of the second SRS resource set using respective different transmit beams, where the first transmit beam for the at least one SRS resource of the second SRS resource set and the second transmit beam for the corresponding SRS resource of the first SRS resource set are a same transmit beam. The operations of 2420 may be performed in accordance with examples as disclosed herein. In some examples, aspects of the operations of 2420 may be performed by an SRS transmission component 1235 as described with reference to FIG. 12.

Figure 25:
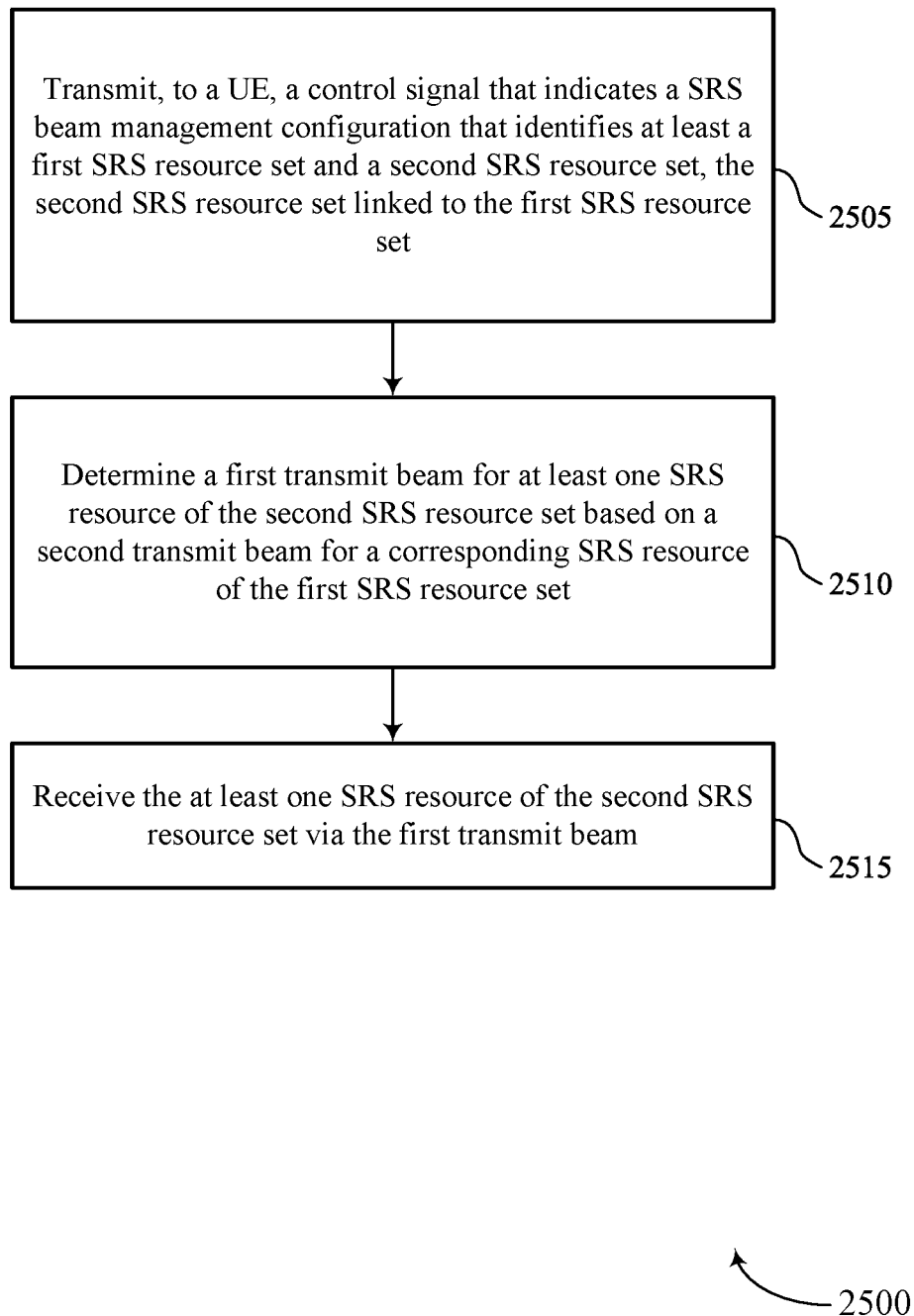

FIG. 25 shows a flowchart illustrating a method 2500 that supports SRS resource sets across multiple slots in accordance with aspects of the present disclosure. The operations of the method 2500 may be implemented by a base station or its components as described herein. For example, the operations of the method 2500 may be performed by a base station 105 as described with reference to FIGS. 1 through 9 and 14 through 17. In some examples, a base station may execute a set of instructions to control the functional elements of the base station to perform the described functions. Additionally or alternatively, the base station may perform aspects of the described functions using special-purpose hardware.

At 2505, the method may include transmitting, to a UE, a control signal that indicates an SRS beam management configuration that identifies at least a first SRS resource set and a second SRS resource set, the second SRS resource set linked to the first SRS resource set. The operations of 2505 may be performed in accordance with examples as disclosed herein. In some examples, aspects of the operations of 2505 may be performed by an SRS set linking indication component 1640 as described with reference to FIG. 16.

At 2510, the method may include determining a first transmit beam for at least one SRS resource of the second SRS resource set based on a second transmit beam for a corresponding SRS resource of the first SRS resource set. The operations of 2510 may be performed in accordance with examples as disclosed herein. In some examples, aspects of the operations of 2510 may be performed by a transmit beam determination component 1645 as described with reference to FIG. 16.

At 2515, the method may include receiving the at least one SRS resource of the second SRS resource set via the first transmit beam. The operations of 2515 may be performed in accordance with examples as disclosed herein. In some examples, aspects of the operations of 2515 may be performed by an SRS reception component 1635 as described with reference to FIG. 16.

The following provides an overview of aspects of the present disclosure:

Aspect 1: A method for wireless communications at a UE, comprising: receiving, from a base station, a control signal triggering the UE to transmit one or more sounding reference signals of a sounding reference signal resource set, the sounding reference signal resource set spanning a plurality of transmission time intervals; receiving, from the base station, configuration information comprising timing information for transmission of the one or more sounding reference signals relative to a timing of receipt of the control signal, the configuration information indicating respective transmission time intervals of the plurality of transmission time intervals for transmitting each sounding reference signal of the one or more sounding reference signals; and transmitting the one or more sounding reference signals of the sounding reference signal resource set based at least in part on the received configuration information.

Aspect 2: The method of aspect 1, wherein receiving the configuration information comprising the timing information comprises: receiving an indication of one or more offset values configured for transmitting at least a subset of the one or more sounding reference signals of the sounding reference signal resource set over the plurality of transmission time intervals, wherein the one or more offset values comprise a number of transmission time intervals between receiving the control signal and transmitting at least the subset of the one or more sounding reference signals.

Aspect 3: The method of aspect 2, further comprising: transmitting each of the one or more sounding reference signals of the sounding reference signal resource set over the plurality of transmission time intervals using the one or more offset values instead of an offset value configured for the sounding reference signal resource set based at least in part on receiving the indication of the one or more offsets.

Aspect 4: The method of aspect 2, further comprising: transmitting a first subset of the one or more sounding reference signals of the sounding reference signal resource set using an offset value configured for the sounding reference signal resource set; and transmitting a second subset of the one or more sounding reference signals of the sounding reference signal resource set using the one or more offset values.

Aspect 5: The method of aspect 1, wherein receiving the configuration information comprising the timing information comprises: receiving an indication of a vector comprising respective offset values for each of the one or more sounding reference signals of the sounding reference signal resource set, wherein the respective offset values comprise a number of transmission time intervals between receiving the control signal and transmitting the one or more sounding reference signals.

Aspect 6: The method of aspect 5, further comprising: transmitting the one or more sounding reference signals of the sounding reference signal resource set using the respective offset values instead of an offset value configured for the sounding reference signal resource set based at least in part on receiving the indication of the vector.

Aspect 7: The method of aspect 5, further comprising: transmitting the one or more sounding reference signals of the sounding reference signal resource set based at least in part on the respective offset values and an offset value configured for the sounding reference signal resource set.

Aspect 8: The method of any of aspects 1 through 7, further comprising: determining a reference transmission time interval for the timing information received in the configuration information; and transmitting the one or more sounding reference signals of the sounding reference signal resource set based at least in part on the reference transmission time interval.

Aspect 9: The method of aspect 8, wherein transmitting the one or more sounding reference signals of the sounding reference signal resource set comprises: transmitting each of the one or more sounding reference signals based at least in part on respective transmission time intervals after the reference transmission time interval that comprise available resources for carrying corresponding sounding reference signals of the one or more sounding reference signals.

Aspect 10: The method of aspect 9, further comprising: transmitting each of the one or more sounding reference signals over the respective transmission time intervals based at least in part on not expecting collisions between different sounding reference signals of the one or more sounding reference signals.

Aspect 11: The method of any of aspects 9 through 10, further comprising: transmitting each of the one or more sounding reference signals over the respective transmission time intervals based at least in part on a priority for the one or more sounding reference signals.

Aspect 12: The method of aspect 11, wherein the priority is based at least in part on a sounding reference signal resource identifier for each of the one or more sounding reference signals, an ordering of the one or more sounding reference signals in a configuration message for the sounding reference signal resource set, or a combination thereof.

Aspect 13: The method of any of aspects 8 through 12, wherein determining the reference transmission time interval comprises: determining the reference transmission time interval based at least in part on a transmission time interval in which the control signal is received, a transmission time interval indicated by an offset value configured for the sounding reference signal resource set, radio resource control signaling, downlink control information, or a combination thereof.

Aspect 14: The method of any of aspects 8 through 13, further comprising: receiving, via radio resource control signaling, a first indication of one or more offset values configured for transmitting at least a subset of the one or more sounding reference signals, a second indication of a vector comprising respective offset values for each of the one or more sounding reference signals, or both, wherein the reference transmission time interval is determined based at least in part on the first indication, the second indication, or both.

Aspect 15: The method of any of aspects 1 through 14, wherein receiving the configuration information comprising the timing information comprises: receiving a first indication of one or more respective reference transmission time intervals for transmission of each of the one or more sounding reference signals, wherein the one or more sounding reference signals are transmitted based at least in part on the indication.

Aspect 16: The method of aspect 15, further comprising: receiving, via downlink control information, a second indication of a specific reference transmission time interval of the one or more respective reference transmission time intervals for transmission of each of the one or more sounding reference signals.

Aspect 17: The method of aspect 16, wherein the specific reference transmission time interval corresponds to a same entry in an order of the one or more respective reference transmission time intervals for each of the one or more sounding reference signals or corresponds to separate entries in the order of the one or more respective reference transmission time intervals for each of the one or more sounding reference signals.

Aspect 18: The method of any of aspects 15 through 17, wherein receiving the first indication comprises: receiving one or more vectors indicating the one or more respective reference transmission time intervals for transmission of each of the one or more sounding reference signals.

Aspect 19: The method of aspect 18, further comprising: receiving, via downlink control information, a second indication of a specific vector of the one or more vectors to indicate the one or more respective reference transmission time intervals for transmission of each of the one or more sounding reference signals.

Aspect 20: A method for wireless communications at a base station, comprising: transmitting, to a UE, a control signal triggering the UE to transmit one or more sounding reference signals of a sounding reference signal resource set, the sounding reference signal resource set spanning a plurality of transmission time intervals; transmitting, to the UE, configuration information comprising timing information for transmission of the one or more sounding reference signals relative to a timing of transmission of the control signal, the configuration information indicating respective transmission time intervals of the plurality of transmission time intervals for the UE to transmit each sounding reference signal of the one or more sounding reference signals; and receiving the one or more sounding reference signals of the sounding reference signal resource set based at least in part on the transmitted configuration information.

Aspect 21: The method of aspect 20, wherein transmitting the configuration information comprising the timing information comprises: transmitting an indication of one or more offset values configured for the UE to transmit at least a subset of the one or more sounding reference signals of the sounding reference signal resource set over the plurality of transmission time intervals, wherein the one or more offset values comprise a number of transmission time intervals between transmitting the control signal and receiving at least the subset of the one or more sounding reference signals.

Aspect 22: The method of aspect 21, further comprising: receiving each of the one or more sounding reference signals of the sounding reference signal resource set over the plurality of transmission time intervals according to the one or more offset values instead of an offset value configured for the sounding reference signal resource set based at least in part on transmitting the indication of the one or more offsets.

Aspect 23: The method of aspect 21, further comprising: receiving a first subset of the one or more sounding reference signals of the sounding reference signal resource set according to an offset value configured for the sounding reference signal resource set; and receiving a second subset of the one or more sounding reference signals of the sounding reference signal resource set according to the one or more offset values.

Aspect 24: The method of aspect 20, wherein transmitting the configuration information comprising the timing information comprises: transmitting an indication of a vector comprising respective offset values for each of the one or more sounding reference signals of the sounding reference signal resource set, wherein the respective offset values comprise a number of transmission time intervals between transmitting the control signal and receiving the one or more sounding reference signals.

Aspect 25: The method of aspect 24, further comprising: receiving the one or more sounding reference signals of the sounding reference signal resource set according to the respective offset values instead of an offset value configured for the sounding reference signal resource set based at least in part on transmitting the indication of the vector.

Aspect 26: The method of any of aspects 24 through 25, further comprising: receiving the one or more sounding reference signals of the sounding reference signal resource set based at least in part on the respective offset values and an offset value configured for the sounding reference signal resource set.

Aspect 27: The method of any of aspects 20 through 26, further comprising: determining a reference transmission time interval for the timing information received in the configuration information; and receiving the one or more sounding reference signals of the sounding reference signal resource set based at least in part on the reference transmission time interval.

Aspect 28: The method of aspect 27, wherein receiving the one or more sounding reference signals of the sounding reference signal resource set comprises: receiving each of the one or more sounding reference signals based at least in part on respective transmission time intervals after the reference transmission time interval that comprise available resources for carrying corresponding sounding reference signals of the one or more sounding reference signals.

Aspect 29: The method of aspect 28, further comprising: receiving each of the one or more sounding reference signals over the respective transmission time intervals based at least in part on a priority for the one or more sounding reference signals.

Aspect 30: The method of aspect 29, wherein the priority is based at least in part on a sounding reference signal resource identifier for each of the one or more sounding reference signals, an ordering of the one or more sounding reference signals in a configuration message for the sounding reference signal resource set, or a combination thereof.

Aspect 31: The method of any of aspects 27 through 30, wherein determining the reference transmission time interval comprises: determining the reference transmission time interval based at least in part on a transmission time interval in which the control signal is transmitted, a transmission time interval indicated by an offset value configured for the sounding reference signal resource set, or a combination thereof.

Aspect 32: The method of any of aspects 27 through 31, further comprising: transmitting, via radio resource control signaling, a first indication of one or more offset values configured for transmitting at least a subset of the one or more sounding reference signals, a second indication of a vector comprising respective offset values for each of the one or more sounding reference signals, or both, wherein the reference transmission time interval is determined based at least in part on the first indication, the second indication, or both.

Aspect 33: The method of any of aspects 20 through 32, wherein transmitting the configuration information comprising the timing information comprises: transmitting a first indication of one or more respective reference transmission time intervals for transmission of each of the one or more sounding reference signals, wherein the one or more sounding reference signals are received based at least in part on the indication.

Aspect 34: The method of aspect 33, further comprising: transmitting, via downlink control information, a second indication of a specific reference transmission time interval of the one or more respective reference transmission time intervals for the UE to transmit each of the one or more sounding reference signals.

Aspect 35: The method of aspect 34, wherein the specific reference transmission time interval corresponds to a same entry in an order of the one or more respective reference transmission time intervals for each of the one or more sounding reference signals or corresponds to separate entries in the order of the one or more respective reference transmission time intervals for each of the one or more sounding reference signals.

Aspect 36: The method of any of aspects 33 through 35, wherein transmitting the first indication comprises: transmitting one or more vectors indicating the one or more respective reference transmission time intervals for transmission of each of the one or more sounding reference signals.

Aspect 37: The method of aspect 36, further comprising: transmitting, via downlink control information, a second indication of a specific vector of the one or more vectors to indicate the one or more respective reference transmission time intervals for the UE to transmit each of the one or more sounding reference signals.

Aspect 38: A method for wireless communications at a UE, comprising: receiving, from a base station, a control signal that indicates a sounding reference signal beam management configuration that identifies at least a first sounding reference signal resource set and a second sounding reference signal resource set, the second sounding reference signal resource set linked to the first sounding reference signal resource set; determining a first transmit beam for at least one sounding reference signal resource of the second sounding reference signal resource set based at least in part on a second transmit beam for a corresponding sounding reference signal resource of the first sounding reference signal resource set; and transmitting the at least one sounding reference signal resource of the second sounding reference signal resource set using the first transmit beam.

Aspect 39: The method of aspect 38, wherein transmitting the at least one sounding reference signal resource of the second sounding reference signal resource set comprises: transmitting each sounding reference signal resource of the second sounding reference signal resource set using the first transmit beam.

Aspect 40: The method of aspect 39, further comprising: transmitting each sounding reference signal resource of the first sounding reference signal resource set using the second transmit beam.

Aspect 41: The method of aspect 38, wherein transmitting the at least one sounding reference signal resource of the second sounding reference signal resource set comprises:

transmitting each sounding reference signal resource of the second sounding reference signal resource set using respective different transmit beams, wherein the first transmit beam for the at least one sounding reference signal resource of the second sounding reference signal resource set and the second transmit beam for the corresponding sounding reference signal resource of the first sounding reference signal resource set are a same transmit beam.

Aspect 42: The method of any of aspects 38 through 41, further comprising: receiving, from the base station, an indication of a pattern of transmit beams for the first sounding reference signal resource set and the second sounding reference signal resource set, wherein the at least one sounding reference signal resource of the second sounding reference signal resource set is transmitted on the first transmit beam and the corresponding sounding reference signal resource of the first sounding reference signal resource set is transmitted on the second transmit beam based at least in part on the indication.

Aspect 43: The method of any of aspects 38 through 42, further comprising: determining the first sounding reference signal resource set and the second sounding reference signal resource set are linked based at least in part on a lack of spatial relation information or uplink transmission configuration indicator states being configured for each sounding reference signal resource set, each sounding reference signal resource set being configured with a same time domain behavior, each sounding reference signal resource set not overlapping in the time domain, each sounding reference signal resource set being configured with same uplink power control parameters, each sounding reference signal resource set having a same number of sounding reference signal resources, or a combination thereof.

Aspect 44: The method of any of aspects 38 through 43, further comprising: receiving, from the base station, an indication that the first sounding reference signal resource set and the second sounding reference signal resource set are linked via radio resource control signaling, medium access control (MAC) control element signaling, downlink control information, or a combination thereof.

Aspect 45: The method of aspect 44, further comprising: triggering the second sounding reference signal resource set when the first sounding reference signal resource set is triggered based at least in part on the indication.

Aspect 46: The method of any of aspects 44 through 45, further comprising: triggering both the first sounding reference signal resource set and the second sounding reference signal resource set based at least in part on the MAC control element signaling comprising a first identifier for the first sounding reference signal resource set and an additional indication that the second sounding reference signal resource set is to be triggered with the first sounding reference signal resource set.

Aspect 47: The method of any of aspects 44 through 46, further comprising: triggering both the first sounding reference signal resource set and the second sounding reference signal resource set based at least in part on the MAC control element signaling comprising a first identifier for the first sounding reference signal resource set and a second identifier for the second sounding reference signal resource set.

Aspect 48: The method of any of aspects 44 through 47, further comprising: triggering both the first sounding reference signal resource set and the second sounding reference signal resource set based at least in part on the downlink control information indicating that the first sounding reference signal resource set and the second sounding reference signal resource set are linked out of a plurality of sounding reference signal resource sets.

Aspect 49: The method of any of aspects 38 through 48, further comprising: receiving, from the base station, downlink control information comprising a transmission power control command that adjusts one or more power control parameters for the first sounding reference signal resource set and the second sounding reference signal resource set.

Aspect 50: The method of aspect 49, further comprising: adjusting the one or more power control parameters after the first sounding reference signal resource set and the second sounding reference signal resource set have both been fully transmitted based at least in part on receiving the downlink control information before both the first sounding reference signal resource set and the second sounding reference signal resource set have been fully transmitted.

Aspect 51: The method of any of aspects 49 through 50, further comprising: determining that receiving the downlink control information is an error case based at least in part on receiving the downlink control information before both the first sounding reference signal resource set and the second sounding reference signal resource set have been fully transmitted.

Aspect 52: A method for wireless communications at a base station, comprising: transmitting, to a UE, a control signal that indicates a sounding reference signal beam management configuration that identifies at least a first sounding reference signal resource set and a second sounding reference signal resource set, the second sounding reference signal resource set linked to the first sounding reference signal resource set; determining a first transmit beam for at least one sounding reference signal resource of the second sounding reference signal resource set based at least in part on a second transmit beam for a corresponding sounding reference signal resource of the first sounding reference signal resource set; and receiving the at least one sounding reference signal resource of the second sounding reference signal resource set via the first transmit beam.

Aspect 53: The method of aspect 52, wherein receiving the at least one sounding reference signal resource of the second sounding reference signal resource set comprises: receiving each sounding reference signal resource of the second sounding reference signal resource set via the first transmit beam.

Aspect 54: The method of aspect 53, further comprising: receiving each sounding reference signal resource of the first sounding reference signal resource set via the second transmit beam.

Aspect 55: The method of aspect 52, wherein receiving the at least one sounding reference signal resource of the second sounding reference signal resource set comprises: receiving each sounding reference signal resource of the second sounding reference signal resource set via respective different transmit beams, wherein the first transmit beam for the at least one sounding reference signal resource of the second sounding reference signal resource set and the second transmit beam for the corresponding sounding reference signal resource of the first sounding reference signal resource set are a same transmit beam.

Aspect 56: The method of any of aspects 52 through 55, further comprising: transmitting, to the UE, an indication of a pattern of transmit beams for the first sounding reference signal resource set and the second sounding reference signal resource set, wherein the at least one sounding reference signal resource of the second sounding reference signal resource set is received via the first transmit beam and the corresponding sounding reference signal resource of the first sounding reference signal resource set is received via the second transmit beam based at least in part on the indication.

Aspect 57: The method of any of aspects 52 through 56, further comprising: transmitting an indication that the first sounding reference signal resource set and the second sounding reference signal resource set are linked based at least in part on a lack of spatial relation information or uplink transmission configuration indicator states being configured for each sounding reference signal resource set, each sounding reference signal resource set being configured with a same time domain behavior, each sounding reference signal resource set not overlapping in the time domain, each sounding reference signal resource set being configured with same uplink power control parameters, each sounding reference signal resource set having a same number of sounding reference signal resources, or a combination thereof.

Aspect 58: The method of any of aspects 52 through 57, further comprising: transmitting, to the UE, an indication that the first sounding reference signal resource set and the second sounding reference signal resource set are linked via radio resource control signaling, medium access control (MAC) control element signaling, downlink control information, or a combination thereof.

Aspect 59: The method of aspect 58, further comprising: triggering the second sounding reference signal resource set when the first sounding reference signal resource set is triggered based at least in part on the indication.

Aspect 60: The method of any of aspects 58 through 59, further comprising: triggering both the first sounding reference signal resource set and the second sounding reference signal resource set based at least in part on the MAC control element signaling comprising a first identifier for the first sounding reference signal resource set and an additional indication that the second sounding reference signal resource set is to be triggered with the first sounding reference signal resource set.

Aspect 61: The method of any of aspects 58 through 60, further comprising: triggering both the first sounding reference signal resource set and the second sounding reference signal resource set based at least in part on the MAC control element signaling comprising a first identifier for the first sounding reference signal resource set and a second identifier for the second sounding reference signal resource set.

Aspect 62: The method of any of aspects 58 through 61, further comprising: triggering both the first sounding reference signal resource set and the second sounding reference signal resource set based at least in part on the downlink control information indicating that the first sounding reference signal resource set and the second sounding reference signal resource set are linked out of a plurality of sounding reference signal resource sets.

Aspect 63: The method of any of aspects 52 through 62, further comprising: transmitting, to the UE, downlink control information comprising a transmission power control command that adjusts one or more power control parameters for the first sounding reference signal resource set and the second sounding reference signal resource set.

Aspect 64: The method of aspect 63, further comprising: receiving additional instances of the first sounding reference signal resource set and the second sounding reference signal resource set according to the adjusted one or more power control parameters after first instances of the first sounding reference signal resource set and the second sounding reference signal resource set have both been fully received based at least in part on transmitting the downlink control information before both first instances of the first sounding reference signal resource set and the second sounding reference signal resource set have been fully received.

Aspect 65: An apparatus for wireless communications at a UE, comprising a processor; memory coupled with the processor; and instructions stored in the memory and executable by the processor to cause the apparatus to perform a method of any of aspects 1 through 19.

Aspect 66: An apparatus for wireless communications at a UE, comprising at least one means for performing a method of any of aspects 1 through 19.

Aspect 67: A non-transitory computer-readable medium storing code for wireless communications at a UE, the code comprising instructions executable by a processor to perform a method of any of aspects 1 through 19.

Aspect 68: An apparatus for wireless communications at a base station, comprising a processor; memory coupled with the processor; and instructions stored in the memory and executable by the processor to cause the apparatus to perform a method of any of aspects 20 through 37.

Aspect 69: An apparatus for wireless communications at a base station, comprising at least one means for performing a method of any of aspects 20 through 37.

Aspect 70: A non-transitory computer-readable medium storing code for wireless communications at a base station, the code comprising instructions executable by a processor to perform a method of any of aspects 20 through 37.

Aspect 71: An apparatus for wireless communications at a UE, comprising a processor; memory coupled with the processor; and instructions stored in the memory and executable by the processor to cause the apparatus to perform a method of any of aspects 38 through 51.

Aspect 72: An apparatus for wireless communications at a UE, comprising at least one means for performing a method of any of aspects 38 through 51.

Aspect 73: A non-transitory computer-readable medium storing code for wireless communications at a UE, the code comprising instructions executable by a processor to perform a method of any of aspects 38 through 51.

Aspect 74: An apparatus for wireless communications at a base station, comprising a processor; memory coupled with the processor; and instructions stored in the memory and executable by the processor to cause the apparatus to perform a method of any of aspects 52 through 64.

Aspect 75: An apparatus for wireless communications at a base station, comprising at least one means for performing a method of any of aspects 52 through 64.

Aspect 76: A non-transitory computer-readable medium storing code for wireless communications at a base station, the code comprising instructions executable by a processor to perform a method of any of aspects 52 through 64.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving, from a base station, a control signal that indicates a sounding reference signal beam management configuration that identifies at least a first sounding reference signal resource set and a second sounding reference signal resource set, the second sounding reference signal resource set linked to the first sounding reference signal resource set; and
   transmitting at least one sounding reference signal resource of the second sounding reference signal resource set using a first transmit beam, wherein use of the first transmit beam is based at least in part on an association of the first transmit beam with a second transmit beam, and wherein the association is indicative of the use of the first transmit beam for the at least one sounding reference signal resource of the second sounding reference signal resource set based on a use of the second transmit beam for a corresponding sounding reference signal resource of the first sounding reference signal resource set.

2. The method of claim 1, wherein transmitting the at least one sounding reference signal resource of the second sounding reference signal resource set comprises:
transmitting each sounding reference signal resource of the second sounding reference signal resource set using the first transmit beam, wherein each sounding reference signal resource of the first sounding reference signal resource set is transmitted using the second transmit beam.

3. The method of claim 1, wherein transmitting the at least one sounding reference signal resource of the second sounding reference signal resource set comprises:
transmitting each sounding reference signal resource of the second sounding reference signal resource set using respective different transmit beams, wherein the first transmit beam for the at least one sounding reference signal resource of the second sounding reference signal resource set and the second transmit beam for the corresponding sounding reference signal resource of the first sounding reference signal resource set are a same transmit beam.

4. The method of claim 1, further comprising:
receiving, from the base station, an indication of a pattern of transmit beams for the first sounding reference signal resource set and the second sounding reference signal resource set, wherein the at least one sounding reference signal resource of the second sounding reference signal resource set is transmitted on the first transmit beam and the corresponding sounding reference signal resource of the first sounding reference signal resource set is transmitted on the second transmit beam based at least in part on the indication.

5. The method of claim 1, further comprising:
determining the first sounding reference signal resource set and the second sounding reference signal resource set are linked based at least in part on a lack of spatial relation information or uplink transmission configuration indicator states being configured for each sounding reference signal resource set, each sounding reference signal resource set being configured with a same time domain behavior, each sounding reference signal resource set not overlapping in the time domain, each sounding reference signal resource set being configured with same uplink power control parameters, each sounding reference signal resource set having a same number of sounding reference signal resources, or a combination thereof.

6. The method of claim 1, further comprising:
receiving, from the base station, an indication that the first sounding reference signal resource set and the second sounding reference signal resource set are linked via radio resource control signaling, medium access control (MAC) control element signaling, downlink control information, or a combination thereof.

7. The method of claim 6, further comprising:
triggering the second sounding reference signal resource set when the first sounding reference signal resource set is triggered based at least in part on the indication.

8. The method of claim 6, further comprising:
triggering both the first sounding reference signal resource set and the second sounding reference signal resource set based at least in part on the MAC control element signaling comprising a first identifier for the first sounding reference signal resource set and an additional indication that the second sounding reference signal resource set is to be triggered with the first sounding reference signal resource set.

9. The method of claim 6, further comprising:
triggering both the first sounding reference signal resource set and the second sounding reference signal resource set based at least in part on the MAC control element signaling comprising a first identifier for the first sounding reference signal resource set and a second identifier for the second sounding reference signal resource set.

10. The method of claim 6, further comprising:
triggering both the first sounding reference signal resource set and the second sounding reference signal resource set based at least in part on the downlink control information indicating that the first sounding reference signal resource set and the second sounding reference signal resource set are linked out of a plurality of sounding reference signal resource sets.

11. The method of claim 1, further comprising:
receiving, from the base station, downlink control information comprising a transmission power control command that adjusts one or more power control parameters for the first sounding reference signal resource set and the second sounding reference signal resource set.

12. The method of claim 11, further comprising:
adjusting the one or more power control parameters after the first sounding reference signal resource set and the second sounding reference signal resource set have both been fully transmitted based at least in part on receiving the downlink control information before both the first sounding reference signal resource set and the second sounding reference signal resource set have been fully transmitted.

13. The method of claim 11, further comprising:
determining that receiving the downlink control information is an error case based at least in part on receiving the downlink control information before both the first sounding reference signal resource set and the second sounding reference signal resource set have been fully transmitted.

14. A method for wireless communications at a base station, comprising:
transmitting, to a user equipment (UE), a control signal that indicates a sounding reference signal beam management configuration that identifies at least a first sounding reference signal resource set and a second sounding reference signal resource set, the second sounding reference signal resource set linked to the first sounding reference signal resource set; and
receiving at least one sounding reference signal resource of the second sounding reference signal resource set via a first transmit beam, wherein use of the first transmit beam is based at least in part on an association of the first transmit beam with a second transmit beam, and wherein the association is indicative of the use of the first transmit beam for the at least one sounding reference signal resource of the second sounding reference signal resource set based on a use of the second transmit beam for a corresponding sounding reference signal resource of the first sounding reference signal resource set.

15. The method of claim 14, wherein receiving the at least one sounding reference signal resource of the second sounding reference signal resource set comprises:
receiving each sounding reference signal resource of the second sounding reference signal resource set via the first transmit beam, wherein each sounding reference signal resource of the first sounding reference signal resource set is received via the second transmit beam.

16. The method of claim 14, wherein receiving the at least one sounding reference signal resource of the second sounding reference signal resource set comprises:
receiving each sounding reference signal resource of the second sounding reference signal resource set via respective different transmit beams, wherein the first transmit beam for the at least one sounding reference signal resource of the second sounding reference signal resource set and the second transmit beam for the corresponding sounding reference signal resource of the first sounding reference signal resource set are a same transmit beam.

17. The method of claim 14, further comprising:
transmitting an indication of a pattern of transmit beams for the first sounding reference signal resource set and the second sounding reference signal resource set, wherein the at least one sounding reference signal resource of the second sounding reference signal resource set is received via the first transmit beam and the corresponding sounding reference signal resource of the first sounding reference signal resource set is received via the second transmit beam based at least in part on the indication.

18. The method of claim 14, wherein the first sounding reference signal resource set and the second sounding reference signal resource set are linked based at least in part on a lack of spatial relation information or uplink transmission configuration indicator states being configured for each sounding reference signal resource set, each sounding reference signal resource set being configured with a same time domain behavior, each sounding reference signal resource set not overlapping in the time domain, each sounding reference signal resource set being configured with same uplink power control parameters, each sounding reference signal resource set having a same number of sounding reference signal resources, or a combination thereof.

19. The method of claim 14, further comprising:
transmitting an indication that the first sounding reference signal resource set and the second sounding reference signal resource set are linked via radio resource control signaling, medium access control (MAC) control element signaling, downlink control information, or a combination thereof.

20. The method of claim 19, wherein the second sounding reference signal resource set is triggered when the first sounding reference signal resource set is triggered based at least in part on the indication.

21. The method of claim 19, wherein both the first sounding reference signal resource set and the second sounding reference signal resource set are triggered based at least in part on the MAC control element signaling comprising a first identifier for the first sounding reference signal resource set and an additional indication that the second sounding reference signal resource set is to be triggered with the first sounding reference signal resource set.

22. The method of claim 19, wherein both the first sounding reference signal resource set and the second sounding reference signal resource set are triggered based at least in part on the MAC control element signaling comprising a first identifier for the first sounding reference signal resource set and a second identifier for the second sounding reference signal resource set or on the downlink control information indicating that the first sounding reference signal resource set and the second sounding reference signal resource set are linked out of a plurality of sounding reference signal resource sets.

23. The method of claim 14, further comprising:
transmitting downlink control information comprising a transmission power control command that adjusts one or more power control parameters for the first sounding reference signal resource set and the second sounding reference signal resource set.

24. The method of claim 23, wherein the one or more power control parameters are adjusted after the first sounding reference signal resource set and the second sounding reference signal resource set have both been fully transmitted based at least in part on transmitting the downlink control information before both the first sounding reference signal resource set and the second sounding reference signal resource set have been fully received.

25. The method of claim 23, wherein transmitting the downlink control information is an error case based at least in part on transmitting the downlink control information before both the first sounding reference signal resource set and the second sounding reference signal resource set have been fully transmitted.

26. An apparatus for wireless communication at a user equipment (UE), comprising:
a processor,
memory coupled with the processor; and
instructions stored in the memory and executable by the processor to cause the apparatus to:
receive, from a base station, a control signal that indicates a sounding reference signal beam management configuration that identifies at least a first sounding reference signal resource set and a second sounding reference signal resource set, the second sounding reference signal resource set linked to the first sounding reference signal resource set; and
transmit at least one sounding reference signal resource of the second sounding reference signal resource set using a first transmit beam, wherein use of the first transmit beam is based at least in part on an association of the first transmit beam with a second transmit beam, and wherein the association is indicative of the use of the first transmit beam for the at least one sounding reference signal resource of the second sounding reference signal resource set based on a use of the second transmit beam for a corresponding sounding reference signal resource of the first sounding reference signal resource set.

27. The apparatus of claim 26, wherein the instructions to transmit the at least one sounding reference signal resource of the second sounding reference signal resource set are executable by the processor to cause the apparatus to:

transmit each sounding reference signal resource of the second sounding reference signal resource set using the first transmit beam, wherein each sounding reference signal resource of the first sounding reference signal resource set is transmitted using the second transmit beam.

28. The apparatus of claim 26, wherein the instructions to transmit the at least one sounding reference signal resource of the second sounding reference signal resource set are executable by the processor to cause the apparatus to:
transmit each sounding reference signal resource of the second sounding reference signal resource set using respective different transmit beams, wherein the first transmit beam for the at least one sounding reference signal resource of the second sounding reference signal resource set and the second transmit beam for the corresponding sounding reference signal resource of the first sounding reference signal resource set are a same transmit beam.

29. The apparatus of claim 26, wherein the instructions to transmit the at least one sounding reference signal resource of the second sounding reference signal resource set are executable by the processor to cause the apparatus to:
transmit the at least one sound reference signal resource using the first beam to an uplink node that is separate from the base station.

30. An apparatus for wireless communication at a base station, comprising:
a processor,
memory coupled with the processor; and
instructions stored in the memory and executable by the processor to cause the apparatus to:
transmit, to a user equipment (UE), a control signal that indicates a sounding reference signal beam management configuration that identifies at least a first sounding reference signal resource set and a second sounding reference signal resource set, the second sounding reference signal resource set linked to the first sounding reference signal resource set; and
receive at least one sounding reference signal resource of the second sounding reference signal resource set via a first transmit beam, wherein use of the first transmit beam is based at least in part on an association of the first transmit beam with a second transmit beam, and wherein the association is indicative of the use of the first transmit beam for the at least one sounding reference signal resource of the second sounding reference signal resource set based on a use of the second transmit beam for a corresponding sounding reference signal resource of the first sounding reference signal resource set.

\* \* \* \* \*